(12) United States Patent
Hashimoto et al.

(10) Patent No.: US 8,115,431 B2
(45) Date of Patent: Feb. 14, 2012

(54) INVERTER CONTROL APPARATUS AND MOTOR DRIVE SYSTEM

(75) Inventors: Eiichiro Hashimoto, Kyoto (JP); Yoshio Tomigashi, Osaka (JP)

(73) Assignee: SANYO Electric Co., Ltd., Moriguchi (JP)

( * ) Notice: Subject to any disclaimer, the term of this patent is extended or adjusted under 35 U.S.C. 154(b) by 341 days.

(21) Appl. No.: 12/554,652

(22) Filed: Sep. 4, 2009

(65) Prior Publication Data

US 2010/0060211 A1      Mar. 11, 2010

(30) Foreign Application Priority Data

Sep. 11, 2008   (JP) .................................. 2008-233572

(51) Int. Cl.
*H02P 6/06* (2006.01)
*H02P 21/00* (2006.01)

(52) U.S. Cl. ................ 318/400.02; 318/400.22; 318/722

(58) Field of Classification Search ............. 318/400.02, 318/400.2, 400.21, 400.22, 400.26, 700, 318/720–724

See application file for complete search history.

(56) References Cited

U.S. PATENT DOCUMENTS

| | | | |
|---|---|---|---|
| 5,657,216 A | 8/1997 | Kaura | |
| 6,084,377 A | 7/2000 | Seok | |
| 7,592,766 B2 * | 9/2009 | Patel et al. | ............... 318/400.02 |
| 2004/0130918 A1 | 7/2004 | Ho | |
| 2005/0212471 A1 | 9/2005 | Patel et al. | |
| 2006/0139972 A1 | 6/2006 | Delarue et al. | |
| 2008/0061728 A1 | 3/2008 | Tomigashi | |
| 2009/0256518 A1 * | 10/2009 | Kitanaka et al. | ............... 318/802 |
| 2011/0214934 A1 * | 9/2011 | Ueda et al. | ................... 180/446 |

FOREIGN PATENT DOCUMENTS

| | | |
|---|---|---|
| JP | 2003309993 | 10/2003 |
| JP | 200642454 | 2/2006 |
| JP | 2007143316 | 6/2007 |
| JP | 2008099542 | 4/2008 |

OTHER PUBLICATIONS

Extended European Search Report, dated Jan. 20, 2010.
Current Controlled Type Sinusoidal Voltage Interconnecting Three-Phase Inverter, by Yamada & two additional authors; The Institute of Electrical Engineers of Japan, Papers Mar. 2007, 4th Volume, p. 115.

* cited by examiner

*Primary Examiner* — Bentsu Ro
(74) *Attorney, Agent, or Firm* — NDQ&M Watchstone LLP

(57) ABSTRACT

An inverter control apparatus that controls a three-phase inverter which transforms a direct-current voltage into an alternating three-phase voltage, the inverter control apparatus includes: a voltage command vector generation portion that generates a first voltage command vector for specifying a vector of a voltage to be applied to a three-phase load that is connected to the inverter; a voltage command vector correction portion that in performing overmodulation with the inverter, corrects the first voltage command vector by setting a limit onto a coordinate-axis component of the first voltage command vector on an ab coordinate system to generate a second voltage command vector, wherein the inverter is so controlled that a voltage depending on the second voltage command vector is applied to the load, and the ab coordinate system is a coordinated system that depending on a phase of the first voltage command vector with respect to a predetermined fixed axis on a two-dimensional fixed coordinate system, rotates in stepwise fashion for every 60 degrees in electrical angle with respect to the fixed coordinate system.

11 Claims, 30 Drawing Sheets

FIG.19A
LOCUS OF FIRST VOLTAGE COMMAND VECTOR

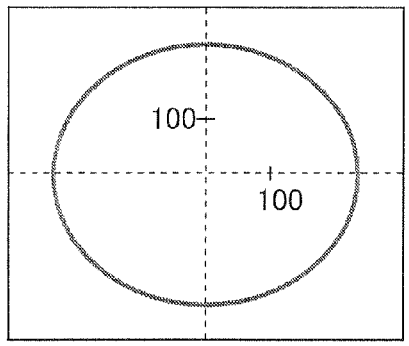

FIG.19B
LOCUS OF APPLIED VOLTAGE VECTOR BY SIMPLE LIMIT METHOD

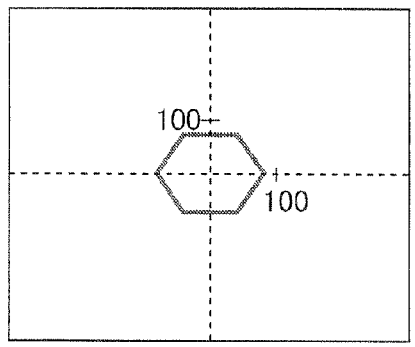

FIG.19C
LOCUS OF SECOND VOLTAGE COMMAND VECTOR ($K=1/\sqrt{3}$)

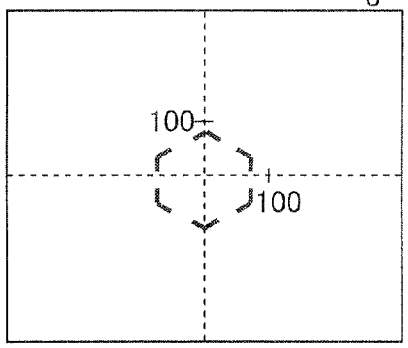

FIG.19D
LOCUS OF APPLIED VOLTAGE VECTOR BASED ON SECOND VOLTAGE COMMAND VECTOR ($K=1/\sqrt{3}$)

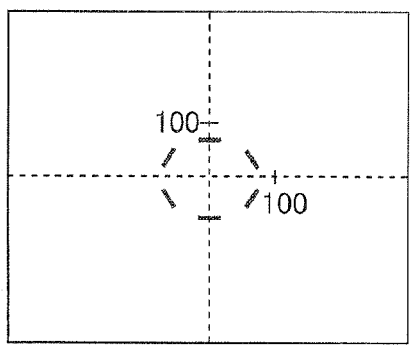

FIG.19E
LOCUS OF SECOND VOLTAGE COMMAND VECTOR ($K>1/\sqrt{3}$)

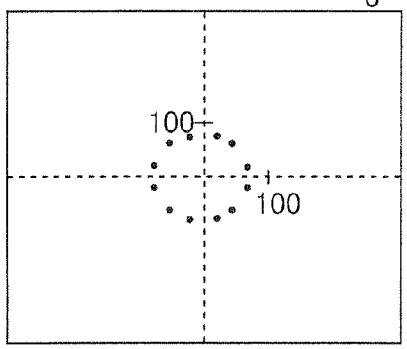

FIG.19F
LOCUS OF APPLIED VOLTAGE VECTOR BASED ON SECOND VOLTAGE COMMAND VECTOR ($K>1/\sqrt{3}$)

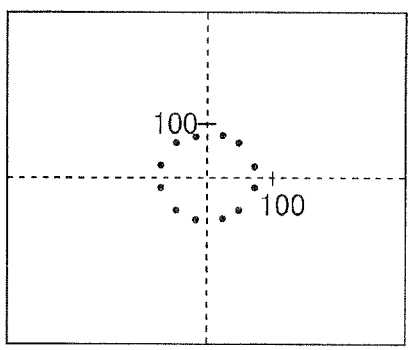

$$K_v = \frac{|v|}{V_{max1}}$$

$$K_{v*} = \frac{|v^*|}{V_{max1}}$$

INVERTER CONTROL APPARATUS AND MOTOR DRIVE SYSTEM

This nonprovisional application claims priority under 35 U.S.C. §119 (a) on Patent Application No. 2008-233572 filed in Japan on Sep. 11, 2008, the entire contents of which are hereby incorporated by reference.

BACKGROUND OF THE INVENTION

1. Field of the Invention

The present invention relates to an inverter control apparatus that controls an inverter. Also the present invention relates to a motor drive system.

2. Description of the Related Art

To perform vector control of a motor by supplying three-phase AC power to the motor, it is necessary to detect phase currents (e.g., a U-phase current and a V-phase current) of two phases of three phases of U, V and W. As a current detection system for detecting phase currents for two phases, the one-shunt current detection system (single-shunt current detection system) has been proposed. In the one-shunt current detection system, a current sensor is disposed on a wiring that connects an inverter and a DC power source and detects phase currents for two phases by sampling output signals from the current sensor at appropriate timings.

An inverter control method useful to a motor drive system that employs the one-shunt current detection system is proposed by the applicant of the present application. In this inverter control method, a voltage command vector for specifying an output voltage vector (an applied voltage vector to a motor) from a PWM inverter is prepared; then, the voltage command vector is corrected on an ab coordinate system that includes an a axis and a b axis as the coordinate axes; thus, a secure detection of a phase current is achieved. The a axis is an axis that rotates in stepwise fashion for every 60 degrees in electrical angle depending on the phase of a voltage command vector on a fixed coordinate system. The b axis is an axis that leads the a axis by an electrical angle of 90 degrees in phase.

On the other hand, in driving a three-phase motor, generally the sine-wave PWM control is used. In the sine-wave PWM control, a sine-wave voltage is supplied to each phase of a motor (see FIG. 4). However, if it is desired to supply a voltage to a motor that exceeds the maximum voltage that is able to be output in the sine-wave PWM control, the rectangular-wave driving is used instead of the sine-wave PWM control. In the rectangular-wave driving, a voltage that has a voltage waveform similar to a rectangular wave is applied to each phase of a motor (see FIG. 7). The modulation system or the PWM to achieve such rectangular-wave driving is generally called overmodulation or overmodulation PWM.

In an inverter control apparatus that uses an ab coordinate system, a technology that introduces overmodulation has not been proposed yet. Because an ab coordinate system has a special characteristic that the ab coordinate system rotates in stepwise fashion for every 60 degrees in electrical angle depending on the phase of a voltage command vector, a modulation technology suitable for the characteristic is necessary.

As inverter control methods for overmodulation, although there are some conventional technologies, they are unrelated to the technology that introduces overmodulation into an ab coordinate system.

SUMMARY OF THE INVENTION

An inverter control apparatus according to the present invention is an inverter control apparatus that controls a three-phase inverter which transforms a DC voltage into an alternating three-phase voltage and includes: a voltage command vector generation portion that generates a first voltage command vector for specifying a vector of a voltage to be applied to a three-phase load that is connected to the inverter; a voltage command vector correction portion that in performing overmodulation with the inverter, corrects the first voltage command vector by setting a limit onto a coordinate-axis component of the first voltage command vector on an ab coordinate system to generate a second voltage command vector, wherein the inverter is so controlled that a voltage depending on the second voltage command vector is applied to the load, and the ab coordinate system is a coordinated system that depending on a phase of the first voltage command vector with respect to a predetermined fixed axis on a two-dimensional fixed coordinate system, rotates in stepwise fashion for every 60 degrees in electrical angle with respect to the fixed coordinate system.

Specifically, for example, the ab coordinate system includes an a axis and a b axis that are orthogonal to each other as the coordinate axes; the a axis uses any one of $a_0$ to $a_5$ axes depending on the phase; the b axis uses any one of $b_0$ to $b_5$ axes depending on the phase; an $a_{(n+1)}$ axis leads an $a_n$ axis by 60 degrees in electrical angle; a $b_{(n+1)}$ axis leads a $b_n$ axis by 60 degrees in electrical angle (n: integer); one of the $a_0$ to $a_5$ matches with the fixed axis; the voltage command vector correction portion selects an axis as the a axis that, of the $a_0$ to $a_5$ axes, has a phase closest to the phase of the first voltage command vector; selects the b axis from the $b_0$ to $b_5$ axes based on the selection result; and corrects the first voltage command vector by putting an upper limit onto the a-axis component of the first voltage command vector. Here, the fixed axis corresponds to an α axis in an embodiment described later.

And, for example, if the a-axis component of the first voltage command vector exceeds the predetermined a-axis upper limit, the voltage command vector correction portion performs decease correction to decrease the a-axis component to the a-axis upper limit while corrects the b-axis component of the first voltage command vector depending on the amount of the decrease correction, thereby generating the second voltage command vector.

Specifically, for example, if the a-axis component of the first voltage command vector exceeds the predetermined a-axis upper limit, the voltage command vector correction portion performs decease correction to decrease the a-axis component to the a-axis upper limit while corrects the b-axis component of the first voltage command vector by $1/\sqrt{3}$ of the decrease correction or depending on an amount that exceeds $1/\sqrt{3}$ of the decrease correction; thus, the second voltage command vector may be generated. Here, $\sqrt{3}$ is the positive square root of 3.

Besides, for example, the inverter control apparatus further includes a coordinate transform portion that transforms the second voltage command vector into a three-phase voltage command value that specifies the three-phase voltage; controls the inverter according to the three-phase voltage command value; in the coordinate transform portion, a predetermined limit is put on the three-phase voltage command value depending on the magnitude of the DC voltage; and the inverter control apparatus controls the inverter according to a three-phase voltage command value after correction by the limit.

Moreover, for example, a current detection portion is further included, which detects a three-phase current that is supplied from the inverter to the load by detecting a current that flows between a DC power source for supplying the DC voltage to the inverter and the inverter, wherein the voltage command vector generation portion generates the first voltage command vector based on a detected value of the three-phase current.

For example, the ab coordinate system includes an a axis and a b axis that are orthogonal to each other as the coordinate axes; the a axis uses any one of $a_0$ to $a_5$ axes depending on the phase; the b axis uses any one of $b_0$ to $b_5$ axes depending on the phase; an $a_{(+1)}$ axis leads an $a_n$ axis by 60 degrees in electrical angle; a $b_{(+1)}$ axis leads a $b_n$ axis by 60 degrees in electrical angle (n: integer); one of the $a_0$ to $a_5$ matches with the fixed axis; the voltage command vector correction portion selects an axis as the b axis that, of the $b_0$ to $b_5$ axes, has a phase closest to the phase of the first voltage command vector; selects the a axis from the $a_0$ to $a_5$ axes based on the selection result; and corrects the first voltage command vector by putting an upper limit onto the b-axis component of the first voltage command vector. Here, the fixed axis corresponds to an α axis in an embodiment described later.

And, for example, if the b-axis component of the first voltage command vector exceeds the predetermined b-axis upper limit, the voltage command vector correction portion performs decease correction to decrease the b-axis component to the b-axis upper limit while corrects the a-axis component of the first voltage command vector depending on the amount of the decrease correction, thereby generating the second voltage command vector.

Specifically, for example, in correcting the a-axis component of the first voltage command vector, the voltage command vector correction portion so corrects the a-axis component of the first voltage command vector that an a-axis component after the correction does not exceed the a-axis upper limit; and the a-axis upper limit is set depending on a b-axis component after the correction.

Moreover, for example, a current detection portion is further included, which detects a three-phase current that is supplied from the inverter to the load by detecting a current that flows between a DC power source for supplying the DC voltage to the inverter and the inverter, wherein the voltage command vector generation portion generates the first voltage command vector based on a detected value of the three-phase current.

A motor drive system according to the present invention includes: a three-phase motor; a three-phase inverter that drives the motor; and a motor control apparatus that controls the motor by controlling the inverter. The motor drive system uses any one of the above inverter control apparatuses as the motor control apparatus to drive the motor as a three-phase load.

A system interconnection system that includes the inverter control apparatus and the inverter may be formed. This system interconnection system transforms the DC voltage into an alternating three-phase voltage by the inverter, and supplies alternating power based on the alternating three-phase voltage to a load interacting with an external three-phase alternating power system.

The importance and effects of the present invention will be more apparent from explanation of the embodiments below. The following embodiments are mere embodiments of the present invention, and the importance of the present invention and the meaning of a term for each component are not limited to those described in the following embodiments.

DESCRIPTION OF THE DRAWINGS

FIGS. 19A to 19F are views showing simulations results related to the voltage command vector and the applied voltage vector in the first embodiment of the present invention.

DESCRIPTION OF THE PREFERRED EMBODIMENTS

Hereinafter, the embodiments of the present invention are specifically described with reference to the drawings. In each drawing referred to, the same portions are indicated by the same reference numbers and double explanation of the same portion is basically skipped. First to fourth embodiments of the present invention are described later. First, items that are common to the embodiments or referred to in the embodiments are described.

Figure 1:
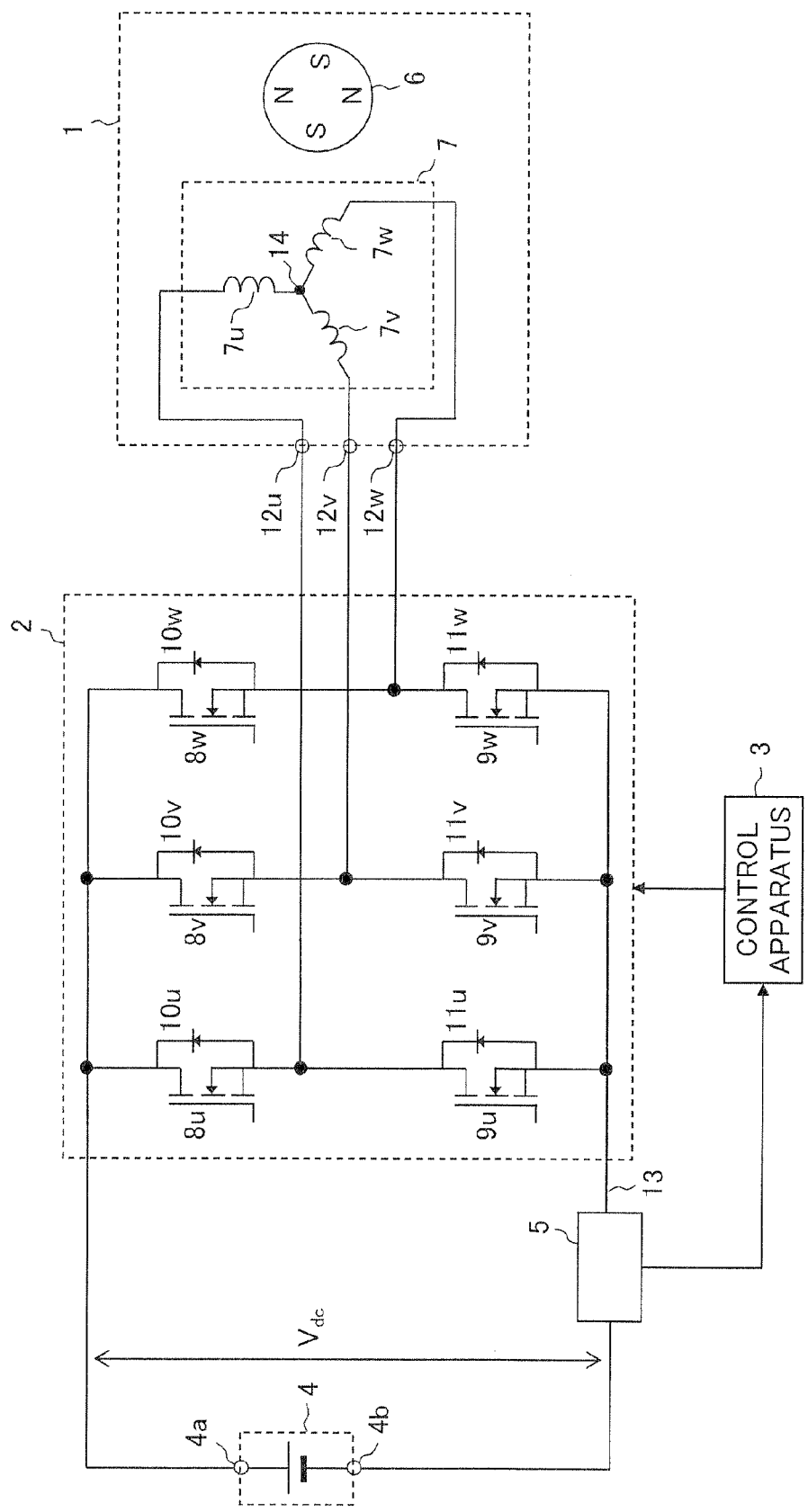
FIG. 1 is a block diagram of a motor drive system according to an embodiment of the present invention.

FIG. 1 is a block diagram of a motor drive system according to an embodiment of the present invention. The motor drive system in FIG. 1 includes: a three-phase permanent magnet synchronous motor 1 (hereinafter, simply called the "motor 1"); a PWM (Pulse Width Modulation) inverter 2 (hereinafter, simply called the "inverter 2"); a control apparatus 3; a DC power source 4; and a current sensor 5. The DC power source 4 outputs a DC voltage across a positive output terminal 4a and a negative output terminal 4b with the negative output terminal 4b disposed on a low-voltage side. The DC voltage and the voltage value output by the DC power source 4 are represented by $V_{dc}$.

The control apparatus 3 controls the motor 1 by controlling the inverter 2. Accordingly, it is possible to call the control apparatus 3 an inverter control apparatus and also a motor control apparatus.

The motor 1 includes: a rotor 6 that has permanent magnets; and a stator 7 that has a U-phase armature winding 7u, a V-phase armature winding 7v and a W-phase armature winding 7w. The armature windings 7u, 7v and 7w are Y-connected with respect to a neutral point 14. The non-connected ends opposite to the connected ends of the armature windings 7u, 7v and 7w with respect to the neutral point 14 are connected to terminals 12u, 12v and 12w, respectively.

The inverter 2 includes: a U-phase half-bridge circuit, a V-phase half-bridge circuit and a W-phase half-bridge circuit. Each half-bridge circuit includes a pair of switching elements. In each half-bridge circuit, the pair of switching elements are connected in series across the positive output terminal 4a and the negative output terminal 4b of the DC power source 4, and the DC voltage $V_{dc}$ from the DC power source 4 is applied to each half-bridge circuit.

The U-phase half-bridge circuit includes: a switching element 8u (hereinafter, also called the upper arm 8u) on the high-voltage side; and a switching element 9u (hereinafter, also called the lower arm 9u) on the low-voltage side. The V-phase half-bridge circuit includes: a switching element 8v (hereinafter, also called the upper arm 8v) on the high-voltage side; and a switching element 9v (hereinafter, also called the lower arm 9v) on the low-voltage side. The W-phase half-bridge circuit includes: a switching element 8w (hereinafter, also called the upper arm 8w) on the high-voltage side; and a switching element 9w (hereinafter, also called the lower arm 9w) on the low-voltage side. Diodes 10u, 10v, 10w, 11u, 11v and 11w are connected in parallel with the switching elements 8u, 8v, 8w, 9u, 9v and 9w respectively in a forward direction extending from the low-voltage side to the high-voltage side of the DC power source 4. Each diode functions as a free-wheel diode.

A connection point between the upper arm 8u and the lower arm 9u that are connected in series with each other, a connection point between the upper arm 8v and the lower arm 9v that are connected in series with each other, and a connection point between the upper arm 8w and the lower arm 9w that are connected in series with each other are connected to the terminals 12u, 12v and 12w, respectively. Here, in FIG. 1, although a field effect transistor is shown as each switching element, it is possible to replace them with IGBTs (insulated gate bipolar transistor) or the like.

The inverter 2 gives a PWM signal (pulse-width modulation signal) based on a three-phase voltage command value that is generated by the control apparatus 3 to a control terminal (base or gate) of each switching element in the inverter 2, thereby forcing each switching element to operate. The three-phase voltage command value includes a U-phase voltage command value $v_u^*$, a V-phase voltage command value $v_v^*$ and a W-phase voltage command value $v_w^*$.

Neglecting a dead time for preventing the upper and lower arms of the same phase from being turned on at the same time, in each half-bridge circuit, the lower arm is in an off state when the upper arm is in an on state; and the lower arm is in the on state when the upper arm is in the off state. Unless otherwise specified, the following description is performed ignoring the above dead time.

The DC voltage from the DC power source 4 that is applied to the inverter 2 undergoes PWM modulation (pulse-width modulation) performed by the switching operation of each switching element in the inverter 2 and converted into a three-phase AC voltage. The three-phases AC voltage is applied to the motor 1, so that a current depending on the three-phase AC voltage flows in each of the armature windings (7u, 7v and 7w), thus the motor 1 is driven.

The current sensor 5 detects a current (hereinafter, called the bus current) that flows in a bus 13 of the inverter 2. Because the bus current includes a DC component, it is possible to construe the bus current as a DC current. In the inverter 2, the low-voltage sides of the lower arms 9u, 9v and 9w are connected to the negative output terminal 4b of the DC power source 4 in common. A wiring to which the low-voltage sides of the lower arms 9u, 9v and 9w are connected is the bus 13 and the current sensor 5 is disposed in series with the bus 13. The current sensor 5 transmits a signal that represents a value of the detected bus current to the control apparatus 3. The control apparatus 3 generates the above three-phase voltage command value based on an output from the current sensor 5. The current sensor 5 is a shunt resistor, a current transformer or the like, for example. The current sensor 5 may be disposed on the wiring that connects the high-voltage sides of the upper arms 8u, 8v and 8w to the positive output terminal 4a rather than the wiring (the bus 13) that connects the low-voltage sides of the lower arms 9u, 9v and 9w to the negative output terminal 4b.

The motor drive system in FIG. 1 employs what is called the one-shunt current detection system that detects a three-phase current from the bus current.

Figure 2A:
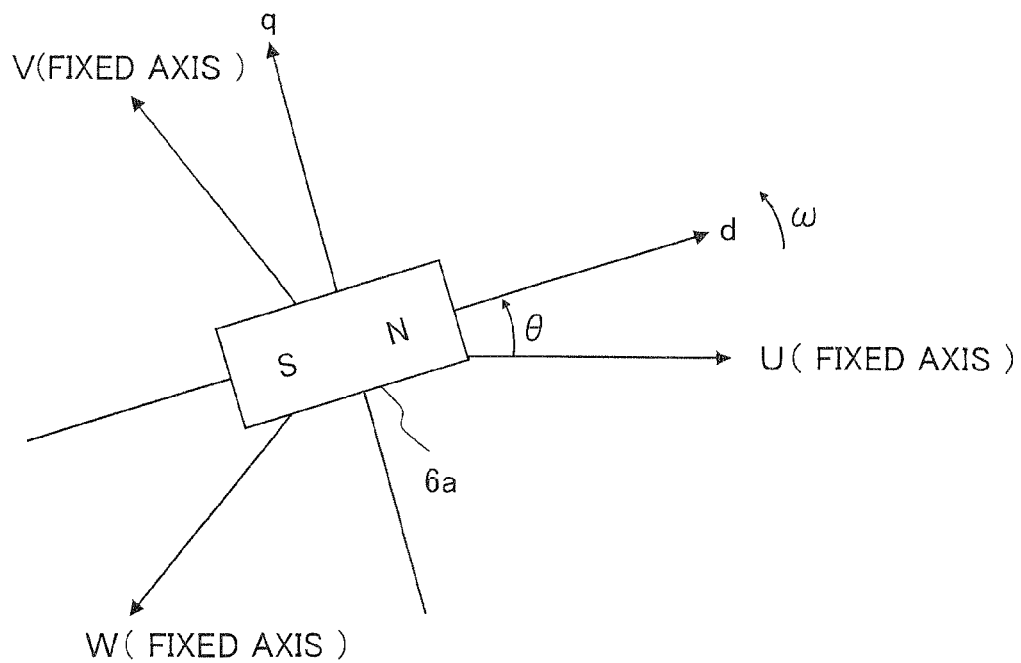
FIGS. 2A and 2B are analysis model views of a motor.
Figure 2B:
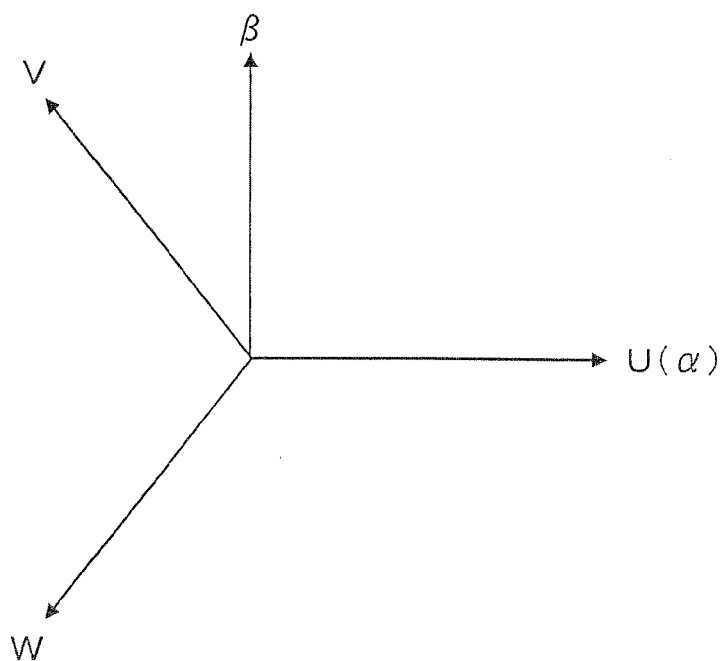

An analysis model view of the motor 1 is shown in FIGS. 2A and 2B. In FIG. 2A, fixed axes (hereinafter, also called the U-phase axis, the V-phase axis and the W-phase axis) for the U-phase, V-phase and W-phase armature windings are shown. A permanent magnet 6a is disposed in a rotor 6 of the motor 1. The phase of the V-phase axis leads by 120 degrees in electrical angle with respect to the phase of the U-phase axis, and the phase of the W-phase axis leads by 120 degrees in electrical angle with respect to the phase of the V-phase axis. In a rotation coordinate system that rotates at the same speed as the rotation speed of a magnetic flux generated by the permanent magnet 6a, the direction of the magnetic flux generated by the permanent magnet 6a is used as a d axis, and a q axis is set at a phase that leads the d axis by 90 degrees in electrical angle. In FIGS. 2A, 2B and in space vector views (FIGS. 5, 8, 9A, 9B and the like) described later, the counter-clockwise direction corresponds to the phase leading direction. The d axis and the q axis are collectively called a dq axis, and a rotation coordinate system that selects the d axis and the q axis as the coordinate axes is called a dq coordinate system.

The dq axis rotates and the rotation speed is represented by ω. Besides, in the dq coordinate system, the angle (phase) of the d axis seen from the U-phase axis is represented by θ. The angle represented by θ is an electrical angle and is generally called a rotor position or a magnetic pole position. The rotation speed represented by ω is an angular velocity in electrical angle.

Hereinafter, a state amount represented by θ is called a magnetic pole position (or a phase) and a state amount represented by ω is called a rotation speed. Here, a state amount may be called a physical amount. Besides, in the following description, an angle and a phase that are expressed in units of radian and degree indicate an angle and a phase in electrical angle unless otherwise specified.

In FIG. 2B, a relationship among the U-phase axis, the V-phase axis, the W-phase axis, an α axis and a β axis that are orthogonal to each other is shown. The α axis matches with the U-phase axis, and the β axis leads by 90 degrees in electrical angle with respect to the α axis. The U-phase axis, the V-phase axis, the W-phase axis, the α axis and the β axis are fixed axes that are fixed regardless of rotation of the rotor 6. The α and β axes are collectively called an α β axis, and a fixed coordinate system that selects the α and β axes as the coordinate axes is called an α β coordinate system.

The three-phase AC voltage that is applied to the motor 1 by the inverter 2 includes: a U-phase voltage that indicates an applied voltage to the U-phase armature winding 7u; a V-phase voltage that indicates an applied voltage to the V-phase armature winding 7v; and a W-phase voltage that indicates an applied voltage to the W-phase armature winding 7w. The U-phase voltage, the V-phase voltage and the W-phase voltage are voltages at the terminals 12u, 12v and 12w respectively seen from the neutral point 14. The U-phase voltage, the V-phase voltage and the W-phase voltage are represented by the symbols $v_u$, $v_v$ and $v_w$, respectively. The total applied voltage to the motor 1 that is a resultant voltage of the U-phase voltage, V-phase voltage and W-phase voltages is called a motor voltage (motor terminal voltage) and represented by a symbol $V_a$. The U-phase voltage $v_u$, the V-phase voltage $v_v$ and the W-phase voltage $v_w$ become voltage values depending on the U-phase voltage command value $v_u^*$, the V-phase voltage command value $v_v^*$ and the W-phase voltage command value $v_w^*$, respectively.

A U-phase component, a V-phase component and a W-phase component of a current that is supplied from the inverter 2 to the motor 1 by applying the motor voltage $V_a$, that is, a current that flows in the U-phase armature winding 7u, a current that flows in the V-phase armature winding 7v, and a current that flows in the W-phase armature winding 7w are called a U-phase current, a V-phase current, and a W-phase current, respectively. The U-phase current, the V-phase current, and the W-phase current are represented by symbols $i_u$, $i_v$, and $i_w$, respectively. The total supplied current to the motor 1 that is a resultant current of the U-phase current, V-phase current and W-phase currents is called a motor current (armature current) and represented by a symbol $I_a$.

The U-phase voltage, the V-phase voltage and the W-phase voltage are collectively or separately called a phase voltage. The U-phase current, the V-phase current and the W-phase current are collectively or separately called a phase current. Of the U phase, the V phase and the W phase, the phase having the maximum voltage level is called the "maximum phase," the phase having the smallest voltage level is called the "minimum phase," and the phase whose voltage level is not the maximum nor the minimum is called the "intermediate phase." For example, if $v_u > v_v > v_w$, the U phase is the maximum phase, the V phase is the intermediate phase, and the W phase is the minimum phase.

Figure 3:
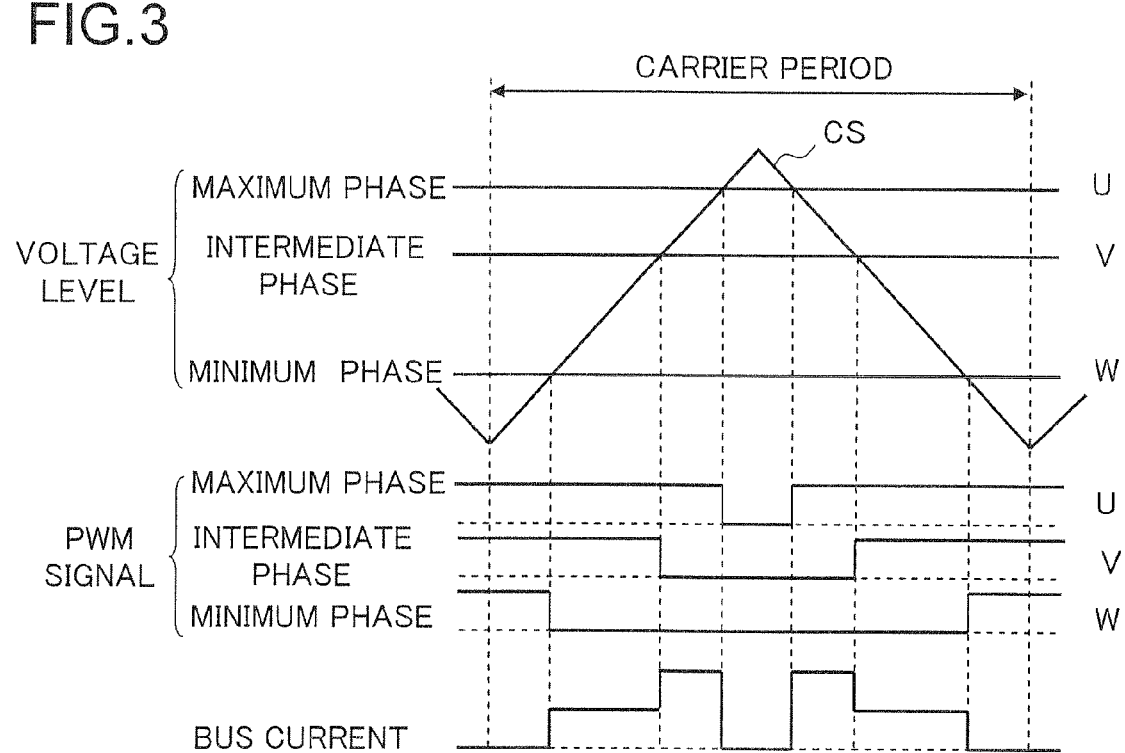
FIG. 3 is a view showing an example of PWM signals in a case where three-phase modulation is used.

A carrier signal CS the value of which changes periodically depicting a triangular wave is compared with each of the voltage levels of the maximum phase, the intermediate phase and the minimum phase that are defined by a three-phase voltage command value, thereby producing PWM signals each of which corresponds to each of the maximum phase, the intermediate phase and the minimum phase. In FIG. 3, examples of PWM signals in a case where three-phase modulation is used are shown. If the PWM signal of a noticed phase is high, the upper arm of the noticed phase is turned on; if the PWM signal of a noticed phase is low, the upper arm of the noticed phase is turned off. In the examples in FIG. 3, because the U phase, the V phase and the W phase correspond to the maximum phase, the intermediate phase and the minimum phase respectively, $v_u^* > v_v^* > v_w^*$ is met. In each carrier period, the value $CS_{VAL}$ of a carrier signal CS is compared with $v_u^*$, $v_v^*$ and $v_w^*$. The carrier period is a period of the carrier signal CS. In a carrier period, $CS_{VAL}$ increases from 0, that is, the start point, reaches a predetermined peak value, then decreases toward 0.

In a state of $v_u^* > v_v^* > v_w^* > CS_{VAL}$, the upper arms 8u, 8v and 8w are turned on; in a state of $v_u^* > v_v^* > CS_{VAL} > v_w^*$, the upper arms 8u, 8v and the lower arm 9w are turned on; in a state of $v_u^* > CS_{VAL} > v_v^* > v_w^*$, the upper arm 8u and the lower arms 9v, 9w are turned on; in a state of $CS_{VAL} > v_u^* > v_v^* > v_w^*$, the lower arms 9u, 9v and 9w are turned on.

The phase current of the minimum phase is able to be detected by detecting the bus current in the state of $v_u^* > v_v^* > CS_{VAL} > v_w^*$; the phase current of the maximum phase is able to be detected by detecting the bus current in the state of $v_u^* > CS_{VAL} > v_v^* > v_w^*$. In a carrier period, the time spans during which the upper arms of the maximum phase, the intermediate phase and the minimum phase are in the on state are called pulse widths of the PWM signals for the maximum phase, the intermediate phase and the minimum phase, respectively.

A d-axis component, q-axis component, α-axis component and β-axis component of the motor voltage $V_a$ are called a d-axis voltage, q-axis voltage, α-axis voltage and β-axis voltage, respectively, and represented by symbols $V_d$, $V_q$, $v_\alpha$ and $v_\beta$, respectively. A d-axis component, q-axis component, α-axis component and β-axis component the motor current $I_a$ are called a d-axis current, q-axis current, α-axis current and β-axis current, respectively, and represented by symbols $i_d$, $i_q$, $i_\alpha$, and $i_\beta$, respectively.

Here, $v_d$ is also used as a symbol that represents the value of a d-axis voltage. This is true with the symbols other than $v_d$ that represent state amounts (inclusive of state amounts of voltage and current). Besides, in the present specification, for simplified description, there are some cases where notations of symbols ($i_d$ and the like) only represent state amounts or command values that correspond to the symbols. In other words, in the present specification, for example, "$i_d$" and "d-axis current $i_d$" refer to the same thing; or "$i_d$" and "d-axis electric-current value $i_d$" refer to the same thing.

The following relational equations (A-1) and (A-2) are met between $v_\alpha$, $v_\beta$ and $v_u$, $v_v$, $v_w$:

$$v_\alpha = \sqrt{\frac{2}{3}} \cdot \left(v_u - \frac{1}{2}v_v - \frac{1}{2}v_w\right) \quad \text{(A-1)}$$

$$v_\beta = \sqrt{\frac{2}{3}} \cdot \left(v_u \cdot 0 + \frac{\sqrt{3}}{2}v_v - \frac{\sqrt{3}}{2}v_w\right) \quad \text{(A-2)}$$

[Modulation System]

Next, a modulation system that is able to be employed in the inverter 2 is described.

Figure 4:
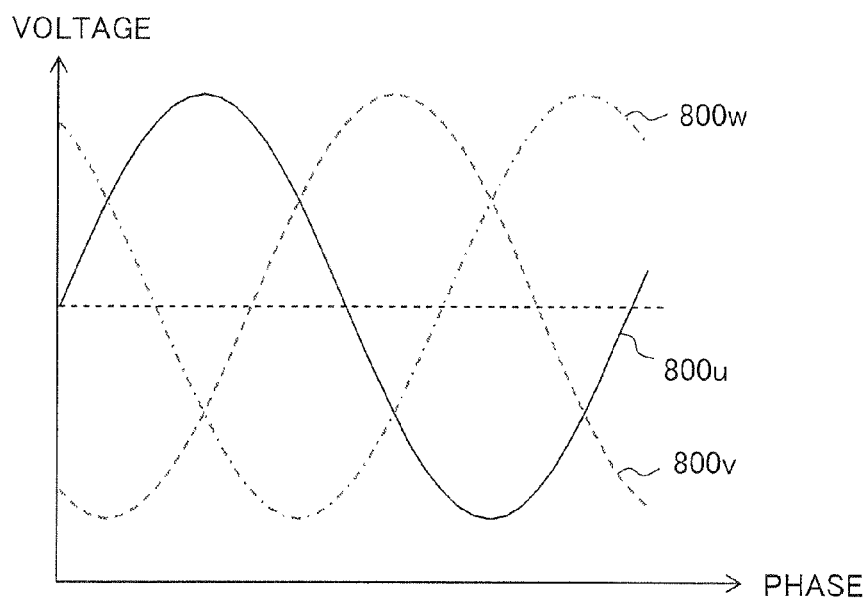
FIG. 4 is a view showing U-phase, V-phase and W-phase voltage waves when three-phase modulation is performed.

It is possible to employ a modulation system called three-phase modulation in the inverter 2. If three-phase modulation is performed, as shown in FIG. 4, each of a U-phase voltage, a V-phase voltage and a W-phase voltage depicts a sinusoidal voltage waveform as the phase θ of the d axis changes. In FIG. 4, a solid line 800u, a broken line 800v and a one-bar one-dot line 800w represent the U-phase voltage waveform, the V-phase voltage waveform and the W-phase voltage waveform respectively in the time three-phase modulation is performed. The lateral axis of the graph in FIG. 4 is the phase θ. Each of the voltage waveforms 800u, 800v and 800w depicts a sinusoidal wave with respect to an intermediate potential between the positive output terminal 4a and the negative output terminal 4b. The amplitudes of the sinusoidal waves are not larger than $(\frac{1}{2}) \cdot V_{dc}$. In other words, the maximum amplitude of the sinusoidal-wave voltages is $(\frac{1}{2}) \cdot V_{dc}$.

Figure 5:
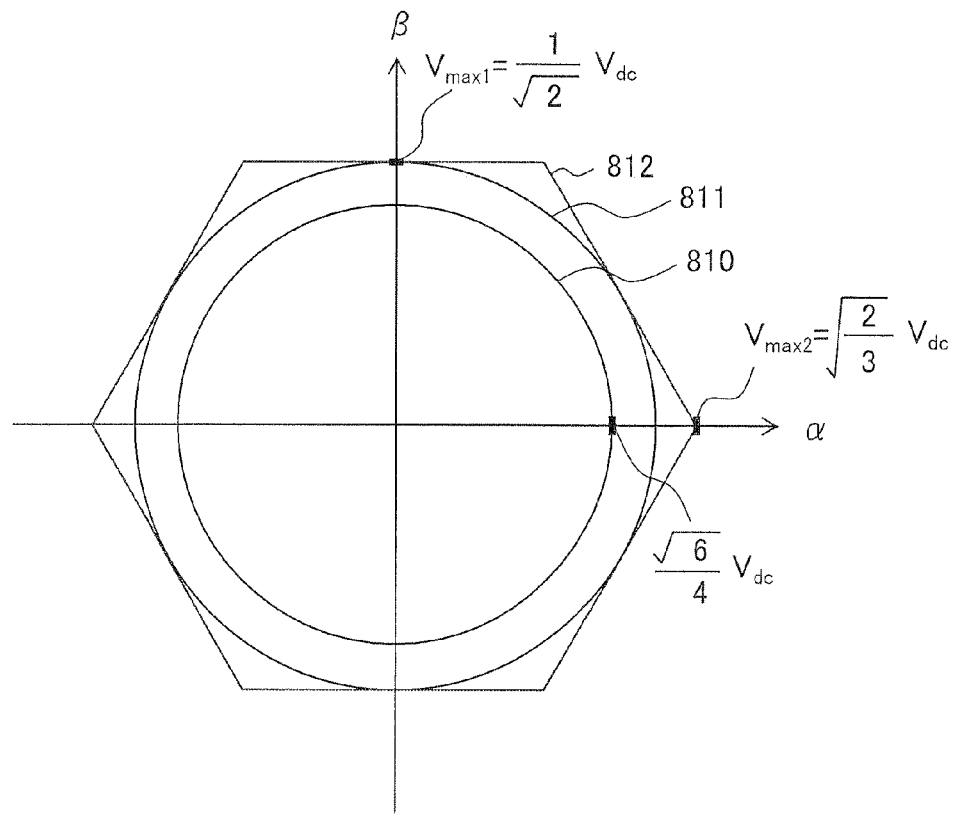
FIG. 5 is a view showing a voltage vector locus of a motor voltage on an α β coordinate system.

In a two-dimensional fixed coordinate system or a rotation coordinate system, a notation that represents a voltage by a vector is called a voltage vector. A circle 810 in FIG. 5 represents a voltage vector locus of the motor voltage $V_a$ on the α β coordinate system in the time three-phase modulation is performed. Specifically, the voltage vector locus 810 represents a voltage vector locus in the time the amplitudes of the U-phase voltage, the V-phase voltage and the W-phase voltage are maximized. The voltage vector locus 810 depicts a circle around the center that matches with the origin on the α β coordinate system, and the radius of the circle is ($\sqrt{6}$)/4×$V_{dc}$. For example, the α-axis voltage $v_\alpha$ is maximized at the time $(v_u, v_v, v_w) = (\frac{1}{2} \cdot V_{dc}, -\frac{1}{4} \cdot V_{dc}, -\frac{1}{4} \cdot V_{dc})$, and the α-axis voltage $v_\alpha$ at that time is ($\sqrt{6}$)/4×$V_{dc}$ obtained from the above equation (A-1). Here, in the present specification, $\sqrt{i}$ represents the positive square root of i (i: positive integer or fraction).

It is also possible to employ a modulation system called two-phase modulation in the inverter 2. In two-phase modulation, the U-phase, V-phase and W-phase voltages in the time of three-phase modulation are shifted toward the low-voltage side by a voltage of the minimum phase in the time of the three-phase modulation. Accordingly, if two-phase modulation is performed, the lower arm corresponding to the minimum phase is always turned on. Representing the command values of $v_u$, $v_v$ and $v_w$ in the time of three-phase modulation by $v_{u1}^*$, $v_{v1}^*$ and $v_{w1}^*$, and the command values of $v_u$, $v_v$ and $v_w$ in the time of two-phase modulation by $v_{u2}^*$, $v_{v2}^*$ and $v_{w2}^*$, the relational equations (A-3) to (A-5) are met among them. Here, min($v_{u1}^*$, $v_{v1}^*$, $v_{w1}^*$) represents a voltage value of the minimum phase, that is, the minimum value of $v_{u1}^*$, $v_{v1}^*$ and $v_{w1}^*$.

$$v_{u2}^* = v_{u1}^* - \min(v_{u1}^*, v_{v1}^*, v_{w1}^*) \quad \text{(A-3)}$$

$$v_{v2}^* = v_{v1}^* - \min(v_{u1}^*, v_{v1}^*, v_{w1}^*) \quad \text{(A-4)}$$

$$v_{w2}^* = v_{w1}^* - \min(v_{u1}^*, v_{v1}^*, v_{w1}^*) \quad \text{(A-5)}$$

Figure 6:
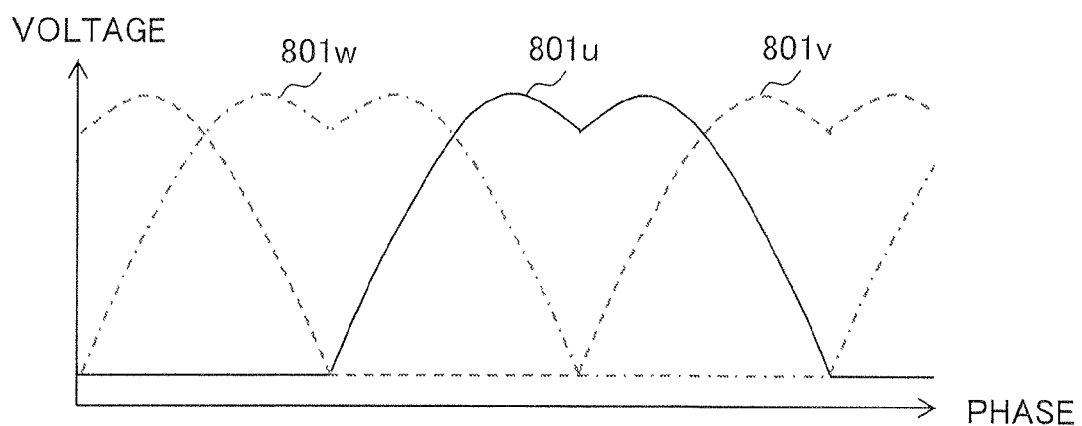
FIG. 6 is a view showing U-phase, V-phase and W-phase voltage waves when two-phase modulation is performed.

In FIG. 6, the respective phase voltage waveforms in the time of implementation of two-phase modulation are shown. In FIG. 6, a solid line 801u, a broken line 801v and a one-bar one-dot line 801w represent the U-phase voltage waveform, the V-phase voltage waveform and the W-phase voltage waveform respectively in the time of implementation of two-phase modulation. The lateral axis of the graph in FIG. 6 is the phase θ. In the time of implementation of two-phase modulation, because it is possible to boost a line-to-line voltage (e.g., the voltage across the terminals 12u and 12w in FIG. 1) to the DC voltage $V_{dc}$, it becomes possible to apply a voltage larger than a voltage in the time of three-phase modulation to the motor 1.

A circle 811 in FIG. 5 represents a voltage vector locus of the motor voltage $V_a$ on the α β coordinate system in the time of implementation of two-phase modulation. Specifically, the voltage vector locus 811 represents a voltage vector locus in the time the magnitude of the motor voltage $V_a$ is maximized. In other words, the voltage vector locus 811 is a voltage vector locus that is obtained when the amplitudes of $v_{u1}^*$, $v_{v1}^*$ and $v_{w1}^*$ are set to $(\frac{1}{2}) \cdot V_{dc}$. Like the voltage vector locus 810, the voltage vector locus 811 also depicts a circle around the center that matches with the origin on the α β coordinate system, and the radius of the circle is $1/(\sqrt{2}) \times V_{dc}$. For example, the α-axis voltage $v_\alpha$ is maximized at the time $(v_u, v_v, v_w) = (\sqrt{3}/2 \cdot V_{dc}, 0, 0)$, and the α-axis voltage $v_\alpha$ at that time is $1/(\sqrt{2}) \times V_{dc}$ obtained from the above equation (A-1).

It is also possible to employ a modulation system called hip modulation in the inverter 2. In hip modulation, the phase voltages of the U phase, the V phase and the W phase in the time of three-phase modulation are shifted toward the low-voltage side by an average voltage of the maximum-phase voltage and the minimum-phase voltage in the time of three-phase modulation. Representing the command values of $v_u$, $v_v$ and $v_w$ in the time of three-phase modulation by $v_{u1}{}^*$, $v_{v1}{}^*$ and $v_{w1}{}^*$, and the command values of $v_u$, $v_v$ and $v_w$ in the time of hip modulation by $v_{u3}{}^*$, $v_{v3}{}^*$ and $v_{w3}{}^*$, the relational equations (A-6) to (A-8) are met among them. Here, max $(v_{u1}{}^*, v_{v1}{}^*, v_{w1}{}^*)$ represents a voltage value of the maximum phase, that is, the maximum value of $v_{u1}{}^*$, $v_{v1}{}^*$ and $v_{w1}{}^*$.

$$v_{u3}^* = v_{u1}^* - \frac{1}{2}(\max(v_{u1}^*, v_{v1}^*, v_{w1}^*) + \min(v_{u1}^*, v_{v1}^*, v_{w1}^*)) \quad \text{(A-6)}$$

$$v_{v3}^* = v_{v1}^* - \frac{1}{2}(\max(v_{u1}^*, v_{v1}^*, v_{w1}^*) + \min(v_{u1}^*, v_{v1}^*, v_{w1}^*)) \quad \text{(A-7)}$$

$$v_{w3}^* = v_{w1}^* * - \frac{1}{2}(\max(v_{u1}^*, v_{v1}^*, v_{w1}^*) + \min(v_{u1}^*, v_{v1}^*, v_{w1}^*)) \quad \text{(A-8)}$$

Like in the time of two-phase modulation, also in the time of implementation of hip modulation, because it is possible to boost a line-to-line voltage (e.g., the voltage across the terminals 12*u* and 12*w* in FIG. 1) to the DC voltage $V_{dc}$, it becomes possible to apply a voltage larger than a voltage in the time of three-phase modulation to the motor 1. It is also possible to obtain the same effect as in the modulation that follows the equations (A-6) to (A-8) by adding half of the voltage of the intermediate phase in the time of three-phase modulation to the phase voltages of the U phase, the V phase and the W phase in the time of three-phase modulation.

A voltage whose voltage vector locus depicts a circle on a fixed coordinate system such as the α β coordinate system like the voltage vector loci 810, 811 is called a rotation voltage. In a case where a rotation voltage is applied to the motor 1, the maximum value $V_{max1}$ of the magnitudes of voltage vectors of the motor voltage $V_a$ is $1/(\sqrt{2}) \times V_{dc}$ obtained from the equation (A-9) (also see FIG. 5).

$$V_{max1} = \frac{1}{\sqrt{2}} V_{dc} \quad \text{(A-9)}$$

However, it is also possible to apply the motor voltage $V_a$ that has a magnitude exceeding $V_{max1}$ to the motor 1. Modulation for applying the motor voltage $V_a$ that has a magnitude exceeding $V_{max1}$ to the motor 1 is called overmodulation.

Figure 7:
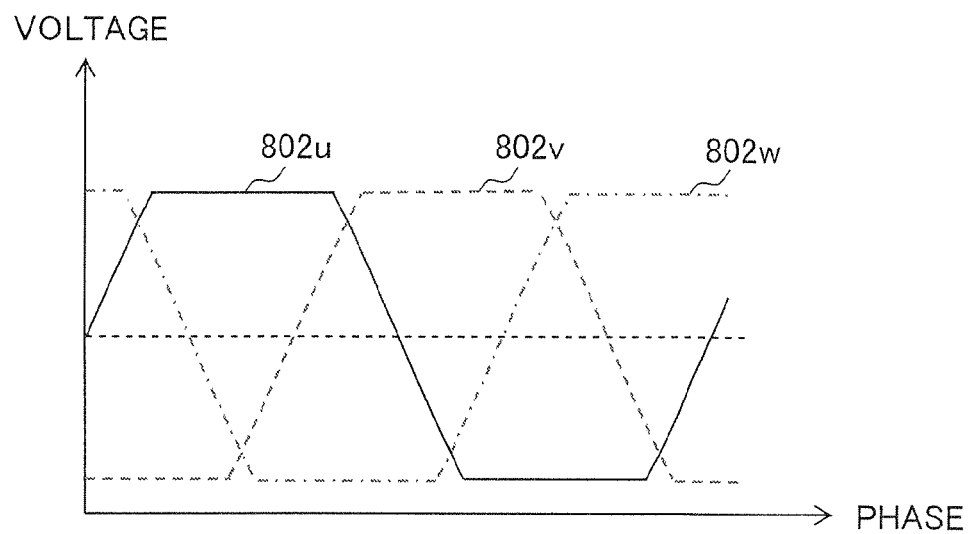
FIG. 7 is a view showing U-phase, V-phase and W-phase voltage waves when overmodulation is applied to three-phase modulation.

In FIG. 7, phase-voltage waveforms in a case where overmodulation is used for three-phase modulation are shown. In this case, the respective phase-voltage waveforms that are applied to the motor 1 become waveforms similar to polygonal-shape waveforms which are obtained by putting truncating upper and lower limits onto a sinusoidal wave. In FIG. 7, a solid line 802*u*, a broken line 802*v* and a one-bar one-dot line 802*w* represent the U-phase voltage waveform, the V-phase voltage waveform and the W-phase voltage waveform respectively in the time overmodulation is used for three-phase modulation. The lateral axis of the graph in FIG. 7 is the phase θ. As is well known, overmodulation is usable not only for three-phase modulation but also for other modulation such as two-phase modulation, hip modulation and the like.

A hexagon 812 in FIG. 5 represents a voltage vector locus of the motor voltage $V_a$ on the α β coordinate system in the time of implementation of overmodulation. The hexagon 812 is a regular hexagon with respect to the center that matches with the origin on the α β coordinate system, and opposite two of the six vertexes that form the hexagon fall on the α axis. The other four vertexes separately reside in one of the first to fourth quadrants on the α β coordinate system. The hexagon 812 is symmetrical with respect to the α axis, that is, the symmetry axis and also symmetrical with respect to the β axis, that is, the symmetry axis. When overmodulation is used for three-phase modulation, the α-axis voltage $v_\alpha$ is maximized at the time $(v_u, v_v, v_w) = (\frac{1}{2} \cdot V_{dc}, -\frac{1}{2} \cdot V_{dc}, -\frac{1}{2} \cdot V_{dc})$, and the α-axis voltage $v_a$ at that time is $(\sqrt{(2/3)}) \times V_{dc}$ obtained from the above equation (A-1). When overmodulation is used for two-phase modulation, the α-axis voltage $v_\alpha$ is maximized at the time $(v_u, v_v, v_w) = (V_{dc}, 0, 0)$, and the α-axis voltage $v_\alpha$ at that time is $(\sqrt{(2/3)}) \times V_{dc}$ obtained from the above equation (A-1). Also when overmodulation is used for hip modulation, the maximum value of the α-axis voltage $v_\alpha$ is $(\sqrt{(2/3)}) \times V_{dc}$.

As described above, when overmodulation is used, the maximum value $V_{max2}$ of the magnitudes of voltage vectors that are able to be output as the motor voltage $V_a$ is ($\sqrt{(2/3)}) \times V_{dc}$ as indicated by the equation (A-10).

$$V_{max2} = \sqrt{\frac{2}{3}} V_{dc} \quad \text{(A-10)}$$

[Voltage Command Vector and ab Axis]

Figure 8:
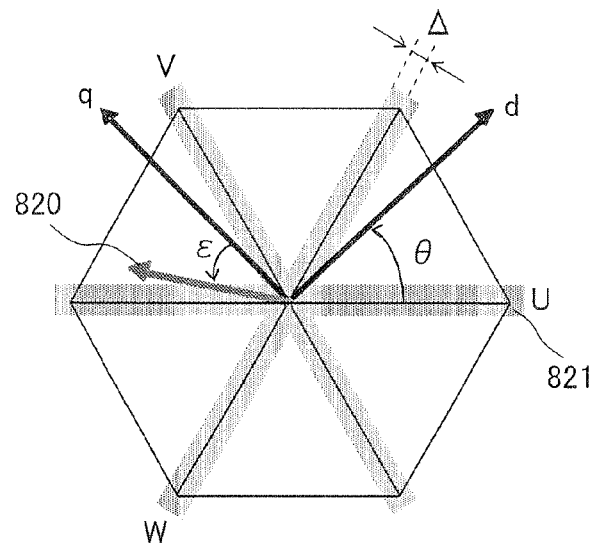
FIG. 8 is a space vector view showing a relationship among U-phase, V-phase and W-phase axes that are fixed axes, d and q axes that are rotation axes, and a voltage command vector.

FIG. 8 shows a space vector view showing a relationship among the U-phase axis, the V-phase axis and the W-phase axis that are fixed axes, the d axis and the q axis that are rotation axes, and a voltage command vector. A vector 820 is a voltage command vector. The phase of the voltage command vector 820 seen from the q axis is represented by ε. In this case, the phase of the voltage command vector 820 with respect to the U-phase axis is represented by (θ+ε+π/2). A value for specifying a voltage to be applied to the motor 1 is prepared in the control apparatus 3. The voltage command vector 820 indicates the value by a vector. Although details are described later, the d-axis voltage command value $v_d{}^*$ and the q-axis voltage command value $v_q{}^*$ are calculated in the control apparatus 3, and the voltage command vector 820 is represented by $v_d{}^*$ and $v_q{}^*$ (a d-axis component and a q-axis component of the voltage command vector 820 are $v_d{}^*$ and $v_q{}^*$ respectively).

As shown in FIG. 1, in a case where the one-shunt current detection system is employed as a motor-current detection system, it is possible to detect the phase currents of the maximum and minimum phases of the U, V and W phases by sampling output signals (in other words, bus current values) from the current sensor 5 at proper timings. Because the sum of the phase currents of the U, V and W phases is 0, it is possible to calculate a phase current of the intermediate phase. However, in the principle of the one-shunt current detection system, if the voltage levels of the maximum and intermediate phases come close to each other, a difference between the pulse widths of PWM signals for the maximum and intermediate phases becomes small, and it becomes impossible to secure a necessary A/D conversion time and a convergence time of ringing (a current pulsation caused by switching); consequently, it becomes impossible to detect a phase current of the maximum phase from the bus current. Likewise, if the voltage levels of the minimum and intermediate phases come close to each other, it becomes impossible to detect a phase current of the minimum phase from the bus current. If the phase currents of two phases cannot be measured, it is impossible to obtain an instantaneous value of the motor current $I_a$.

Figure 9A:
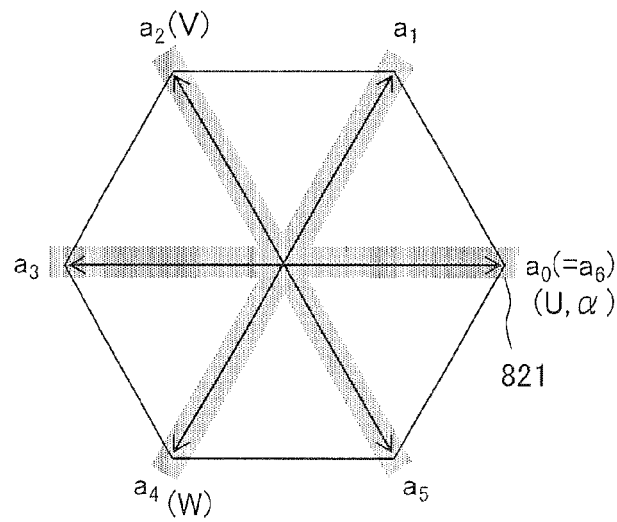
FIGS. 9A and 9B are views for explanation of an $a_n$ axis and a $b_n$ axis in an embodiment of the present invention.

In FIGS. 8 and 9A described later, a hatched asterisk-shape region 821 in the vicinity of the U-phase axis, the V-phase axis and the W-phase axis represents a region where the phase currents of two phases cannot be detected. For example, in a state where the V-phase voltage and the W-phase voltage are so close to each other that electric-current values of the two phases cannot be detected, the voltage command vector 820 is located in the vicinity of the U-phase axis; in a state where the U-phase voltage and the W-phase voltage are so close to each other that the electric-current values of the two phases cannot be detected, the voltage command vector 820 is located in the vicinity of the V-phase axis. As the foregoing, the region 821 where it is impossible to detect the phase currents of two phases exist for every 60 degrees in electrical angle with respect to the U-phase axis.

Figure 9B:
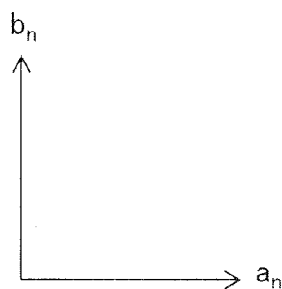

In the embodiment of the present invention, an $a_n$ (n: integer) axis is defined for the region 821 as shown in FIGS. 9A, 9B. The $a_n$ axis is an axis that is rotated from the α axis by $n\cdot\pi/3$. In FIG. 9A, $a_0$, $a_1$, $a_2$, $a_3$, $a_4$ and $a_5$ axes are shown as the $a_n$ axis. The $a_0$ axis is the same as the $a_6$ axis. A $b_n$ axis is an axis that is rotated from the β axis by $n\cdot\pi/3$. Accordingly, as shown in FIG. 9B, the $b_n$ axis is an axis that leads the $a_n$ axis by 90 degrees in phase. In other words, the $b_0$, $b_1$, $b_2$, $b_3$, $b_4$ and $b_5$ axes are axes that lead the $a_0$, $a_1$, $a_2$, $a_3$, $a_4$ and $a_5$ axes by 90 degrees in phase, respectively. The $b_0$ axis is the same as the $b_6$ axis.

The control apparatus 3 selects one of the $a_0$ to $a_5$ axes and sets the selected axis as the a axis and also selects one of the $b_0$ to $b_5$ axes and sets the selected axis as the b axis. The b axis leads the a axis by 90 degrees in phase. Accordingly, if the $a_0$ axis is set as the a axis, the $b_0$ axis is set as the b axis; if the $b_0$ axis is set as the b axis, the $a_0$ axis is set as the a axis (true with a case where n is a value other than 0).

The $a_n$ axis and the $b_n$ axis at the time n is equal to any one of 0, 1, 2, 3, 4 and 5 is collectively called an $a_n b_n$ axis; a coordinate system that selects the $a_n$ axis and the $b_n$ axis as the coordinate axes at the time n is equal to any one of 0, 1, 2, 3, 4 and 5 is called an $a_n b_n$ coordinate system. Besides, the a axis and the b axis are collectively called an ab axis; a coordinate system that selects the a axis and the b axis as the coordinate axes is called an ab coordinate system.

The ab axis is set depending on an angle (θ+ε) according to the phase of the voltage command vector 820 seen from the U-phase axis. In a first embodiment described later, of the $a_0$ to $a_5$ axes, the axis that is closest to the voltage command vector 820 is selected as the a axis; according to the selection result of the a axis, the b axis is selected from the $b_0$ to $b_5$ axes. On the other hand, in a second embodiment described later, of the $b_0$ to $b_5$ axes, the axis that is closest to the voltage command vector 820 is selected as the b axis; according to the selection result of the b axis, the a axis is selected from the $a_0$ to $a_5$ axes. In any case, the ab axis rotates in stepwise fashion for every 60 degrees in electrical angle as the voltage command vector 820 rotates (as the voltage command vector 820 changes in phase).

When a set of $a_n b_n$ axes is noticed, half of the thickness of the region 821 in a $b_n$-axis direction orthogonal to the $a_n$ axis is Δ (see FIG. 8). Δ is a threshold value at the boundary that draws a line between possibility and impossibility of detecting the phase currents of two phases by using the one-shunt current detection system and is set in advance taking a necessary A/D conversion time and a convergence time of ringing into account.

Hereinafter, first to fourth embodiments will be described as embodiments for which all or some of the items described above are used.

First Embodiment

Figure 10:
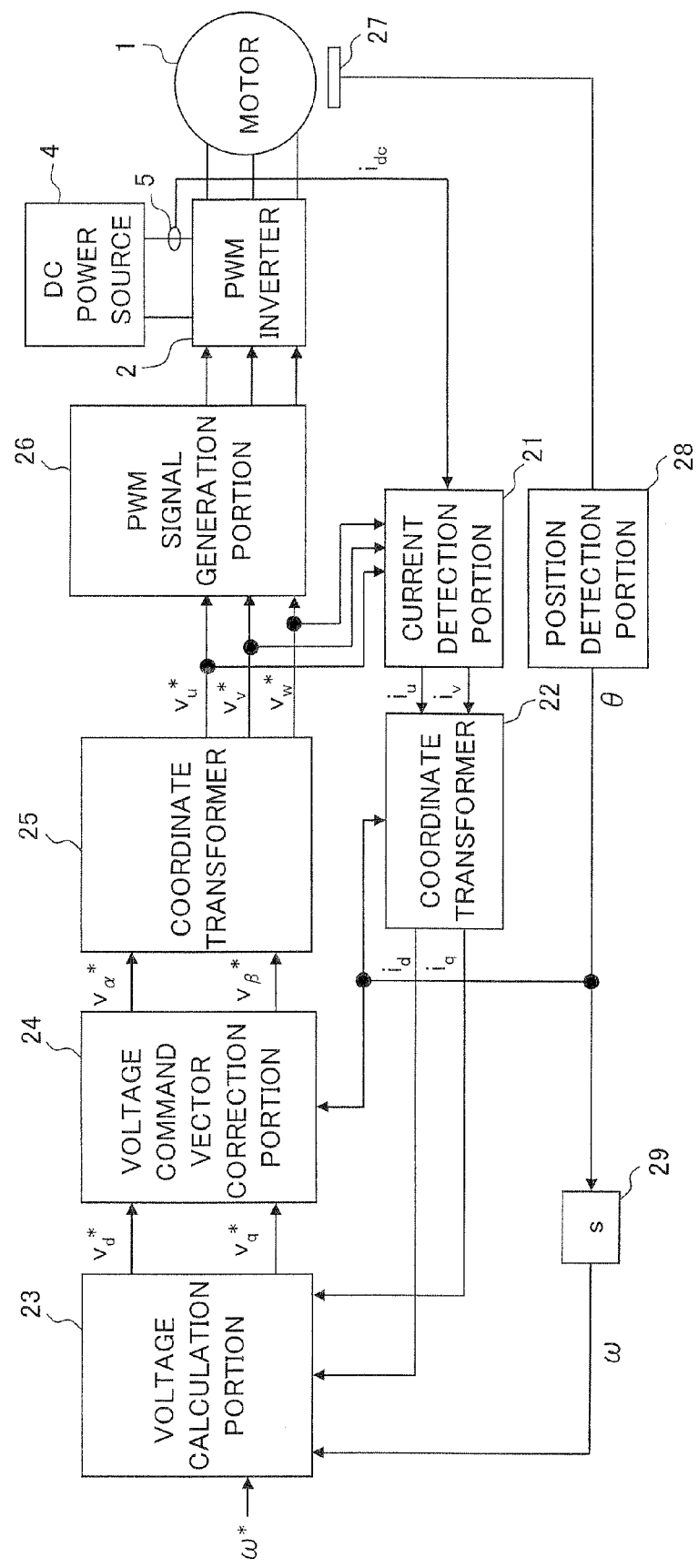
FIG. 10 is a block diagram showing a structure of a motor drive system according to an embodiment of the present invention.

First, a first embodiment of the present invention is described. FIG. 10 is a block diagram showing a structure of a motor drive system according to the first embodiment. In FIG. 10, the same portions as those shown in FIG. 1 are indicated by the same reference numbers.

The motor drive system shown in FIG. 10 includes: the motor 1, the inverter 2, the DC power source 4 and the current sensor 5. It also includes "a current detection portion 21, a coordinate transformer 22, a voltage calculation portion (voltage command vector generation portion) 23, a voltage command vector correction portion 24, a coordinate transformer 25, a PWM signal generation portion 26, a position sensor 27, a position detection portion 28 and a differentiator 29" that constitute the control apparatus 3 shown in FIG. 1. The current sensor 5 may also be included in the control apparatus 3.

The portions that constitute the motor drive system in FIG. 10 update command values ($v_d^*$, $v_q^*$ and the like) and state amounts ($i_d$, $i_q$, θ, ω and the like) that the portions calculate (or detect) and output by themselves at predetermined update periods and perform necessary calculations by using the latest values.

The position sensor 27 is a rotary encoder or the like, which provides the position detection portion 28 with a signal depending on a magnetic pole position θ of the rotor 6 of the motor 1. The position detection portion 28 detects the magnetic pole position θ based on an output signal from the position sensor 27. The differentiator 29 differentiates the magnetic pole position θ to calculate and output the rotation speed ω.

As described above, the current sensor 5 detects the bus current and outputs a signal that indicates an electric-current value of the bus current. The bus current is represented by $i_{dc}$. The output signal form the current sensor 5 is transmitted to the current detection portion 21. The current detection portion 21 identifies which one of the U, V and W phases is the maximum phase, the intermediate phase or the minimum phase based on the three-phase voltage command values $v_u^*$, $v_v^*$ and $v_w^*$ output from the coordinate transformer 25. Besides, based on the three-phase voltage command values $v_u^*$, $v_v^*$ and $v_w^*$, the current detection portion 21 decides sampling timings ST1 and ST2 for detecting the phase currents of the maximum phase and the minimum phase from the bus current and applies sampling to output signals (in other words, values of the bus current) from the current sensor 5 at the timings ST1 and ST2. Because the electric-current values of the bus currents detected at the timings ST1 and ST2 indicate the electric-current values of the phase currents of the minimum phase and the maximum phase, based on the detected electric-current values and the result that specifies which one of the U, V and W phases is the maximum phase, the intermediate phase or the minimum, the U-phase electric-current value $i_u$ and the V-phase electric-current value $i_v$ are calculated and output. Here, if necessary, a relational equation $i_u+i_v+i_w=0$ is used.

Based on the magnetic pole position θ, the coordinate transformer 22 transforms the U-phase electric-current value $i_u$ and the V-phase electric-current value $i_v$ into electric-current values on the dq axis to calculate the d-axis electric-current value $i_d$ and the q-axis electric-current value $i_q$.

The voltage calculation portion 23 is supplied from outside with a motor speed command value ω* as a command value for rotating the motor 1 (rotor 6) at a desired speed. In addition, the voltage calculation portion 23 is supplied with a rotation speed ω from the differentiator 29 and is supplied with the d-axis electric-current value $i_d$ and the q-axis electric-current value $i_q$ from the coordinate transformer 22. The voltage calculation portion 23 calculates a q-axis current command value $i_q^*$ that the q-axis electric-current value $i_q$ should follow based on a speed error (ω*−ω). For example, $i_q^*$ is so calculated by proportional integral control that (ω*−ω) converges to zero. In addition, the voltage calculation portion 23 refers to $i_q^*$ so as to calculate a d-axis current command value $i_d^*$ that the d-axis electric-current value $i_d$ should follow. For example, $i_d^*$ for achieving maximum-torque control is calculated. Then, the voltage calculation portion 23 so performs proportional integral control that the electric-current errors $(i_d^*-i_d)$ and $(i_q^*-i_q)$ converge to zero, and calculates and outputs a d-axis voltage command value $v_d^*$ that a d-axis voltage value $v_d$ should follow and a q-axis voltage command value $v_q^*$ that a q-axis voltage value $v_q$ should follow.

Based on $v_d^*$, $v_q^*$ and θ, the voltage command vector correction portion 24 corrects $v_d^*$ and $v_q^*$ through coordinate transformation, while the voltage vector correction portion 24 calculates and outputs an c-axis voltage command value $v_\alpha^*$ that an α-axis voltage value $v_\alpha$ should follow and a β-axis voltage command value $v_\beta^*$ that a β-axis voltage value $v_\beta$ should follow. The coordinate transformer 25 transforms the command values $v_\alpha^*$ and $v_\beta^*$ on the α β axes into command values on the U-phase, V-phase and W-phase axes to calculate the three-phase voltage command values $v_u^*$, $v_v^*$ and $v_w^*$.

Based on the three-phase voltage command values $v_u^*$, $v_v^*$ and $v_w^*$ from the coordinate transformer 25, the PWM signal generation portion 26 so generates PWM signals for the respective switching elements (arms) in the inverter 2 that the U-phase, V-phase and W-phase voltage values $v_u$, $v_v$ and $v_w$ become voltage values that depend on $v_u^*$, $v_v^*$ and $v_w^*$, respectively; and gives the generated PWM signals to the inverter 2. The inverter 2 controls the switching of the switching elements in the inverter 2 according to the given PWM signals, thereby applying U-phase, V-phase and W-phase voltages that depend on the three-phase voltage command values $v_u^*$, $v_v^*$ and $v_w^*$ to the motor 1. Thus, the motor current $I_a$ depending on the three-phase voltage command values $v_u^*$, $v_v^*$ and $v_w^*$ is supplied to the motor 1, so that torque is generated in the motor 1.

Figure 11:
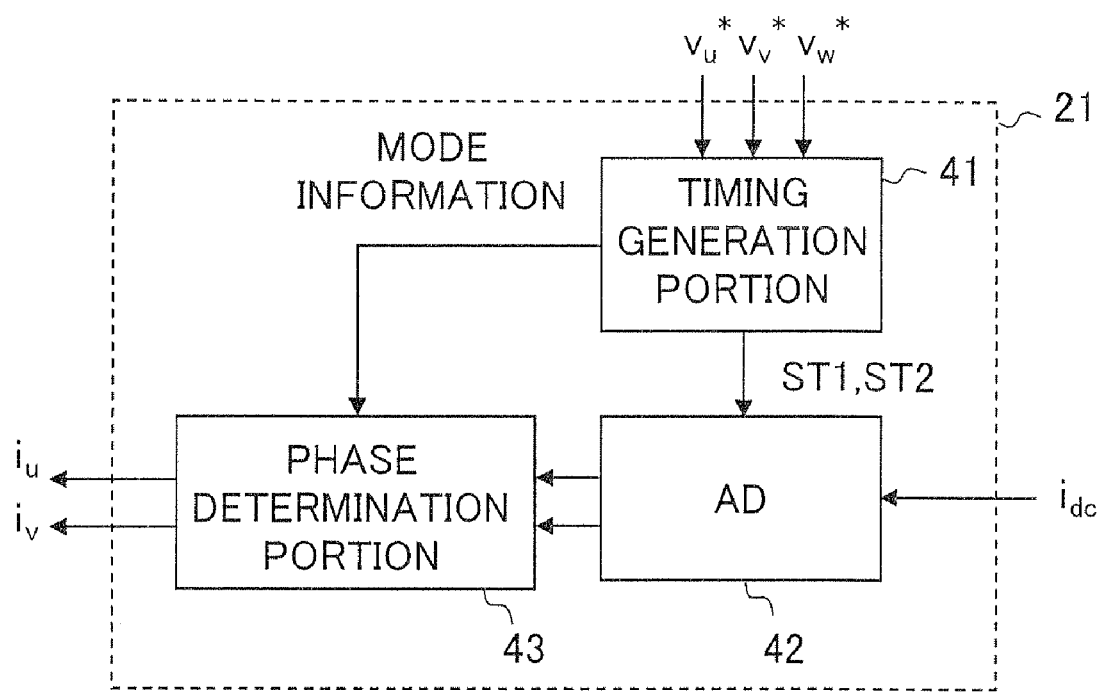
FIG. 11 is an internal block diagram of a current detection portion in FIG. 10.

FIG. 11 shows an inner block diagram of the current detection portion 21. The current detection portion 21 includes: a timing generation portion 41; an AD converter 42; and a phase determination portion 43. Based on a magnitude relationship among the three-phase voltage command values $v_u^*$, $v_v^*$ and $v_w^*$ output from the coordinate transformer 25, the timing generation portion 41 identifies which one of the U, V and W phases is the maximum phase, the intermediate phase or the minimum phase. There are six different combinations of the maximum phase, the intermediate phase and the minimum phase, and the six different combinations are called first to sixth modes, respectively. Based on the above magnitude relationship, the timing generation portion 41 identifies a mode to which the current time belongs while decides the sampling timings ST1 and ST2 taking the identified mode into account. Hereinafter, information that presents the mode to which the present time belongs is called "mode information."

The AD converter 42 samples output signals (analog output signals) from the current sensor 5 at each of the timings ST1 and ST2 to detect and output electric-current values of the bus current $i_{dc}$ at the timings ST1 and ST2 as digital values. The phase determination portion 43 refers to the mode information identified by the timing generation portion 41 so as to calculate the U-phase and V-phase electric-current values $i_u$ and $i_v$ from the output signal from the AD converter 42. Here, if necessary, the relational equation $i_u+i_v+i_w=0$ is used.

The $v_d^*$ and $v_q^*$ are target values of $v_d$ and $v_q$ for converging the speed error (ω*−ω), the current errors $(i_d^*-i_d)$ and $(i_q^*-i_q)$ to zero. The $v_d^*$ and $v_q^*$ generated by the voltage calculation portion 23 constitute the voltage command vector in the first embodiment. In other words, in the first embodiment, $v_d^*$ and $v_q^*$ generated by the voltage calculation portion 23 are the d-axis component and the q-axis component of the voltage command vector 820 in FIG. 8, respectively. If a voltage depending on this voltage command vector is applied to the motor 1 as it is, the actual voltage values $v_d$ and $v_q$ match with the command values $v_d^*$ and $v_q^*$, respectively. However, the voltage command vector generated by the voltage calculation portion 23 may be corrected by the voltage command vector correction portion 24.

For convenience, the voltage command vector before correction that is generated by the voltage calculation portion 23 is called a first voltage command vector; and the voltage command vector after correction that is generated by correction to the first voltage command vector performed by the voltage command vector correction portion 24 is called a second voltage command vector. In the first embodiment, a d-axis component and a q-axis component of the first voltage command vector are $v_d^*$ and $v_q^*$ generated by the voltage calculation portion 23; and an α-axis component and a β-axis component of the second voltage command vector are $v_\alpha^*$ and $v_\beta^*$ output from the voltage command vector correction portion 24.

[Correction to Voltage Command Vector]

Figure 12:
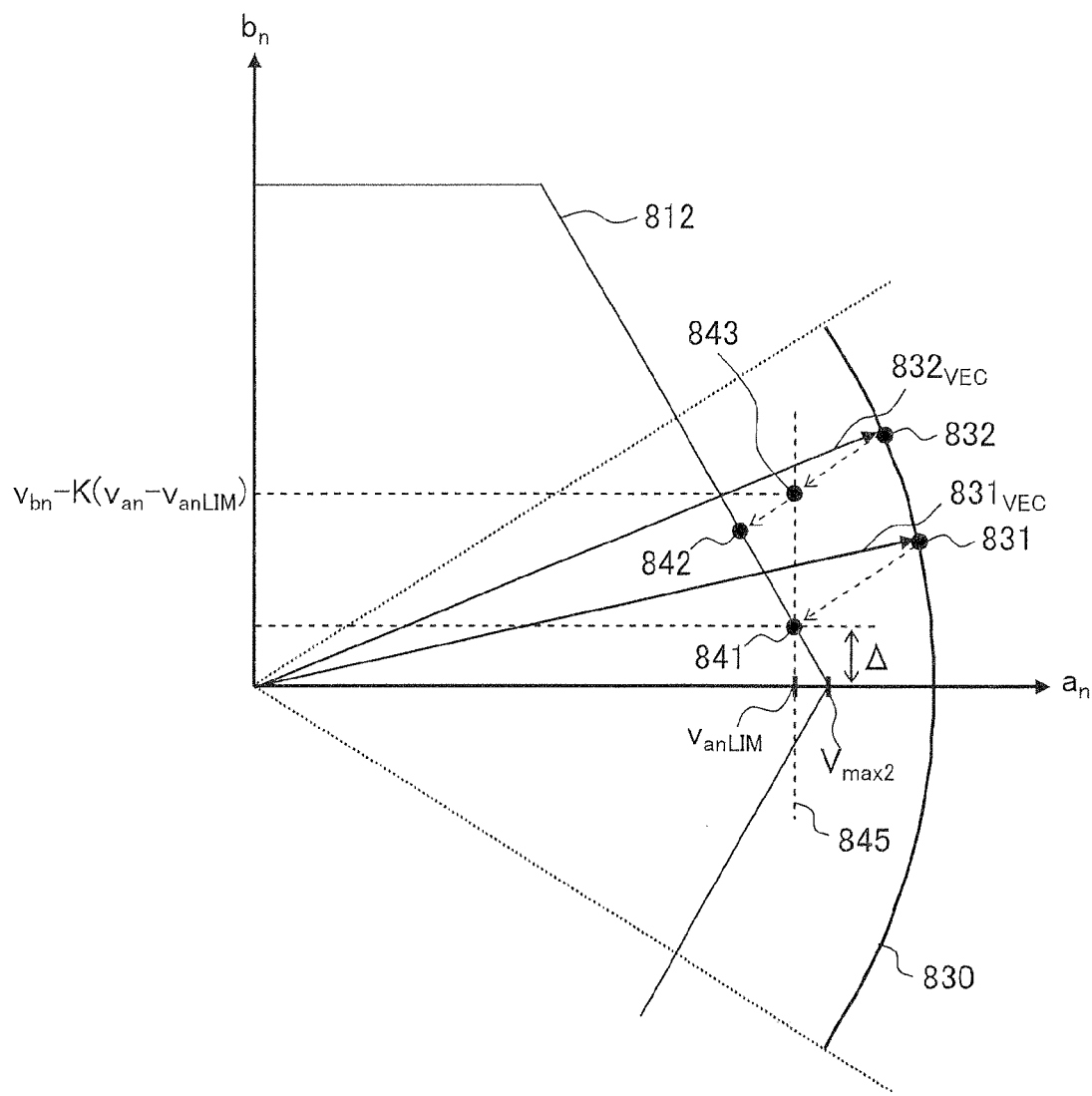
FIG. 12 is a view for explanation of a correction principle of a voltage command vector in the first embodiment of the present invention.

The principle of correction to a voltage command vector by the voltage command vector correction portion 24 is described. The $v_d^*$ and $v_q^*$ are so prepared that the first voltage command vector depicts a circle locus on the α β coordinate system. In other words, the voltage specified by $v_d^*$ and $v_q^*$ is a rotation voltage. On the other hand, if it is necessary to apply a high voltage to the motor 1, overmodulation is used. In FIG. 12, a locus 830 of the first voltage command vector on the $a_n b_n$ coordinate system in the time of implementation of overmodulation is shown. The locus 830 on the $a_n b_n$ coordinate system is an arc of a circle that has a radius of $\sqrt{(v_d^{*2}+v_q^{*2})}$ around the center that matches with the origin on the $a_n b_n$ coordinate system. The central angle of the arc is π/3 and the arc is symmetrical with respect to the $a_n$ axis, that is, the symmetry axis.

In FIG. 12, a bent line 812 is part of the hexagon 812 in FIG. 5. On the $a_n b_n$ coordinate system, all or part of the locus 830 of the first voltage command vector in the time of implementation of overmodulation is situated outside the hexagon 812. As described above, the maximum value $V_{max2}$ of the magnitudes of voltage vectors that are able to be output as the motor voltage $V_a$ is $(\sqrt{(2/3)})\times V_{dc}$ as indicated by the equation (A-10) (also see FIG. 5). Because the inverter 2 is unable to output a voltage vector that has a magnitude larger than the maximum value $V_{max2}$, it is necessary to correct the first voltage command vector on a stage.

Also, there is a method (hereinafter, called the simple limit method), in which the first voltage command vector is given to the coordinate transformer 25 in FIG. 10 and a limit is put on an obtained three-phase voltage command vector (a limit is put on the pulse width of a PWM signal on a generation stage of the PWM signal), thus the magnitude of an applied voltage vector to the motor is limited to be equal to or smaller than the maximum value $V_{max2}$. However, in this simple limit method, there is a problem that it is sometimes impossible to secure a difference between the pulse widths of the maximum phase and the intermediate phase and a difference between the pulse widths of the intermediate phase and the minimum phase that allow the phase currents of two phases to be detected from the bus current.

In light of this, the voltage command vector correction portion 24 corrects the first voltage command vector by putting a limit on the $a_n$-axis component of the first voltage command vector (or on the a-axis component of the first voltage command vector if the $a_n$ axis is the a axis) to generate the first voltage command vector after the correction as the second voltage command vector. Specifically, if the $a_n$-axis component $v_{an}$ of the first voltage command vector exceeds the upper limit $v_{anLIM}$ defined by the following equation, $v_{an}$ is corrected to decrease to be equal to $v_{anLIM}$.

$$v_{anLIM} = V_{max2} - \frac{\Delta}{\sqrt{3}}$$

Noticing detection only of the phase currents of two phases, it is unnecessary to correct the $b_n$-axis component $v_{bn}$ of the first voltage command vector; however, to use overmodulation positively (to output a high voltage to the motor 1), it becomes necessary to correct the $b_n$-axis component $v_{bn}$. In other words, as shown in FIG. 12, necessary is a function to so correct the $b_n$-axis component $v_{bn}$ that points 831 and 832 on the locus 830 which are situated outside the hexagon 812 move to points 841 and 842 on the hexagon 812 respectively. In FIG. 12, vectors $831_{VEC}$ and $832_{VEC}$ are the first voltage command vectors that have their respective points 831 and 832 as the end points. Points 841 and 842 represent the points where the end points of the voltage command vectors after correction should be situated.

A straight line 845 in FIG. 12 is a straight line that passes through a point which meets $(v_{an}, v_{bn})=(v_{anLIM}, 0)$ and is parallel to the $b_n$ axis on the $a_n b_n$ coordinate system. The point 841 is a point on the straight line 845, but the point 842 is not a point on the straight line 845. A voltage command vector corresponding to the point 842 may be so obtained directly that the end point of a voltage command vector after correction matches with the point 842; however, in this case, the amount of calculations increases. To avoid this, so that the end point of a voltage command vector after correction (in other words, the second voltage command vector) matches with a point 843, the voltage command vector correction portion 24 corrects the $a_n$-axis component $v_{an}$ and the $b_n$-axis component $v_{bn}$ of the first voltage command vector $832_{VEC}$. The point 843 is a point on the straight line 845. Correction to the voltage command vector from the point 843 to the point 842 is performed in a process where a PWM signal is generated from the second voltage command vector.

In practical use, a value $v_{bno}$ that meets the equation (B-1) when $v_{an} > v_{anLIM}$ and the $b_n$-axis component $v_{bn}$ of the first voltage command vector is positive is defined, then $v_{an}$ and $v_{bn}$ may be corrected according to the following conditional equation (B-2). Also when the $b_n$-axis component $v_{bn}$ is negative, it is possible to correct $v_{an}$ and $v_{bn}$ by using the same algorithm.

$$v_{bno} = v_{bn} - K(v_{an} - v_{anLIM}) \quad \text{(B-1)}$$
if $v_{bno} \leq \Delta$ then
$$v_{an} = V_{anLIM}, v_{bn} = \Delta \quad \text{(B-2)}$$
if $v_{bno} > \Delta$ then
$$v_{an} = V_{anLIM}, v_{bn} = v_{bno}$$

Here, the coefficient K is a predetermined value equal to or larger than $1/\sqrt{3}$. When $K=1/\sqrt{3}$, the straight line that connects the point 831 and the point 841, and the straight line that connects the point 832, the point 843 and the point 842 are orthogonal to an edge of the hexagon 812 on which the point 841 and the point 842 are situated. The importance of setting K to $1/\sqrt{3}$ or larger is described with reference to FIGS. 13 to 15.

Figure 13:
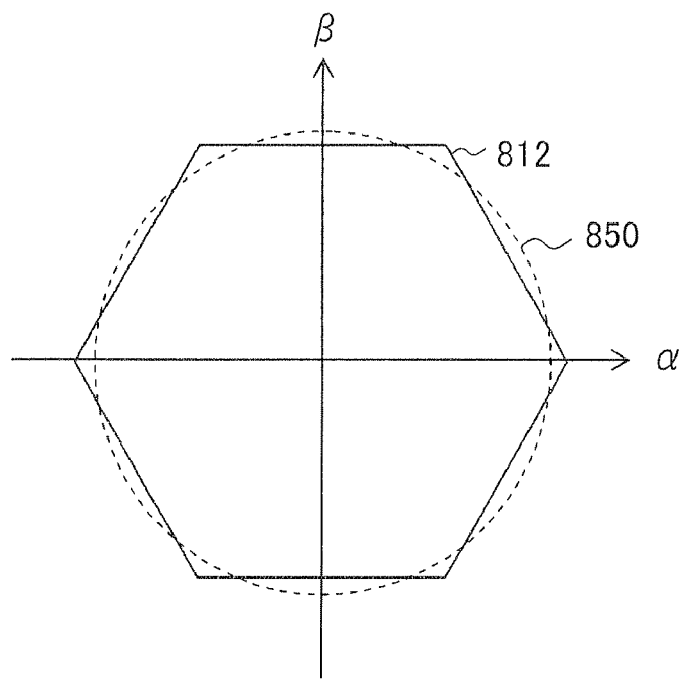
FIG. 13 is a view showing an applied-voltage vector locus to a motor and a fundamental-voltage vector locus corresponding to the applied-voltage vector when overmodulation is used.

The magnitude of the first voltage command vector is represented by $|v^*|$ and the magnitude of the fundamental wave of an applied voltage vector is represented by $|v|$. An applied voltage vector indicates a vector of a voltage that is actually applied to the motor 1. An applied voltage vector refers to an output voltage vector from the inverter 2 that indicates an output voltage from the inverter 2 by a vector. When an applied voltage vector does not depict a circle on the $\alpha$ $\beta$ coordinate system (in other words, a voltage that is actually applied to the motor 1 is not a rotation voltage), the applied voltage vector is a vector that is obtained by adding a higher-harmonic voltage vector to the fundamental-wave voltage vector that depicts a circle on the $\alpha$ $\beta$ coordinate system. A circle 850 in FIG. 13 is a locus of the fundamental-wave voltage vector in the time a voltage vector that depicts the hexagon 812 on the $\alpha$ $\beta$ coordinate system under overmodulation is applied to the motor 1. The magnitude of this fundamental-wave voltage vector is $|v|$.

The ratio of the magnitude $|v^*|$ of the first voltage command vector to the maximum value $V_{max1}$ (see the above equation (A-9)) of the magnitudes of voltage vectors that are able to be applied as a rotation voltage is called a modulation rate. If the modulation rate is represented by $K_{v*}$, $K_{v*}$ is represented by the following equation (B-3). Besides, the ratio of the magnitude $|v|$ to the maximum value $V_{max1}$ is called a voltage use rate. If the voltage use rate is represented by $K_v$, $K_v$ is represented by the following equation (B-4). PWM (pulse-width modulation) that is performed at a modulation rate larger than 1 is called overmodulation PWM. The maximum value of voltage use rates is about 1.104.

$$K_{V^*} = \frac{|v^*|}{V_{max1}} = \frac{\sqrt{2} \cdot |v^*|}{V_{dc}} \quad \text{(B-3)}$$

$$K_V = \frac{|v|}{V_{max1}} = \frac{\sqrt{2} \cdot |v|}{V_{dc}} \quad \text{(B-4)}$$

Figure 14:
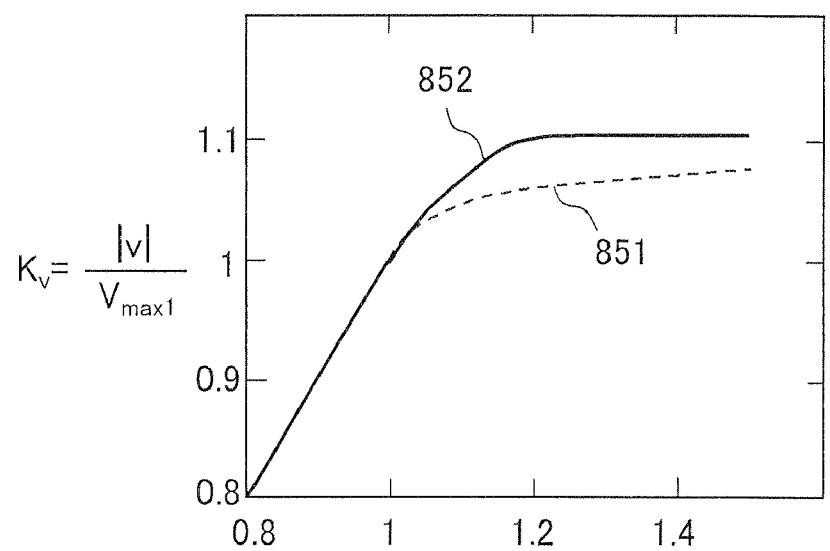
FIG. 14 is a view showing a relationship between a modulation rate and a voltage use rate in the first embodiment of the present invention.
Figure 15:
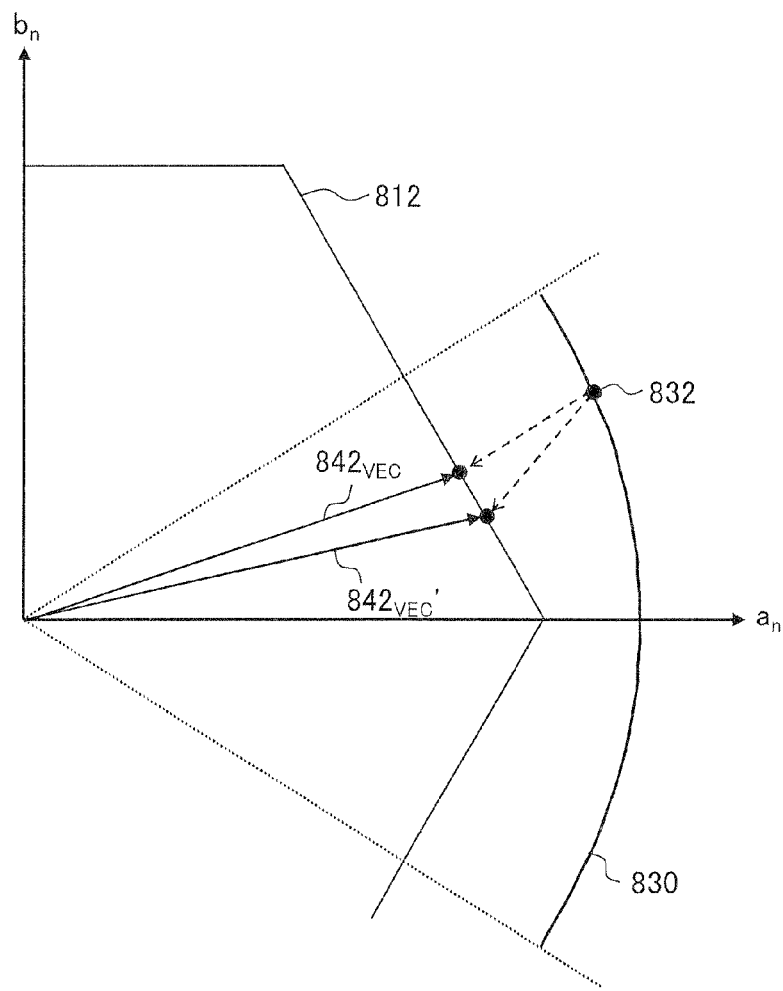
FIG. 15 is a view for explanation of a correction principle of a voltage command vector in the first embodiment of the present invention.

In FIG. 14, a relationship between the modulation rate $K_{v*}$ and the voltage use rate $K_v$ is shown. In a domain $K_{v*} \leq 1$, linearity between $K_{v*}$ and $K_v$ is maintained. However, in an overmodulation domain that meets $K_{v*} > 1$, this linearity is lost. A curve 851 in the overmodulation domain shows a relationship between $K_{v*}$ and $K_v$ in the time the coefficient K is set to $1/\sqrt{3}$. When the coefficient K is set to $1/\sqrt{3}$, the voltage use rate $K_v$ reaches the maximum value (about 1.104) when $K_{v*} \to \infty$. Also when the above simple limit method rather than correction to a voltage command vector by the voltage command vector correction portion 24 is used, the relationship between $K_{v^*}$ and $K_v$ matches with the curve 851 in the overmodulation domain.

A large difference between the magnitude |v*| of the first voltage command vector and the magnitude |v| of the fundamental wave of an applied voltage vector means that there is a large difference between a voltage specified by the control apparatus 3 and an actual applied voltage. If such a large difference exists, controllability of the motor 1 deteriorates. Accordingly, it is desirable to set the coefficient K to a value larger than $1/\sqrt{3}$.

When $K>1/\sqrt{3}$, the $b_n$-axis component of the first voltage command vector is corrected more significantly than in the time $K=1/\sqrt{3}$. Using the condition $K=1/\sqrt{3}$ as a reference in the example in FIG. 12, if K is set to a value lager than $1/\sqrt{3}$, the point 843 to which the point 832 should go advances toward the $a_n$-axis side along the straight line 845; accordingly, the point 842 (the end point of an applied voltage vector) to which the point 832 should go advances toward the $\alpha_n$-axis side along an edge of the hexagon 812. Accordingly, in the overmodulation domain, when $K>1/\sqrt{3}$, the magnitude of the applied voltage vector increases compared in the time $K=1/\sqrt{3}$. This is also understood from comparison of an applied voltage vector $842_{VEC}$ corresponding to $K=1/\sqrt{3}$ and an applied voltage vector $842_{VEC}'$ corresponding to $K>1/\sqrt{3}$ shown in FIG. 15. Because the end point of the applied voltage vector $842_{VEC}'$ is closer to the $a_n$ axis than the end point of the applied voltage vector $842_{VEC}$, the magnitude of the applied voltage vector $842_{VEC}'$ is larger than the magnitude of the applied voltage vector $842_{VEC}$.

In the overmodulation domain, when $K>1/\sqrt{3}$, because the magnitude of the applied voltage vector increases compared with that in the time $K=1/\sqrt{3}$, if the coefficient K is set to a value larger than $1/\sqrt{3}$, the linearity between $K_{v^*}$ and $K_v$ is improved in the overmodulation domain. In FIG. 14, a curve 852 in the overmodulation domain represents a relationship between $K_{v^*}$ and $K_v$ in the case where the above coefficient K is set to a value lager than $1/\sqrt{3}$. As in the foregoing, by setting $K>1/\sqrt{3}$, the difference between a voltage specified by the control apparatus 3 and an actual applied voltage becomes small in the overmodulation domain, so that deterioration of the controllability in the overmodulation domain is curbed.

[Specific Correction Technique and Structure]

Figure 16:
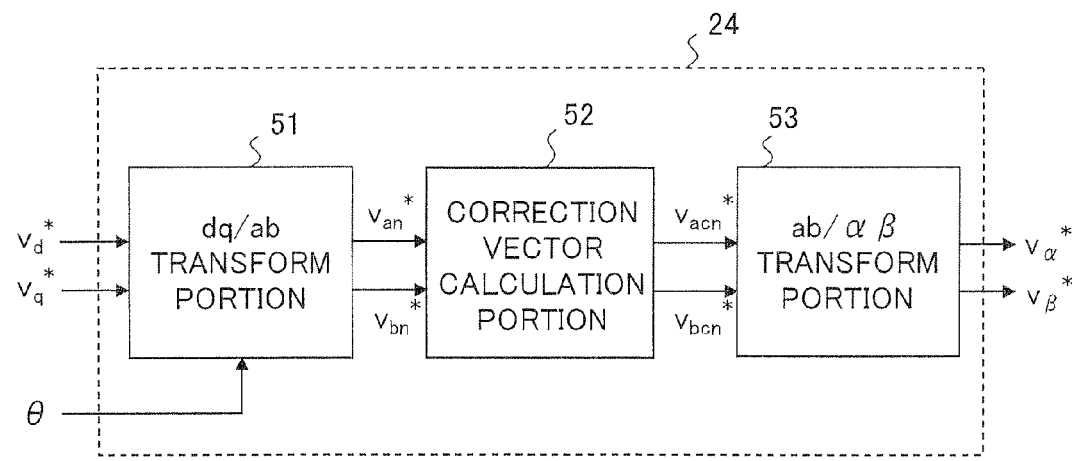
FIG. 16 is an internal block diagram of a voltage command vector correction portion in FIG. 10.
Figure 17:
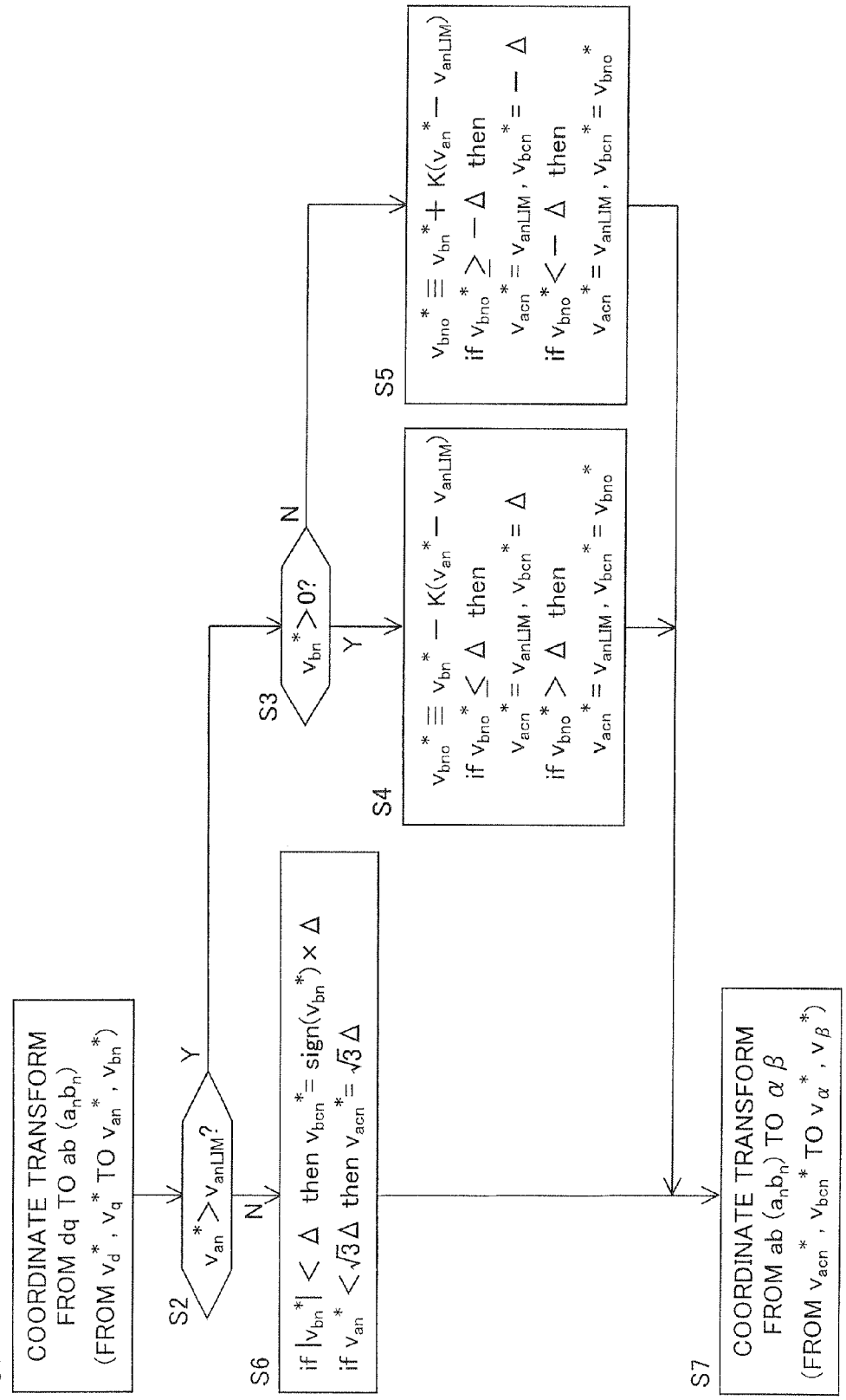
FIG. 17 is a flow chart showing an operation flow of the voltage command vector correction portion in FIG. 10.

A structure and operation of the voltage command vector correction portion 24 based on the above correction principle are described specifically. FIG. 16 is an internal block diagram of the voltage command vector correction portion 24. FIG. 17 is a flow chart showing an operation flow of the voltage command vector correction portion 24. The voltage command vector correction portion 24 includes portions indicated by reference numbers 51 to 53. The process in the step S1 is implemented by a dq/ab transform portion 51, the process in the steps S2 to S6 is implemented by a correction vector calculation portion 52, and the process in the step S7 is implemented by an ab/α β transform portion 53.

First, in the step S1, based on the magnetic pole position θ from the position detection portion 28, the dq/ab transform portion 51 transforms the voltage command values $v_d^*$ and $v_q^*$ on the dq axis given from the voltage calculation portion 23 in FIG. 10 into the voltage command values $v_{an}^*$ and $v_{bn}^*$ on the $a_n b_n$ axis that should be set as the ab axis.

As described above, in the first embodiment, of the $a_0$ to $a_5$ axes, the axis that is closest to the first voltage command vector is selected as the a axis, and the b axis is selected according to the selection result. Accordingly, in the first embodiment, the quotient obtained by dividing $(\theta+\epsilon+2\pi/3)$ by $\pi/3$ becomes a value of the variable n, and the $a_n$ axis that has the quotient as the value of n is selected as the a axis (see FIG. 8). Of the $a_0$ to $a_5$ axes, the selected a axis is the axis that has a phase (phase seen from the U-phase axis) closest to the phase $(\theta+\epsilon+\pi/2)$ of the first voltage command vector seen from the U-phase axis.

Figure 18:
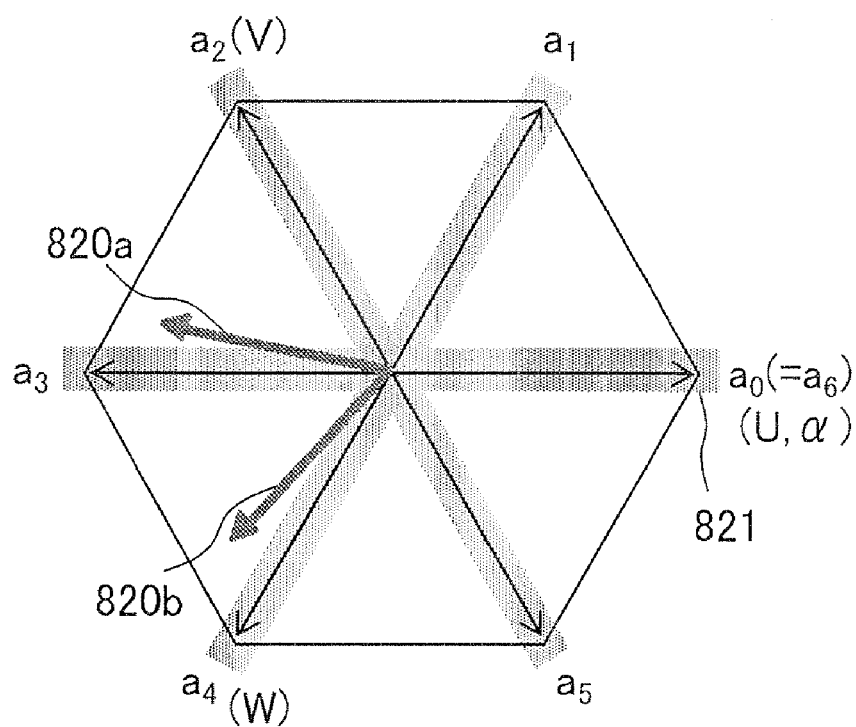
FIG. 18 is a view for explanation of a method for selecting an a axis from $a_0$ to $a_5$ axes in the first embodiment of the present invention.

The first voltage command vector rotates on the α β coordinate system together with rotation of the rotor 6 of the motor 1; and for example, when a vector 820a in FIG. 18 is the first voltage command vector, the $a_3$ axis and the $b_3$ axis are selected as the a axis and the b axis, and $v_{a3}^*$ and $v_{b3}^*$ are calculated as the voltage command values $v_{an}^*$ and $v_{bn}^*$ on the $a_n b_n$ axis; when a vector 820b in FIG. 18 is the first voltage command vector, the $a_4$ axis and the $b_4$ axis are selected as the a axis and the b axis, and $v_{a4}^*$ and $v_{b4}^*$ are calculated as the voltage command values $v_{an}^*$ and $v_{bn}^*$ on the $a_n b_n$ axis.

The variable n in the first embodiment is represented by $n_A$ to distinguish it from the variable n in a second embodiment described later. The dq/ab transform portion 51 obtains a value of n $(=n_A)$ by dividing $(\theta+\epsilon+2\pi/3)$ by $\pi/3$, and uses the obtained value n to obtain an angle $\theta_n$ according to the following equation (B-5); then, transforms $v_d^*$ and $v_q^*$ into $v_{an}^*$ and $v_{bn}^*$ according to the equation (B-6). The value of n $(=n_A)$ obtained by the dq/ab transform portion 51 is also used for coordinate transform operation implemented by the ab/α β transform portion 53. Besides, the phase $\epsilon$ is obtained from $\epsilon=\tan^{-1}(-v_d^*/v_q^*)$.

$$\theta_n = \theta - \frac{n\pi}{3}, (n = n_A) \quad (B\text{-}5)$$

$$\begin{pmatrix} v_{an}^* \\ v_{bn}^* \end{pmatrix} = \begin{bmatrix} \cos\theta_n & -\sin\theta_n \\ \sin\theta_n & \cos\theta_n \end{bmatrix} \begin{pmatrix} v_d^* \\ v_q^* \end{pmatrix} \quad (B\text{-}6)$$

By implementing the processes in the steps S2 to S6, the correction vector calculation portion 52 corrects $v_{an}^*$ and $v_{bn}^*$ given from the dq/ab transform portion 51 and outputs the voltage command values $v_{acn}^*$ and $v_{bcn}^*$ on the $a_n b_n$ axis after the correction. The $v_{acn}^*$ and $v_{bcn}^*$ represent $v_{an}^*$ and $v_{bn}^*$ after the correction. It can be met that $v_{an}^*=v_{acn}^*$ and $v_{bn}^*=v_{bcn}^*$ depending on the values of $v_{an}^*$ and $v_{bn}^*$.

Specifically, first, in the step S2, the command value $v_{an}^*$ before correction for the a-axis voltage and the upper limit $v_{anLIM}$ are compared with each other. If $v_{an}^*>v_{anLIM}$, the process moves to the step S3, further the command value $v_{bn}^*$ before correction for the b-axis voltage and 0 are compared with each other; if $v_{bn}^*>0$, the correction in the step S4 is implemented; on the other hand, if $v_{bn}^*\leq 0$, the correction in the step S5 is implemented. Besides, in the step S2, if $v_{an}^*\leq v_{anLIM}$, the process moves to the step S6, and the correction in the step S6 is implemented. The correction in the steps S4 and S5 is correction that corresponds to overmodulation.

In the correction in the step S4, the value $v_{bno}^*$ is defined according to "$v_{bno}^*=v_{bn}^*-K(v_{an}^*-v_{anLIM})$," then the $v_{bno}^*$ is compared with the predetermined threshold value Δ; if $v_{bno}^*\leq\Delta$ is met, $v_{acn}^*$ and $v_{bcn}^*$ are so obtained that $v_{acn}^*=v_{anLIM}$ and $v_{bcn}^*=\Delta$ are met; if $v_{bno}^*>\Delta$ is met, $v_{acn}^*$ and $v_{bcn}^*$ are so obtained that $v_{acn}^*=v_{anLIM}$ and $v_{bcn}^*=v_{bno}^*$ are met.

In the correction in the step S5, the value $v_{bno}^*$ is defined according to "$v_{bno}^*=v_{bn}^*+K(v_{an}^*-v_{anLIM})$," then the $v_{bno}^*$ is compared with the predetermined threshold value (-Δ); if $v_{bno}^*\geq -\Delta$ is met, $v_{acn}^*$ and $v_{bcn}^*$ are so obtained that $v_{acn}^* = v_{anLIM}$ and $v_{bcn}^* = -\Delta$ are met; if $v_{bno}^* < -\Delta$ is met, $v_{acn}^*$ and $v_{bcn}^*$ are so obtained that $v_{acn}^* = v_{anLIM}$ and $v_{bcn}^* = v_{bno}^*$ are met.

The correction in the step S6 is correction for making it possible to detect the phase currents of two phases by the one-shunt current detection system. The correction is the same as that disclosed in JP-A-2008-99542 and US Pub. No. 2008/061728 and EP Pub. No. 1898518 based on the JP-A-2008-99542 (hereinafter, collectively called the patent document 1). Specifically, in the correction in the step S6, the absolute value $|v_{bn}^*|$ of $v_{bn}^*$ is compared with the threshold value $\Delta$; if $|v_{bn}^*|$ is smaller than the threshold value $\Delta$ and $v_{bn}^*$ is positive (or zero), $v_{bcn}^*$ is so obtained that $v_{bcn}^* = \Delta$; if $|v_{bn}^*|$ is smaller than the threshold value $\Delta$ and $v_{bn}^*$ is negative, $v_{bcn}^*$ is so obtained that $v_{bcn}^* = -\Delta$. If the absolute value $|v_{bn}^*|$ is equal to or larger than the threshold value $\Delta$, $v_{bcn}^*$ is set to $v_{bn}^*$. Besides, in the correction in the step S6, further $v_{an}^*$ and $(\sqrt{3}) \times \Delta$ are compared with each other; if "$v_{an}^* < (\sqrt{3}) \times \Delta$" is met, $v_{acn}^*$ is so obtained that $v_{acn}^* = (\sqrt{3}) \times \Delta$ is met. If "$v_{an}^* < (\sqrt{3}) \times \Delta$" is not met, $v_{acn}^*$ is set to $v_{an}^*$.

The voltage command values $v_{acn}^*$ and $v_{bcn}^*$ on the $a_n b_n$ axis obtained by the correction in the step S4, S5 or S6 are transmitted to the $ab/\alpha\beta$ transform portion 53 in FIG. 16. In the step S7 following the step S4, S5 or S6, the $ab/\alpha\beta$ transform portion 53 performs coordinate transform to transform the voltage command values $v_{acn}^*$ and $v_{bcn}^*$ on the $a_n b_n$ axis into values on the $\alpha\beta$ axis, thereby calculating the voltage command values $v_\alpha^*$ and $v_\beta^*$ on the $\alpha\beta$ axis. This calculation is performed according to the following the equation (B-7). The variable n in the equation (B-7) is n ($=n_A$) obtained by the dq/ab transform portion 51.

$$\begin{pmatrix} v_\alpha^* \\ v_\beta^* \end{pmatrix} = \begin{bmatrix} \cos(n\pi/3) & -\sin(n\pi/3) \\ \sin(n\pi/3) & \cos(n\pi/3) \end{bmatrix} \begin{pmatrix} v_{acn}^* \\ v_{bcn}^* \end{pmatrix} \quad \text{(B-7)}$$

The $v_d^*$ and $v_q^*$ are subsequently updated at predetermined update periods, and at each update, the latest $v_\alpha^*$ and $v_\beta^*$ are obtained by the processes in the steps S1 to S7 which use the latest $v_d^*$ and $v_q^*$. Specifically, when $v_d^*$, $v_q^*$ $v_{an}^*$, $v_{bn}^*$, $v_{acn}^*$ and $v_{bcn}^*$ at the k-th update timing that are made discrete at the update periods are represented by $v_d^*(k)$, $v_q^*(k)$, $v_{an}^*(k)$, $v_{bn}^*(k)$, $v_{acn}^*(k)$ and $v_{bcn}^*(k)$ respectively, $v_d^*(k)$ and $v_q^*(k)$ are transformed into $v_{an}^*(k)$ and $v_{bn}^*(k)$, then $v_{an}^*(k)$ and $v_{bn}^*(k)$ are corrected by the correction in the step S4, S5 or S6 to obtain $v_{acn}^*(k)$ and $v_{bcn}^*(k)$.

Based on the following equations (B-8a) and (B-8b) corresponding to the above equations (A-1) and (A-2) and on the equation (B-8c), the coordinate transformer 25 in FIG. 10 obtains the three-phase voltage command values $v_{u1}^*$, $v_{v1}^*$ and $v_{w1}^*$ in the time of three-phase modulation and puts upper and lower limits depending on the magnitude of the DC voltage $V_{dc}$ onto the three-phase voltage command values $v_{u1}^*$, $v_{v1}^*$ and $v_{w1}^*$, thereby obtaining the final three-phase voltage command values $v_u^*$, $v_v^*$ and $v_w^*$. For example, if $v_{u1}^*$ exceeds a predetermined upper limit value $v_{UL}$ that is defined from the magnitude of the DC voltage $V_{dc}$, $v_{UL}$ is assigned to $v_u^*$; if $v_{u1}^*$ is smaller than a predetermined lower limit value $v_{LL}$ that is defined from the magnitude of the DC voltage $V_{dc}$, $v_{LL}$ is assigned to $v_u^*$. If $v_{UL} \geq v_{u1}^* \geq v_{LL}$, $v_u^*$ is set to $v_{u1}^*$. The same process is also applied to $v_{v1}^*$ and $v_{w1}^*$. The upper and lower limit values $v_{UL}$ and $V_{LL}$ match with the maximum and minimum values of the carrier signal CS in FIG. 3 respectively.

$$v_\alpha^* = \sqrt{\frac{2}{3}} \cdot \left( v_{u1}^* - \frac{1}{2} v_{v1}^* - \frac{1}{2} v_{w1}^* \right) \quad \text{(B-8a)}$$

$$v_\beta^* = \sqrt{\frac{2}{3}} \cdot \left( v_{u1}^* \cdot 0 + \frac{\sqrt{3}}{2} v_{v1}^* - \frac{\sqrt{3}}{2} v_{w1}^* \right) \quad \text{(B-8b)}$$

$$v_{w1}^* = -(v_{u1}^* + v_{v1}^*) \quad \text{(B-8c)}$$

Of course, it is possible to use two-phase modulation and hip modulation. In a case where two-phase modulation is used, the three-phase voltage command values $v_{u1}^*$, $v_{v1}^*$ and $v_{w1}^*$ are transformed into $v_{u2}^*$, $v_{v2}^*$ and $v_{w2}^*$ according to the above equations (A-3) to (A-5); and upper and lower limits depending on the magnitude of the DC voltage $V_{dc}$ are put on $v_{u2}^*$, $v_{v2}^*$ and $v_{w2}^*$; thus the final three-phase voltage command values $v_u^*$, $v_v^*$ and $v_w^*$ are obtained. In a case where hip modulation is used, the three-phase voltage command values $v_{u1}^*$, $v_{v1}^*$ and $v_{w1}^*$ are transformed into $v_{u3}^*$, $v_{v3}^*$ and $v_{w3}^*$ according to the above equations (A-6) to (A-8); and upper and lower limits depending on the magnitude of the DC voltage $V_{dc}$ are put on $v_{u3}^*$, $v_{v3}^*$ and $v_{w3}^*$; thus the final three-phase voltage command values $v_u^*$, $v_v^*$ and $v_w^*$ are obtained.

[Simulation Result]

In FIGS. 19A to 19F, simulation results related to voltage command vectors and applied voltage vectors are shown. The plot group in the graph in FIG. 19A represents a locus of the first voltage command vector on the $\alpha\beta$ coordinate system in the case where overmodulation is used. The plot group in the graphs in FIGS. 19B to 19E represent loci of vectors on the $\alpha\beta$ coordinate system that are generated from the first voltage command vector in FIG. 19A. In each graph in FIGS. 19A to 19F, the lateral axis matches with the $\alpha$ axis and the vertical axis matches with the $\beta$ axis.

The plot group in FIG. 19B represents a locus of an applied voltage vector obtained by the simple limit method that should be called a conventional method. FIG. 19B corresponds to a reference view for comparison with FIGS. 19C to 19F.

The plot group in FIG. 19C represent a locus of the second voltage command vector in the time $K=1/\sqrt{3}$; and the plot group in FIG. 19D represent a locus of an applied voltage vector that is generated based on the second voltage command vector in FIG. 19C. As seen from FIG. 19C, the locus of the second voltage command vector does not exist in the region 821 (see FIG. 8) where it is impossible to detect the phase currents of two phases.

The plot group in FIG. 19E represent a locus of the second voltage command vector in the time the coefficient K is much larger than $1/\sqrt{3}$; and the plot group in FIG. 19F represent a locus of an applied voltage vector that is generated based on the second voltage command vector in FIG. 19E. It is understood that by enlarging the coefficient K larger than $1/\sqrt{3}$, the detection of the phase currents of two phases is secured while the magnitude of the applied voltage vector is made as close to the $V_{max2} = (\sqrt{(2/3)} \times V_{dc})$ as possible (a larger voltage is applied to the motor 1).

The current detection portion 21 detects the three-phase currents ($i_u$, $i_v$ and $i_w$) by the one-shunt current detection system. However, it is also possible to detect the three-phase currents ($i_u$, $i_v$ and $i_w$) by a current detection system other than the one-shunt current detection system. In this case as well, the voltage command vector correction method in the first embodiment functions effectively. However, if a current detection system other than the one-shunt current detection system is used, the above threshold value A is set to zero (if the one-shunt current detection system is used, Δ>0).

For example, the current detection portion 21 may detect the three-phase currents ($i_u$, $i_v$ and $i_w$) by any one of the following first to third current detection systems. In the first current detection system, by using current sensors (two current sensors in all) for directly detecting the currents which flow in the terminals 12u and 12v in FIG. 1, the U-phase and V-phase electric-current values $i_u$ and $i_v$ are directly detected. In the second current detection system, by using a first current sensor that is disposed in series with a first wiring that connects the lower arm 9u and the bus 13 and a second current sensor that is disposed in series with a second wiring that connects the lower arm 9v and the bus 13, the currents that flow in the first and second wirings are detected; thus, the U-phase and V-phase electric-current values $i_u$ and $i_v$ are detected. In the third current detection system, by using the above first and second current sensors and a third current sensor that is disposed in series with a third wiring that connects the lower arm 9w and the bus 13, the currents that flow in the first to third wirings are detected; thus, the three-phase electric-current values are detected. Each current sensor used in the first to third current detection systems is a shunt resistor, a current transformer or the like.

In the motor drive system in FIG. 10, the position sensor 27 is used to obtain the magnetic pole position θ and the rotation speed ω. However, the magnetic pole position θ and the rotation speed ω may be obtained by estimation without using the position sensor 27. As an estimation method for the magnetic pole position θ and the rotation speed ω, arbitrary methods including a conventional method are usable. For example, the magnetic pole position θ and the rotation speed ω may be estimated by using all or some of $v_d^*$, $v_q^*$, $i_d$ and $i_q$.

Second Embodiment

Figure 20:
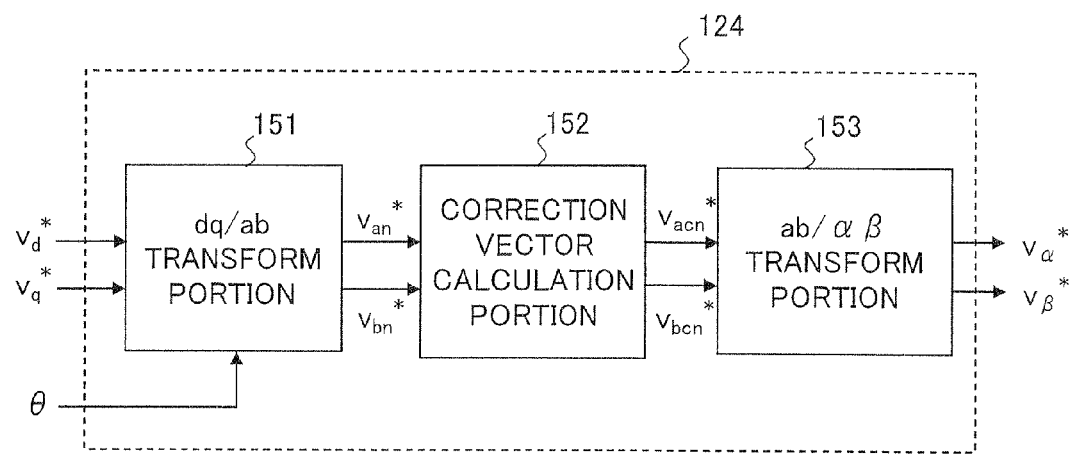
FIG. 20 is an internal block diagram of a voltage command vector correction portion in a second embodiment of the present invention.

Next, a second embodiment of the present invention is described. In the second embodiment, as the voltage command vector correction portion, a voltage command vector correction portion 124 in FIG. 20 is used. FIG. 20 is an internal block diagram of the voltage command vector correction portion 124. The voltage command vector correction portion 124 includes portions indicated by reference numbers 151 to 153.

The voltage command values $v_d^*$, $v_q^*$ and the magnetic pole position θ on the dq axis are given to the dq/ab transform portion 151. The $v_d^*$ and $v_q^*$ given to the dq/ab transform portion 151 form a voltage command vector in the second embodiment. In other words, in the second embodiment, $v_d^*$ and $v_q^*$ given to the dq/ab transform portion 151 are a d-axis component and a q-axis component of the voltage command vector 820 in FIG. 8. If a voltage depending on this voltage command vector is applied to the motor 1 as it is, the actual voltage values $v_d$ and $v_q$ match with the command values $v_d^*$ and $v_q^*$ respectively. However, the voltage command vector represented by $v_d^*$ and $v_q^*$ may be corrected by the voltage command vector correction portion 124.

For convenience, the voltage command vector before correction that is represented by $v_d^*$ and $v_q^*$ is called a first voltage command vector; and the voltage command vector after correction that is generated by correction to the first voltage command vector performed by the voltage command vector correction portion 124 is called a second voltage command vector. In the second embodiment, a d-axis component and a q-axis component of the first voltage command vector are $v_d^*$ and $v_q^*$ respectively that are given to the dq/ab transform portion 151; and an α-axis component and a β-axis component of the second voltage command vector are $v_\alpha^*$ and $v_\beta^*$ that are output from the voltage command vector correction portion 124. The $v_d^*$ and $v_q^*$ are so prepared that the first voltage command vector depicts a circle locus on the α β coordinate system. In other words, the voltage specified by $v_d^*$ and $v_q^*$ is a rotation voltage.

Based on the magnetic pole position θ, the dq/ab transform portion 151 transforms the given voltage command values $v_d^*$ and $v_q^*$ on the dq axis into the voltage command values $v_{an}^*$ and $v_{bn}^*$ on the $a_n b_n$ axis that should be set as the ab axis.

As described above, in the second embodiment, of the $b_0$ to $b_5$ axes, the axis that is closest to the first voltage command vector is selected as the b axis, and the a axis is selected according to the selection result. Accordingly, in the second embodiment, unlike the first embodiment, the quotient obtained by dividing (θ+ε+π/6) by π/3 becomes a value of the variable n, and the $b_n$ axis that has the quotient as the value of n is selected as the b axis. Of the $b_0$ to $b_5$ axes, the selected b axis is the axis that has a phase (phase seen from the U-phase axis) closest to the phase (θ+ε+π/2) of the first voltage command vector seen from the U-phase axis.

The variable n in the second embodiment, that is, the quotient which is obtained by dividing (θ+ε+π/6) by π/3, is also represented by $n_B$ to distinguish it from the variable n (=$n_A$) in the first embodiment. The variable n described in the second embodiment matches with $n_B$.

Figure 21:
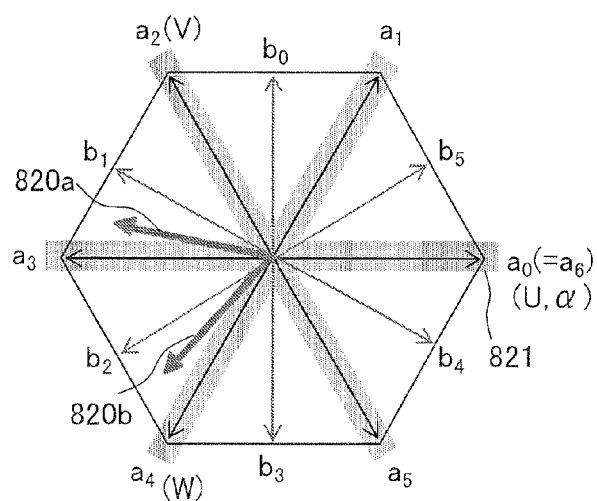
FIG. 21 is a view for explanation of a method for selecting a b axis from $b_0$ to $b_5$ axes in the second embodiment of the present invention.

The first voltage command vector rotates on the α β coordinate system together with rotation of the rotor 6 of the motor 1; and for example, when the vector 820a in FIG. 21 is the first voltage command vector, the $a_1$ axis and the $b_1$ axis are selected as the a axis and the b axis, and $v_{a1}^*$ and $v_{b1}^*$ are calculated as the voltage command values $v_{an}^*$ and $v_{bn}^*$ on the $a_n b_n$ axis; when the vector 820b in FIG. 21 is the first voltage command vector, the $a_2$ axis and the $b_2$ axis are selected as the a axis and the b axis, and $v_{a2}^*$ and $v_{b2}^*$ are calculated as the voltage command values $v_{an}^*$ and $v_{bn}^*$ on the $a_n b_n$ axis.

The dq/ab transform portion 151 obtains a value of n (=$n_B$) by dividing (θ+ε+π/6) by π/3, and uses the obtained value n to obtain an angle $θ_n$ according to the following equation (C-1); then, transforms $v_d^*$ and $v_q^*$ into $v_{an}^*$ and $v_{bn}^*$ according to the equation (C-2). The value of n (=$n_B$) obtained by the dq/ab transform portion 151 is also used for coordinate transform operation implemented by the ab/α β transform portion 153. Besides, the phase ε is obtained from $ε=\tan^{-1}(-v_d^*/v_q^*)$.

$$θ_n = θ - \frac{nπ}{3}, (n = n_B) \quad (C\text{-}1)$$

$$\begin{pmatrix} v_{an}^* \\ v_{bn}^* \end{pmatrix} = \begin{bmatrix} \cosθ_n & -\sinθ_n \\ \sinθ_n & \cosθ_n \end{bmatrix} \begin{pmatrix} v_d^* \\ v_q^* \end{pmatrix} \quad (C\text{-}2)$$

The correction vector calculation portion 152 corrects $v_{an}^*$ and $v_{bn}^*$ given from the dq/ab transform portion 151 and outputs the voltage command values $v_{acn}^*$ and $v_{bcn}^*$ on the $a_n b_n$ axis after the correction. The $v_{acn}^*$ and $v_{bcn}^*$ represent $v_{an}^*$ and $v_{bn}^*$ after the correction. It can be met that $v_{an}^* = v_{acn}^*$ and $v_{bn}^* = v_{bcn}^*$ depending on the values of $v_{an}^*$ and $v_{bn}^*$.

The voltage command values $v_{acn}^*$ and $v_{bcn}^*$ output from the correction vector calculation portion 152 are transmitted to the ab/α β transform portion 153. The ab/α β transform portion 153 performs coordinate transform to transform the voltage command values $v_{acn}^*$ and $v_{bcn}^*$ on the $a_n b_n$ axis into values on the α β axis, thereby calculating the voltage command values $v_\alpha^*$ and $v_\beta^*$ on the α β axis. This calculation is performed according to the following the equation (C-3). The variable n in the equation (C-3) is n (=$n_B$) obtained by the dq/ab transform portion 151.

$$\begin{pmatrix} v_\alpha^* \\ v_\beta^* \end{pmatrix} = \begin{bmatrix} \cos(n\pi/3) & -\sin(n\pi/3) \\ \sin(n\pi/3) & \cos(n\pi/3) \end{bmatrix} \begin{pmatrix} v_{acn}^* \\ v_{bcn}^* \end{pmatrix} \qquad (C\text{-}3)$$

The $v_d^*$ and $v_q^*$ are subsequently updated at predetermined update periods, and at each update, the latest $v_d^*$ and $v_q^*$ are used to obtain the latest $v_\alpha^*$ and $v_\beta^*$. The values $v_d^*$, $v_q^*$, $v_{an}^*$, $v_{bn}^*$, $v_{acn}^*$ and $v_{bcn}^*$ at the k-th update timing that are made discrete at the update periods are represented by $v_d^*(k)$, $v_q^*(k)$, $v_{an}^*(k)$, $v_{bn}^*(k)$, $v_{acn}^*(k)$, and $v_{bcn}^*(k)$ respectively. According to this, $v_d^*(k)$ and $v_q^*(k)$ are transformed into $v_{an}^*(k)$ and $v_{bn}^*(k)$, then $v_{an}^*(k)$ and $v_{bn}^*(k)$ are corrected to obtain $v_{acn}^*(k)$ and $v_{bcn}^*(k)$.

Figure 22A:
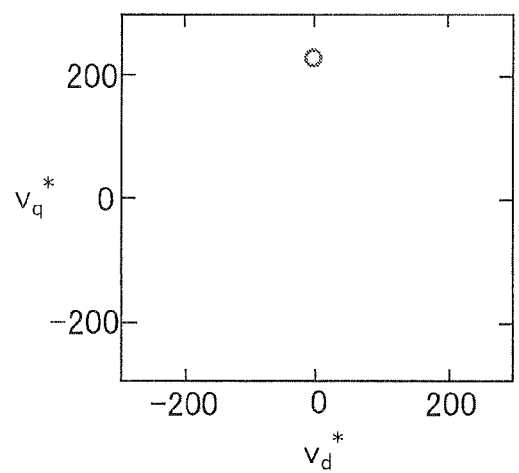
FIGS. 22A and 22B are respectively a view showing a first-voltage command vector locus on a dq coordinate system and a view showing a first-voltage command vector locus on an $a_n b_n$ coordinate system in the second embodiment of the present invention.

Now, a case is assumed, in which a first voltage command vector that has a locus shown in FIG. 22A is given to the dq/ab transform portion 151, in other words, $v_d^*=0$ and $v_q^*=$CONST are always given to the dq/ab transform portion 151. The value CONST is a relatively large constant value that needs overmodulation PWM. Under this assumption, as voltage command corrections that are able to be employed by the correction vector calculation portion 152, first to fourth voltage command corrections are separately described.

[First Voltage Command Correction]

Figure 22B:
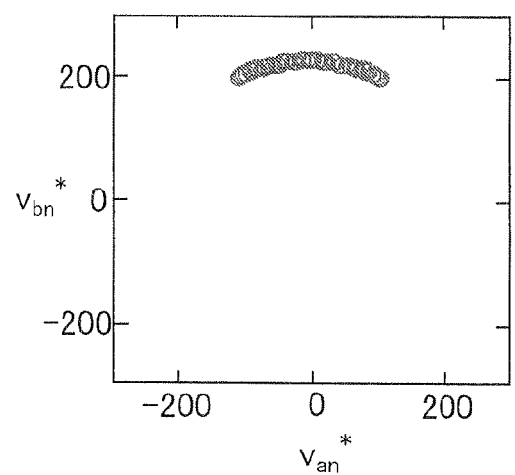

First, a first voltage command correction is described. If a first voltage command vector shown in FIG. 22A is generated, the locus of the first voltage command vector on the $a_n b_n$ coordinate system depicts a locus obtained by linking the plot group shown in FIG. 22B (this is true with the second to fourth voltage command corrections). The lateral and vertical axes in the graph in FIG. 22B represent $v_{an}^*$ and $v_{bn}^*$ respectively that are an $a_n$-axis component and a $b_n$-axis component of the first voltage command vector. As is understood from FIG. 22B, by performing coordinate transform between the dq axis and the ab axis using $n_B$ rather than $n_A$, it is possible to confine the locus of the first voltage command vector within a phase domain of $\pm\pi/6$ with respect to the $b_n$ axis.

Figure 23A:
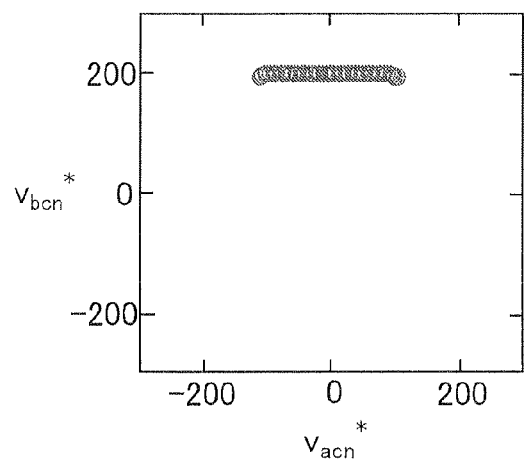
FIGS. 23A and 23B are respectively a view showing a second-voltage command vector locus on the $a_n b_n$ coordinate system and a view showing a second-voltage command vector locus on an α β coordinate system that are obtained by first voltage command correction in the second embodiment of the present invention.
Figure 23B:
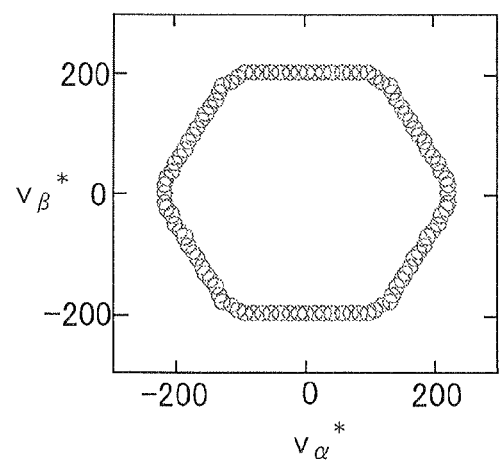

The first voltage command vector on the $a_n b_n$ coordinate system that has $v_{an}^*$ and $v_{bn}^*$ as the coordinate-axis components is obtained; then $v_{bn}^*$ is corrected by limiting the $b_n$-axis component of the first voltage command vector to a predetermined value. The plot group in FIG. 23A represent a locus of a second voltage command vector (that is, the first voltage command vector after correction) on the $a_n b_n$ coordinate system. If this second voltage command vector is transformed onto the $\alpha$ $\beta$ coordinate system, the second voltage command vector on the $\alpha$ $\beta$ coordinate system that has a locus shown in FIG. 23B is obtained.

By suitably setting the above predetermined value according to the DC voltage value $V_{dc}$, it is possible to so easily correct the voltage command vector that the voltage command vector is confined within the hexagon 812 (see FIG. 5) which the inverter 2 is able to output.

Figure 24B:
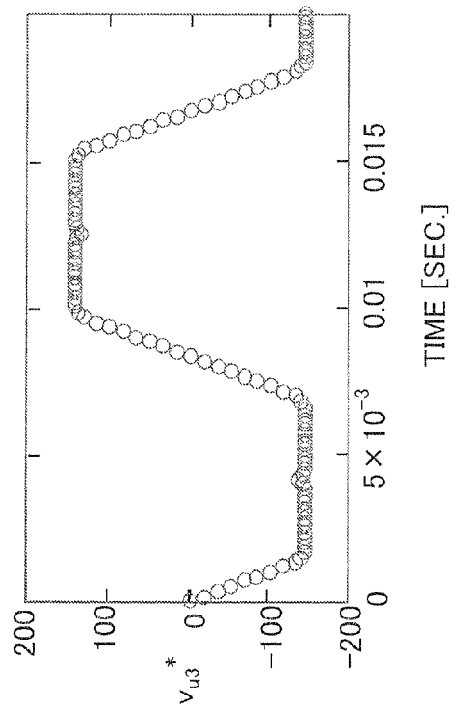
FIGS. 24A to 24D are views showing three-phase voltage command values that are obtained by the first voltage command correction in the second embodiment of the present invention.
Figure 24D:
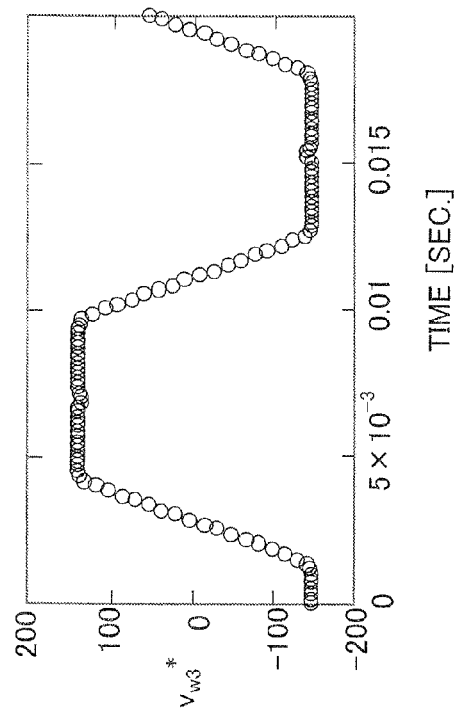
Figure 24A:
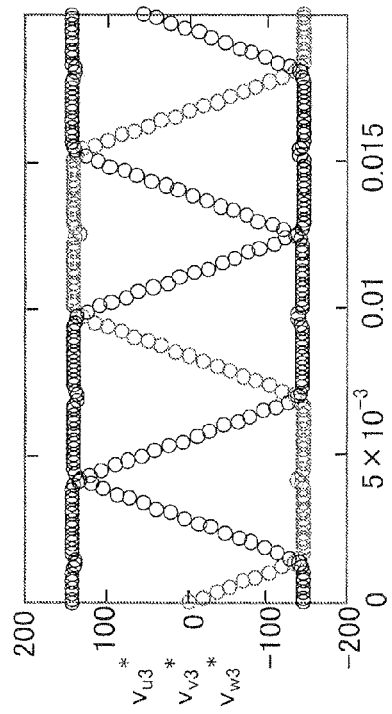
Figure 24C:
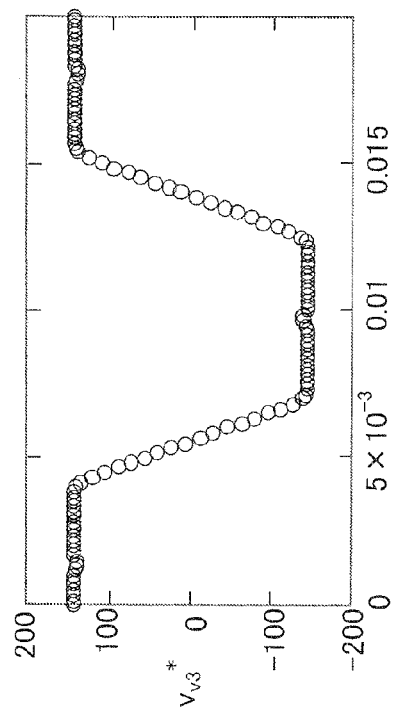

The command values $v_\alpha^*$ and $v_\beta^*$ of the second voltage command vector obtained by this correction are transformed into three-phase voltage command values; if hip modulation is used, the three-phase voltage command values $v_{u3}^*$, $v_{v3}^*$ and $v_{w3}^*$ shown in FIG. 24A that use the overmodulation domain are obtained. The graph in FIG. 24A represents a graph that is obtained by overlapping the plot group of the U-phase voltage command value $v_{u3}^*$ shown in FIG. 24B, the plot group of the V-phase voltage command value $v_{v3}^*$ shown in FIG. 24C and the plot group of the W-phase voltage command value $v_{w3}^*$ shown in FIG. 24D.

Here, in the graph in FIG. 23A (and in FIG. 25A and FIG. 29A described later), the lateral and vertical axes represent $v_{acn}^*$ and $v_{bcn}^*$ respectively that are an $a_n$-axis component and a $b_n$-axis component of the second voltage command vector. In the graph in FIG. 23B (and in FIG. 25B and FIG. 29B described later), the lateral and vertical axes represent $v_\alpha^*$ and $v_\beta^*$ respectively that are an $\alpha$-axis component and a $\beta$-axis component of the second voltage command vector. In the graph in FIG. 24A (and in FIG. 26A and FIG. 30A described later), the lateral axis represents time and the vertical axis represents $v_{u3}^*$, $v_{v3}^*$ and $v_{w3}^*$. In the graph in FIG. 24B (and in FIG. 26B and FIG. 30B described later), the lateral axis represents time and the vertical axis represents $v_{u3}*$. In the graph in FIG. 24C (and in FIG. 26C and FIG. 30C described later), the lateral axis represents time and the vertical axis represents $v_{v3}^*$. In the graph in FIG. 24D (and in FIG. 26D and FIG. 30D described later), the lateral axis represents time and the vertical axis represents $v_{w3}^*$.

Specifically, in the first voltage command correction, the correction vector calculation portion 152 corrects a voltage command vector according to the equation (C-4). Specifically, $v_{bn}^*(k)$ and an upper limit value $v_{bnmax}$ for the $b_n$-axis component are compared with each other; if $v_{bn}^*(k) > v_{bnmax}$ is met, $v_{bcn}^*(k)$ is obtained according to the equation "$v_{bcn}^*(k) = v_{bnmax}$"; if $v_{bn}^*(k) > v_{bnmax}$ is not met, $v_{bcn}^*(k)$ is obtained according to the equation "$v_{bcn}^*(k) = v_{bn}^*(k)$." In the first voltage command correction, the $a_n$-axis component of the voltage command vector is not corrected. In other words, always $v_{acn}^*(k) = v_{an}^*$.

$$v_{bcn}^*(k) = \begin{cases} V_{bn\,max} & \text{if } v_{bn}^*(k) > V_{bn\,max} \\ v_{bn}^*(k) & \text{otherwise} \end{cases} \qquad (C\text{-}4)$$

The upper limit value $v_{bnmax}$ is the maximum value of the $b_n$-axis components of voltages that the inverter 2 is able to output and is defined by the following equation (C-5). The upper limit value $v_{bnmax}$ is the same as the value $V_{max1}$ defined by the above equation (A-9) (see FIG. 5 as well).

$$V_{bn\,max} = \frac{\sqrt{3}}{2} V_{max2} = V_{max1} = \frac{1}{\sqrt{2}} V_{dc} \qquad (C\text{-}5)$$

[Second Voltage Command Correction]

Next, a second voltage command correction is described. In the first voltage command correction, correction to the $a_n$-axis component of the voltage command vector is not performed. However, it is possible to improve the linearity between the modulation rate $K_{v*}$ and the voltage use rate $K_v$ in the overmodulation domain by suitably perform correction to the $a_n$-axis component. As described in the first embodiment, the modulation rate $K_{v*}$ and the voltage use rate $K_v$ are defined by the above equations (B-3) and (B-4). However, it is needless to say that in the second embodiment, the magnitude of the first voltage command vector represented by the input values $v_d^*$ and $v_q^*$ to the dq/ab transform portion 151 is $|v^*|$.

Figure 25A:
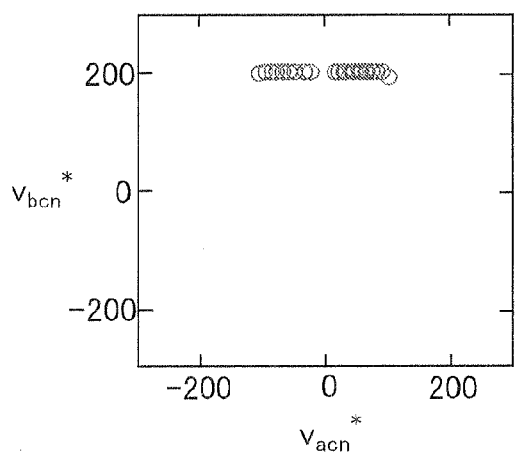
FIGS. 25A and 25B are respectively a view showing a second-voltage command vector locus on the $a_n b_n$ coordinate system and a view showing a second-voltage command vector locus on the α β coordinate system that are obtained by second voltage command correction in the second embodiment of the present invention.

In the second voltage command correction, correction to the $b_n$-axis component of the voltage command vector is performed, while correction is applied to the $a_n$-axis component as well of the voltage command vector depending on an amount by which the $b_n$-axis component exceeds the predetermined value ($v_{bnmax}$). Thus, the voltage command vector is corrected into a vector distant from the $b_n$ axis as shown in FIG. 25A (the voltage command vector after the correction is not situated in the vicinity of the $b_n$ axis). By performing such correction, the $a_n$-axis component of the voltage command vector is corrected to increase depending on an amount of decrease correction to the $b_n$-axis component of the voltage command vector; accordingly, in the overmodulation domain, it is possible to reduce a difference between the magnitude of the voltage command vector (the first voltage command vector) before the correction and the magnitude of the applied voltage vector (the second voltage command vector).

If the simple limit method that should be called a conventional method is used, in the overmodulation domain, a large difference is generated between the magnitude of a voltage command vector and the magnitude of the fundamental wave of an applied voltage vector; and the larger the modulation rate is, the larger the difference is. If such a large difference exists, controllability of a motor deteriorates. On the other hand, if the $a_n$-axis component of a voltage command vector is corrected as in the present voltage command correction, a difference decreases between the magnitude of the voltage command vector (the first voltage command vector) before the correction and the magnitude of the voltage command vector (the second voltage command vector) after the correction; consequently, in the overmodulation domain, the linearity between the magnitude of the voltage command vector before the correction and the magnitude of the fundamental wave of the applied voltage vector is upgraded and the controllability is improved.

Figure 25B:
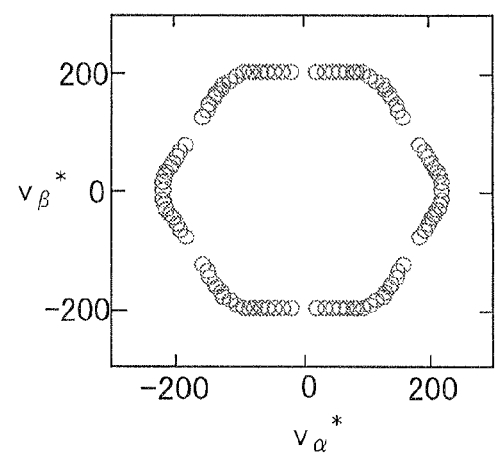

With reference to FIGS. 25A, 25B and FIGS. 26A to 26D, a result of a simulation corresponding to the second voltage command correction is described. In the second voltage command correction, the first voltage command vector on the $a_n b_n$ coordinate system that has $v_{an}^*$ and $v_{bn}^*$ as the coordinate-axis components is obtained; then, as described above, the $a_n$-axis component and the $b_n$-axis component of the first voltage command vector are corrected. The plot group in FIG. 25A represent the locus of the second voltage command vector (the first voltage command vector after the correction) on the $a_n b_n$ coordinate system that corresponds to the second voltage command correction. If this second voltage command vector is transformed onto the $\alpha\beta$ coordinate system, the second voltage command vector on the $\alpha\beta$ coordinate system that has a locus shown in FIG. 25B is obtained.

Figure 26A:
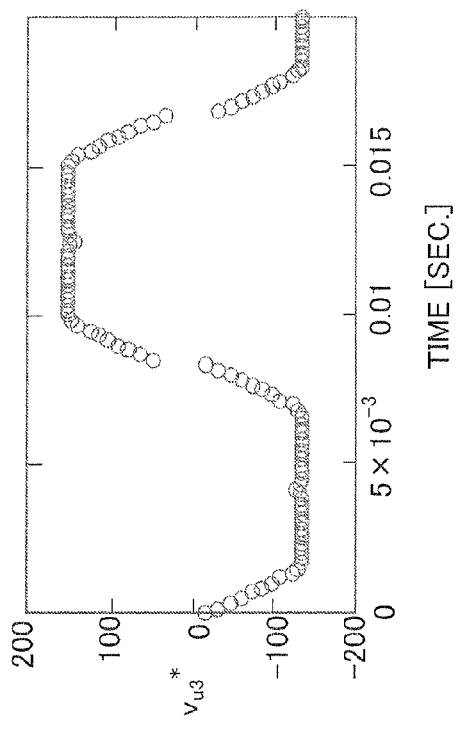
FIGS. 26A to 26D are views showing three-phase voltage command values that are obtained by the second voltage command correction in the second embodiment of the present invention.
Figure 26B:
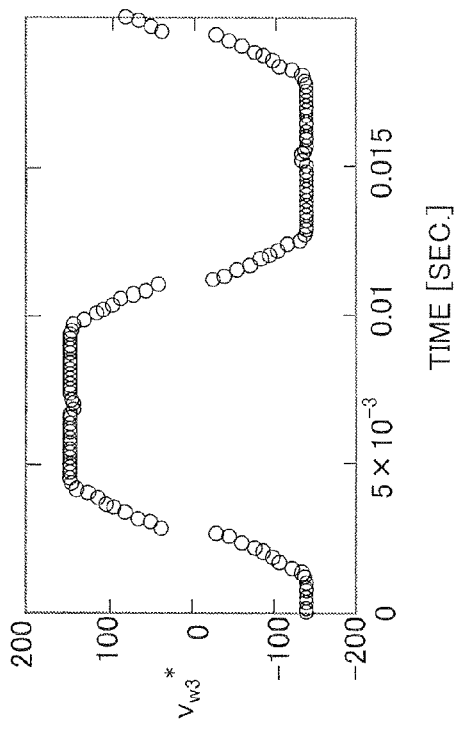
Figure 26C:
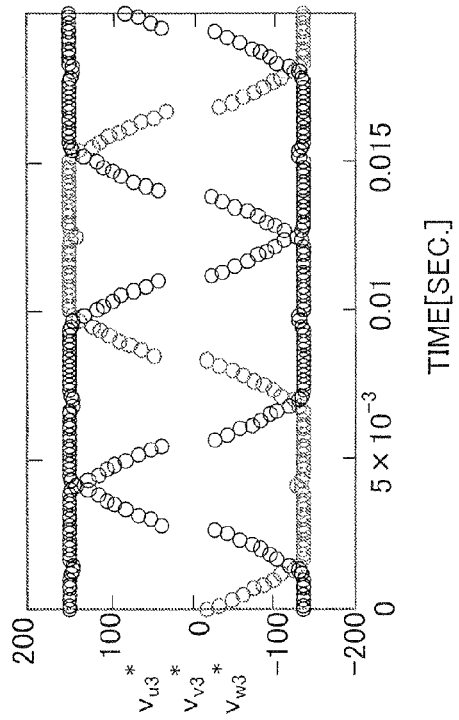
Figure 26D:
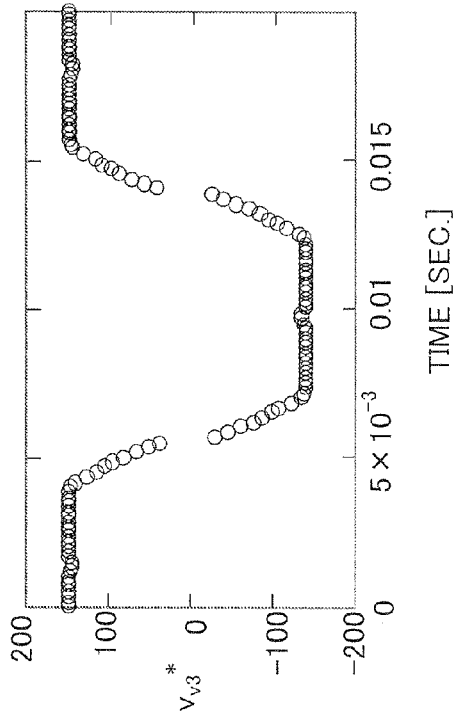

Thereafter, the command values $v_\alpha^*$ and $v_\beta^*$ of the second voltage command vector are transformed into three-phase command values; if hip modulation is used, the three-phase voltage command values $v_{u3}^*$, $v_{v3}^*$ and $v_{w3}^*$ shown in FIG. 26A that use the overmodulation domain are obtained. The graph in FIG. 26A represents a graph that is obtained by overlapping the plot group of the U-phase voltage command value $v_{u3}^*$ shown in FIG. 26B, the plot group of the V-phase voltage command value $v_{v3}^*$ shown in FIG. 26C and the plot group of the W-phase voltage command value $v_{w3}^*$ shown in FIG. 26D.

Specifically, in the second voltage command correction, the correction vector calculation portion 152 corrects the voltage command vector according to the equations (C-6) to (C-10). Here, sign $(v_{an}^*(k))$ is 1 when $v_{an}^*(k) \geqq 0$; sign $(v_{an}^*(k))$ is $(-1)$ when $v_{an}^*(k)<0$. Likewise, sign $(v_{an}'(k))$ is 1 when $v_{an}'(k) \geqq 0$; sign $(v_{an}'(k))$ is $(-1)$ when $v_{an}'(k)<0$.

$$v_{bcn}^*(k) = \begin{cases} V_{bn\,max} & \text{if } v_{bn}^*(k) > V_{bn\,max} \\ v_{bn}^*(k) & \text{otherwise} \end{cases} \quad \text{(C-6)}$$

$$v_{an\,max}(k) = \frac{v_{bcn}^*(k)}{\sqrt{3}} \quad \text{(C-7)}$$

$$v_{bno}^*(k) = v_{bn}^*(k) - v_{bcn}^*(k) \quad \text{(C-8)}$$

$$v_{an}'(k) = v_{an}^*(k) + \text{sign}(v_{an}^*(k)) \cdot v_{bno}^*(k) \cdot K_O \quad \text{(C-9)}$$

$$v_{acn}^*(k) = \begin{cases} \text{sign}(v_{an}'(k)) \cdot v_{an\,max}(k) & \text{if } |v_{an}'(k)| > v_{an\,max}(k) \\ v_{an}'(k) & \text{otherwise} \end{cases} \quad \text{(C-10)}$$

The equation (C-6) and the equation (C-4) that is used in the first voltage command correction are identical to each other. Accordingly, the process to generate $v_{bcn}^*(k)$ from $v_{bn}^*(k)$ in the second voltage command correction is identical to that in the first voltage command correction.

In the second voltage command correction, the value $v_{anmax}(k)$ is obtained according to the equation (C-7). The $v_{anmax}(k)$ based on the equation (C-7) indicates the maximum value of the $a_n$-axis components of voltages that the inverter 2 is able to output in the time the $b_n$-axis component of the applied voltage vector to the motor 1 is $v_{bcn}^*(k)$. Moreover, the value $v_{bno}^*(k)$ is obtained according to the equation (C-8). The value $v_{bno}^*(k)$ indicates the decreased amount of correction to the $b_n$-axis component, that is, the decreased correction amount of the $b_n$-axis component when the $b_n$-axis component $v_{bcn}^*(k)$ is obtained by correcting the $b_n$-axis component $v_{bn}^*(k)$.

Then, the value $v_{an}'(k)$ is obtained according to the equation (C-9). After the value $v_{an}'(k)$ is obtained, the value $v_{acn}^*(k)$ is obtained according to the equation (C-10). In other words, if an inequality $|v_{an}'(k)|>v_{anmax}(k)$ is met, $v_{acn}^*(k)$ is obtained according to the equation $v_{acn}^*(k)=\text{sign}(v_{an}'(k)) \cdot v_{anmax}(k)$; if the inequality $|v_{an}'(k)|>v_{anmax}(k)$ is not met, $v_{acn}^*(k)$ is obtained according to the equation $v_{acn}^*(k)=v_{an}'(k)$.

As described above, in the second voltage command correction, if the decreased correction amount $v_{bno}^*(k)$ of the $b_n$-axis component is larger than zero, the value $v_{an}'(k)$ that is different from the $v_{an}^*(k)$ by an amount depending on the decreased correction amount is obtained; according to the value $v_{an}'(k)$, the $a_n$-axis component $v_{acn}^*(k)$ of the voltage command vector after the correction is obtained within a range that does not exceed the upper limit value $v_{anmax}(k)$. Neglecting the presence of the upper limit value $v_{anmax}(k)$, the larger the decreased correction amount $v_{bno}^*(k)$ of the $b_n$-axis component becomes, the larger the amount $(v_{acn}^*(k)-v_{an}^*(k))$ as well of correction to the $a_n$-axis component becomes. The coefficient Ko in the equation (C-9) is a coefficient for adjusting the amount of correction to the $a_n$-axis component and the value of the coefficient Ko is set to a predetermined value that meets Ko>0.

Figure 27:
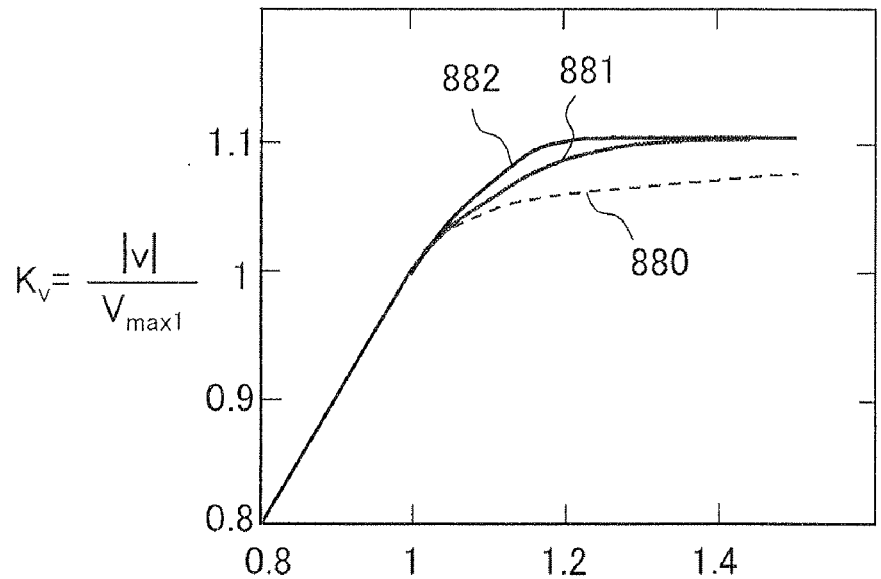
FIG. 27 is a view showing a relationship between a modulation rate and a voltage use rate in the second embodiment of the present invention.

In FIG. 27, a relationship between the modulation rate $K_{v^*}$ and the voltage use rate $K_v$ is shown. A curve 880 in the overmodulation domain shows a relationship between $K_{v^*}$ and $K_v$ in a case where the simple limit method is used. Curves 881 and 882 in the overmodulation domain show relationships between $K_{v^*}$ and $K_v$ in a case where the second voltage command correction is used, in which the curve 881 shows a relationship in the time Ko=1, while the curve 882 shows a relationship in the time Ko=2. By increasing the coefficient Ko, the linearity between $K_{v^*}$ and $K_v$ in the overmodulation domain is more improved.

[Third Voltage Command Correction]

Next, a third voltage command correction is described. In the third voltage command correction, a case is assumed, in which a voltage command vector correction portion 124 is built in a motor drive system that employs the one-shunt current detection system. Like in the second voltage command correction, in the third voltage command correction as well, the $a_n$-axis component $v_{an}^*(k)$ is corrected depending on an amount by which the $b_n$-axis component $v_{bn}^*(k)$ of the first voltage command vector exceeds the predetermined upper limit value $v_{bnmax}$; and a limit is put on the correction taking the one-shunt current detection system into account. Besides, in this case, correction is so performed as to avoid occurrence of a state in which it becomes impossible to detect the phase currents of two phases from the bus current. If based on the $a_n$-axis component $v_{an}^*(k)$, it is possible to determine whether or not a noticed time point falls in a time duration where it is impossible to detect the phase currents of two phases; accordingly, such correction is possible.

Specifically, in the third voltage command correction, the correction vector calculation portion 152 corrects a voltage command vector according to the above equations (C-6), (C-8) to (C-10) and the following equation (C-11).

$$v_{an\ max}(k) = \frac{v_{bcn}^*(k)}{\sqrt{3}} - \frac{2}{\sqrt{3}}\Delta \quad (C\text{-}11)$$

In the second voltage command correction, the value $v_{anmax}(k)$ is obtained according to the equation (C-7). However, in the third voltage command correction, the value $v_{anmax}(k)$ is obtained according to the equation (C-11) instead of the equation (C-7). The second and third voltage command corrections are identical to each other except that the calculation equations for the $v_{anmax}(k)$ are different from each other.

Figure 28:
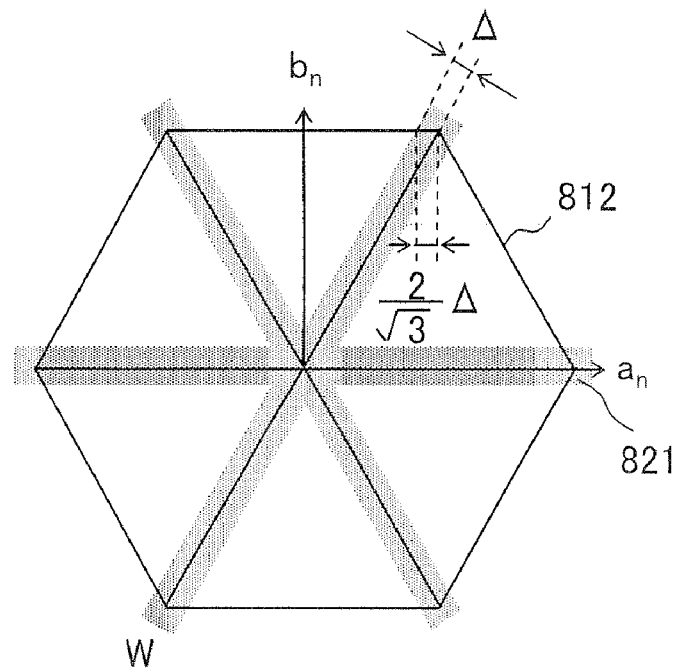
FIG. 28 is a view for explanation of third voltage command correction in the second embodiment of the present invention.

As described with reference to FIG. 8 and FIG. 9A, half of the thickness of the region 821 in the $b_n$-axis direction orthogonal to the $a_n$-axis is $\Delta$. Accordingly, as is understood from FIG. 28, if the upper limit value $v_{anmax}(k)$ of $v_{acn}^*(k)$ is decided according to the equation (C-11), it is possible to avoid occurrence of a state in which it becomes impossible to detect the phase currents of two phases.

Figure 29A:
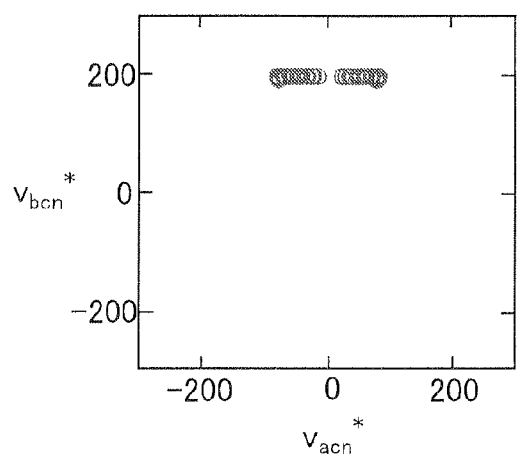
FIGS. 29A and 29B are respectively a view showing a second-voltage command vector locus on the $a_n b_n$ coordinate system and a view showing a second-voltage command vector locus on the α β coordinate system that are obtained by the third voltage command correction in the second embodiment of the present invention.
Figure 29B:
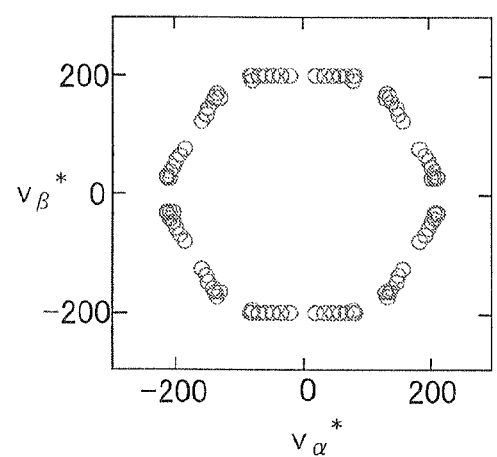
Figure 30B:
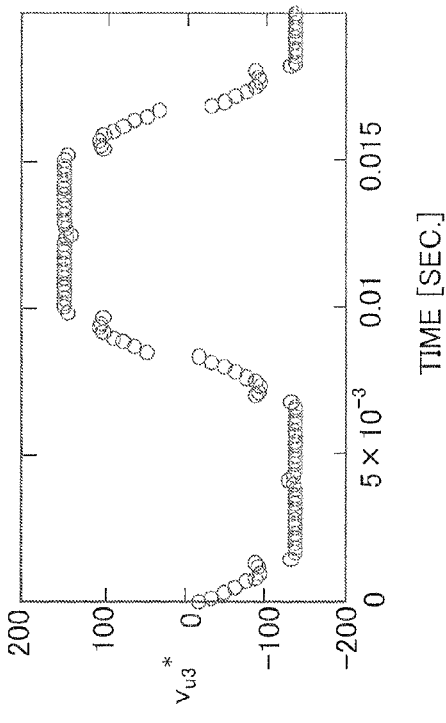
FIGS. 30A to 30D are views showing three-phase voltage command values that are obtained by the third voltage command correction in the second embodiment of the present invention.
Figure 30D:
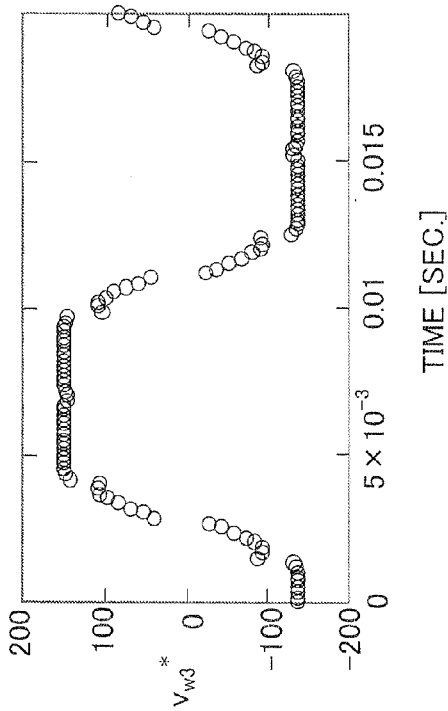
Figure 30A:
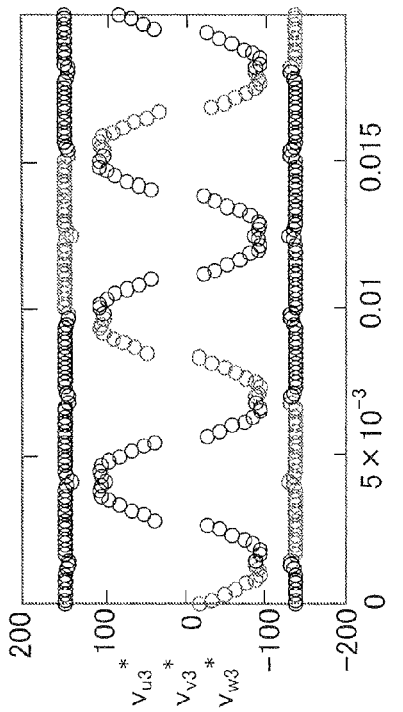
Figure 30C:
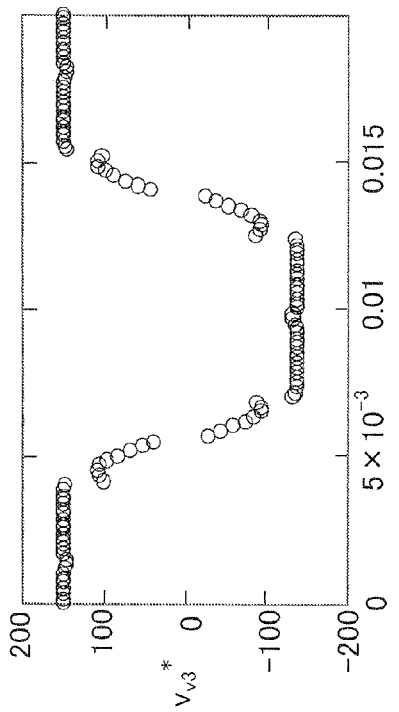

With reference to FIGS. 29A, 29B and FIGS. 30A to 30D, a result of a simulation corresponding to the third voltage command correction is described. The plot group in FIG. 29A represent a locus of the second voltage command vector (the first voltage command vector after the correction) on the $a_n b_n$ coordinate system that corresponds to the third voltage command correction. If this second voltage command vector is transformed onto the $\alpha$ $\beta$ coordinate system, the second voltage command vector on the $\alpha$ $\beta$ coordinate system that has a locus shown in FIG. 29B is obtained. From FIG. 29B, it is understood that the second voltage command vector does not exist in a region where it becomes impossible to detect the phase currents of two phases.

Thereafter, the command values $v_\alpha^*$ and $v_\beta^*$ of the second voltage command vector are transformed into three-phase voltage command values; if hip modulation is used, the three-phase voltage command values $v_{u3}^*$, $v_{v3}^*$ and $v_{w3}^*$ shown in FIG. 30A that use the overmodulation domain are obtained. The graph in FIG. 30A represents a graph that is obtained by overlapping the plot group of the U-phase voltage command value $v_{u3}^*$ shown in FIG. 30B, the plot group of the V-phase voltage command value $vv_{v3}^*$ shown in FIG. 30C and the plot group of the W-phase voltage command value $v_{w3}^*$ shown in FIG. 30D.

[Fourth Voltage Command Correction]

Next, a fourth voltage command correction is described. In the fourth voltage command correction as well, a case is assumed, in which a voltage command vector correction portion 124 is built in a motor drive system that employs the one-shunt current detection system. In the above third voltage command correction, correction to correct the $a_n$-axis component $v_{an}^*(k)$ depending on an amount by which the $b_n$-axis component $v_{bn}^*(k)$ of the first voltage command vector exceeds the predetermined upper limit value $v_{bnmax}$ is performed; and correction to avoid occurrence of a state in which it becomes impossible to detect the phase currents of two phases from the bus current is also performed. However, in the fourth voltage command correction, only the latter of these corrections is performed.

Specifically, in the fourth voltage command correction, the correction vector calculation portion 152 corrects the $b_n$-axis component of a voltage command vector according to the above equation (C-6). Accordingly, in the fourth voltage command correction, the process to generate $v_{bcn}^*(k)$ from $v_{bn}^*(k)$ is identical to those in the first to third voltage command corrections.

On the other hand, in the fourth voltage command correction, the correction vector calculation portion 152 corrects the $a_n$-axis component of a voltage command vector according to the following equations (C-12) and (C-13). Specifically, after the value $v_{anmax}(k)$ is obtained by the equation (C-12) identical to the above equation (C-11), if an inequality "$|v_{an}^*(k)|>v_{anmax}(k)$" is met, $v_{an}^*(k)$ is obtained according to the equation "$v_{acn}^*(k)=\text{sign}(v_{an}^*(k))\cdot v_{anmax}(k)$"; if the inequality "$|v_{an}^*(k)|>v_{anmax}(k)$" is not met, $v_{acn}^*(k)$ is obtained according to the equation "$v_{acn}^*(k)=v_{an}^*(k)$."

$$v_{an\ max}(k) = \frac{v_{bcn}^*(k)}{\sqrt{3}} - \frac{2}{\sqrt{3}}\Delta \quad (C\text{-}12)$$

$$v_{acn}^*(k) = \begin{cases} \text{sign}(v_{an}^*(k))\cdot v_{an\ max}(k) & \text{if } |v_{an}^*(k)| > v_{an\ max}(k) \\ v_{an}^*(k) & \text{otherwise} \end{cases} \quad (C\text{-}13)$$

The effect (upgrade of the linearity between $K_{v^*}$ and $K_v$ in the overmodulation domain) is not obtained from correcting the $a_n$-axis component $V_{an}^*(k)$ depending on an amount by which the $b_n$-axis component $v_{bn}^*(k)$ of the first voltage command vector exceeds the predetermined upper limit value $v_{bnmax}$; however, it becomes possible to avoid occurrence of a state in which it becomes impossible to detect the phase currents of two phases from the bus current.

[Structural Example of Motor Drive System]

Figure 31:
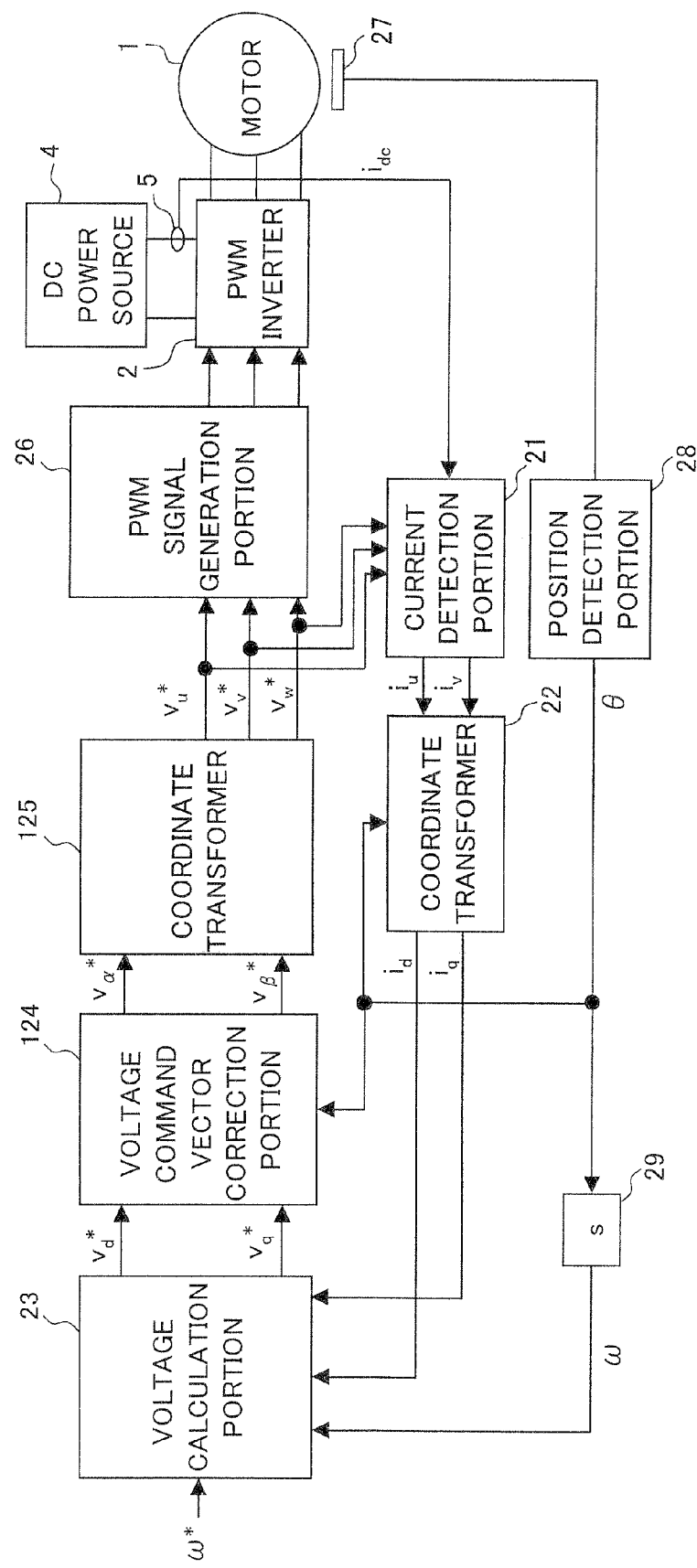
FIG. 31 is a block diagram showing a structure of a motor drive system according to the second embodiment of the present invention.

A structure and operation of a motor drive system that uses the above voltage command vector correction portion 124 are described. FIG. 31 is a block diagram showing a structure of the motor drive system according to the second embodiment of the present invention. In FIG. 31, the same portions as those in FIGS. 1 and 10 are indicated by the same reference numbers.

The motor driving system shown in FIG. 31 includes the motor 1, the inverter 2, the DC power source 4 and the current sensor 5. It also includes "the current detection portion 21, the coordinate transformer 22, the voltage calculation portion (voltage command vector generation portion) 23, the voltage command vector correction portion 124, the coordinate transformer 125, the PWM signal generation portion 26, the position sensor 27, the position detection portion 28 and the differentiator 29" that constitute the control apparatus 3 shown in FIG. 1. The current sensor 5 may be included in the control apparatus 3.

The portions that constitute the motor drive system in FIG. 31 update command values ($v_d^*$, $v_q^*$ and the like) and state amounts ($i_d$, $i_q$, θ, ω and the like) that the portions calculate (or detect) and output by themselves at predetermined update periods and perform necessary calculations by using the latest values.

The current detection portion 21, the coordinate transformer 22, the voltage calculation portion 23, the PWM signal generation portion 26, the position sensor 27, the position detection portion 28 and the differentiator 29 of the motor drive system in FIG. 31 are the same as those in FIG. 10. However, in the motor drive system in FIG. 31, the three-phase voltage command values $v_u^*$, $v_v^*$ and $v_w^*$ that should be input into the current detection portion 21 and the PWM signal generation portion 26 are output from the coordinate transformer 125.

The $v_d^*$ and $v_q^*$ calculated by the voltage calculation portion 23 form the first voltage command vector on the dq coordinate system and are given to the voltage command vector correction portion 124. In the voltage command vector correction portion 124, the d-axis component $v_d^*$ and the q-axis component $v_q^*$ of the first voltage command vector are transformed into the $a_n$-axis component $v_{an}^*$ and the $b_n$-axis component $v_{bn}^*$ of the first voltage command vector; then $v_{an}^*$ and $v_{bn}^*$ are corrected to obtain the $a_n$-axis component $v_{acn}^*$ and the $b_n$-axis component $v_{bcn}^*$ of the second voltage command vector.

As the process that is implemented in the voltage command vector correction portion 124 in FIG. 31 to generate $v_{acn}^*$ and $v_{bcn}^*$ from $v_{an}^*$ and $v_{bn}^*$, any one the first to fourth voltage command corrections is used. However, like the motor drive system in FIG. 10, because the motor drive system in FIG. 31 employs the one-shunt current detection system, it is desirable that the voltage command vector correction portion 124 in FIG. 31 obtains $v_{acn}^*$ and $v_{bcn}^*$ from $v_{an}^*$ and $v_{bn}^*$ by the above third or fourth voltage command correction.

The obtained $v_{acn}^*$ and $v_{bcn}^*$ are transformed by the ab/αβ transform portion 153 in the voltage command vector correction portion 124 into the α-axis voltage command value $v_α*$ that the α-axis voltage value $v_α$ should follow and into the β-axis voltage command value $v_β^*$ that the β-axis voltage value $v_β$ should follow. The coordinate transformer 125 transforms the command values $v_α^*$ and $v_β^*$ on the αβ axis output from the voltage command vector correction portion 124 into command values on the U-phase, V-phase and W-phase axes to calculate the three-phase voltage command values $v_u^*$, $v_v^*$ and $v_w^*$. The three-phase voltage command values $v_u^*$, $v_v^*$ and $v_w^*$ calculated by the coordinate transformer 125 are output to the current detection portion 21 and the PWM signal generation portion 26.

Based on the three-phase voltage command values $v_u^*$, $v_v^*$ and $v_w^*$ from the coordinate transformer 125, the PWM signal generation portion 26 so generates PWM signals for the switching elements (arms) in the inverter 2 that the U-phase, V-phase and W-phase voltage values $v_u$, $v_v$ and $v_w$ become voltage values depending on $v_u^*$, $v_v^*$ and $v_w^*$ respectively and gives the generated PWM signals to the inverter 2. According to the given PWM signals, the inverter 2 controls the switching of the switching elements in the inverter 2, thereby applying the U-phase, V-phase and W-phase voltages depending on the three-phase voltage command values $v_u^*$, $v_v^*$ and $v_w^*$ to the motor 1. Thus, the motor current $I_a$ depending on the three-phase voltage command values $v_u^*$, $v_v^*$ and $v_w^*$ is supplied to the motor 1, so that torque is generated in the motor 1.

In the coordinate transformer 125, two-phase modulation or hip modulation is used. In a case where two-phase modulation is used, the coordinate transformer 125, from $v_α^*$ and $v_β^*$, obtains the three-phase voltage command values $v_{u1}^*$, $v_{v1}^*$ and $v_{w1}^*$ in the time of three-phase modulation that meet the above equations (B-8a), (B-8b) and (B-8c); transforms $v_{u1}^*$, $v_{v1}^*$ and $v_{w1}^*$ into $v_{u2}^*$, $v_{v2}^*$ and $v_{w2}^*$ according to the above equations (A-3) to (A-5); and outputs $v_{u2}^*$, $v_{v2}^*$ and $v_{w2}^*$ as $v_u^*$, $v_v^*$ and $v_w^*$. In a case where hip modulation is used, the coordinate transformer 125 transforms the three-phase voltage command values $v_{u1}^*$, $v_{v1}^*$ and $v_{w1}^*$ into $v_{u3}^*$, $v_{v3}^*$ and $v_{w3}^*$ according to the above equations (A-6) to (A-8); and outputs $v_{u3}^*$, $v_{v3}^*$ and $v_{w3}^*$ as $v_u^*$, $v_v^*$ and $v_w^*$. Unlike the first embodiment, in the second embodiment, it is unnecessary to perform correction for overmodulation on the stage of the three-phase voltage command values.

Besides, in the above structure, the $a_n$-axis component $v_{an}^*$ and the $b_n$-axis component $v_{bn}^*$ of the first voltage command vector are obtained and then corrected on the $a_nb_n$ coordinate system; thereafter, the α-axis component $v_α^*$ and the β-axis component $v_β^*$ of the second voltage command vector are obtained. In other words, the first voltage command vector is corrected on the $a_nb_n$ coordinate system. However, the first voltage command vector may be corrected on a coordinate system other than the $a_nb_n$ coordinate system.

Figure 32:
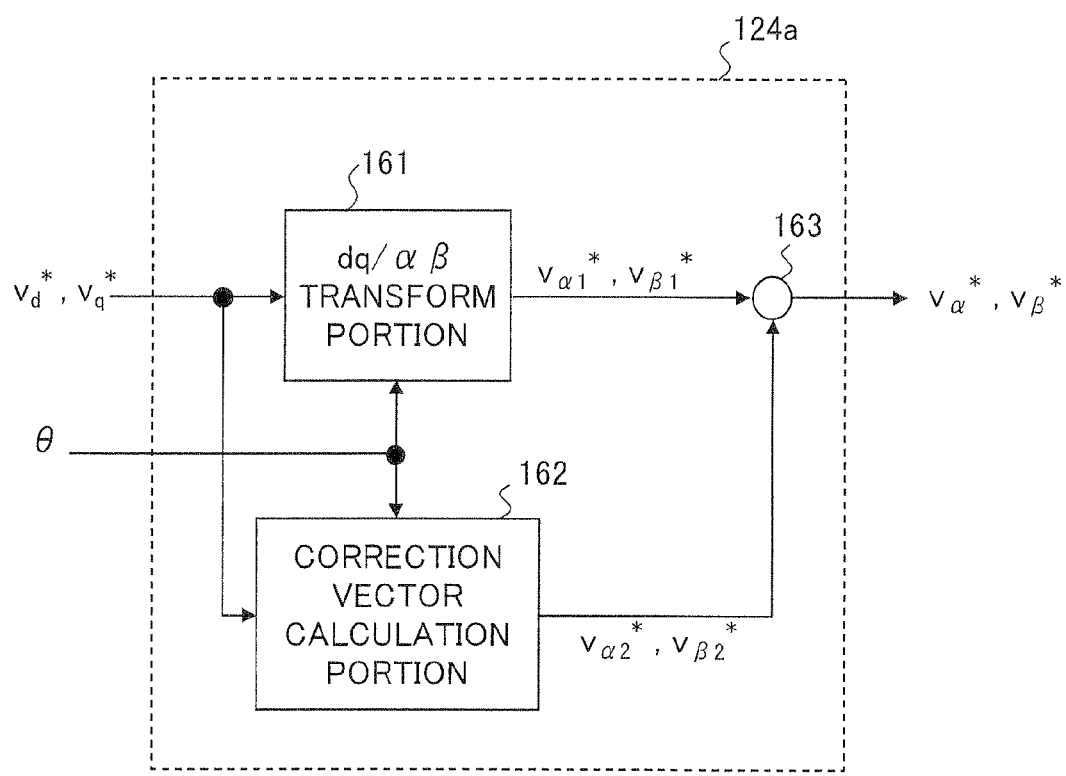
FIG. 32 is a modified block diagram of a voltage command vector correction portion that is applicable to the motor drive system in FIG. 31.

For example, it is possible to disposes a voltage command vector correction portion 124a shown in FIG. 32 in the motor drive system shown in FIG. 31 instead of the voltage command vector correction portion 124. FIG. 32 is an internal block diagram of the voltage command vector correction portion 124a and the voltage command vector correction portion 124a includes portions indicated by reference numbers 161 to 163.

A dq/αβ transform portion 161, based on the magnetic pole position θ, transforms the voltage command values $v_d^*$ and $v_q^*$ on the dq axis output from the voltage calculation portion 23 into voltage command values on the αβ axis to obtain $v_{α1}^*$ and $v_{β1}^*$. The $v_{α1}^*$ and $v_{β1}^*$ are the α-axis component and the β-axis component of the first voltage command vector, respectively. Based on $v_d^*$, $v_q^*$, and θ, a correction vector calculation portion 162 obtains correction values $v_{α2}^*$ and $v_{β2}^*$ for the voltage command values $v_{α1}^*$ and $v_{β1}^*$ on the αβ axis. By using $v_{α1}^*$, $v_{β2}^*$, $v_{α2}^*$ and $v_{β2}^*$ from the dq/αβ transform portion 161 and the correction vector calculation portion 162, an adder 163 corrects $v_{α1}^*$ and $v_{β1}^*$ according to equations "$v_α^*=v_{α1}^*+v_{α2}^*$" and "$v_β^*=v_{β1}^*+v_{β2}^*$" to calculate $v_α^*$ and $v_β^*$. The calculated values $v_α^*$ and $v_β^*$ are transmitted to the coordinate transformer 125 in FIG. 31.

The correction vector calculation portion 162 so obtains $v_{α2}^*$ and $v_{β2}^*$ that $v_α^*$ and $v_β^*$ calculated by the adder 163 become identical to $v_α^*$ and $v_β^*$ which should be output from the voltage command vector correction portion 124. In the voltage command vector correction portion 124a, the first voltage command vector is corrected on the αβ coordinate system.

It is also possible to perform correction on the stage of the three-phase voltage command values. In this case, the voltage command values $v_d^*$ and $v_q^*$ are transformed into command values on the U-phase, V-phase and W-phase axes based on the magnetic pole position θ to calculate three-phase voltage command values $v_{uA}^*$, $v_{vA}^*$ and $v_{wA}^*$ before correction while based on $v_d^*$, $v_q^*$ and θ, correction values $v_{uB}^*$, $v_{vB}^*$ and $v_{wB}^*$ for the three-phase voltage command values $v_{uA}^*$, $v_{vA}^*$ and $v_{wA}*$ are obtained; $v_{uA}*$, $v_{vA}*$ and $v_{wA}*$ are corrected by using $v_{uB}*$, $v_{vB}*$ and $v_{wB}*$, so that the final three-phase voltage command values $v_u*$, $v_v*$ and $v_w*$ are obtained. The correction values $v_{uB}*$, $v_{vB}*$ and $v_{wB}*$ are so obtained that the final three-phase voltage command values $v_u*$, $v_v*$ and $v_w*$ become identical to $v_u*$, $v_v*$ and $v_w*$ which should be output from the coordinate transformer 125 in FIG. 31.

The current detection portion 21 detects the three-phase currents ($i_u$, $i_v$ and $i_w$) by the one-shunt current detection system. However, it is also possible to detect the three-phase currents ($i_u$, $i_v$ and $i_w$) by a current detection system other than the one-shunt current detection system; in this case as well, the voltage command vector correction method in the second embodiment functions effectively. For example, the current detection portion 21 is able to detect the three-phase currents ($i_u$, $i_v$ and $i_w$) by any one of the first to third current detection systems described in the first embodiment. In the case where the three-phase currents are detected by any one of the first to third current detection systems, the voltage command vector may be corrected by using the above first or second voltage command correction.

In the motor drive system in FIG. 31, the position sensor 27 is used to obtain the magnetic pole position θ and the rotation speed ω. However, the magnetic pole position θ and the rotation speed ω may be obtained by estimation without using the position sensor 27. As an estimation method for the magnetic pole position θ and the rotation speed ω, arbitrary methods including a conventional method are usable. For example, the magnetic pole position θ and the rotation speed ω may be estimated by using all or some of $v_d*$, $v_q*$, $i_d$ and $i_q$.

Third Embodiment

Next, a third embodiment of the present invention is described. In the third embodiment, the voltage command vector correction method described in the above first or second embodiment is applied to a system interconnection system. In the above patent document 1, a method for applying a correction method for a voltage command vector in a motor drive system to a system interconnection system is disclosed. A method for applying the voltage command vector correction method described in the first or second embodiment of the present invention to a system interconnection system is the same as the method in the above patent document 1.

The above items (inclusive of the descriptions in the first and second embodiments) for a motor drive system are applied to the third or fourth embodiment described later. Points different from the first and second embodiments are described in explanation of the third or fourth embodiment described later.

Figure 33:
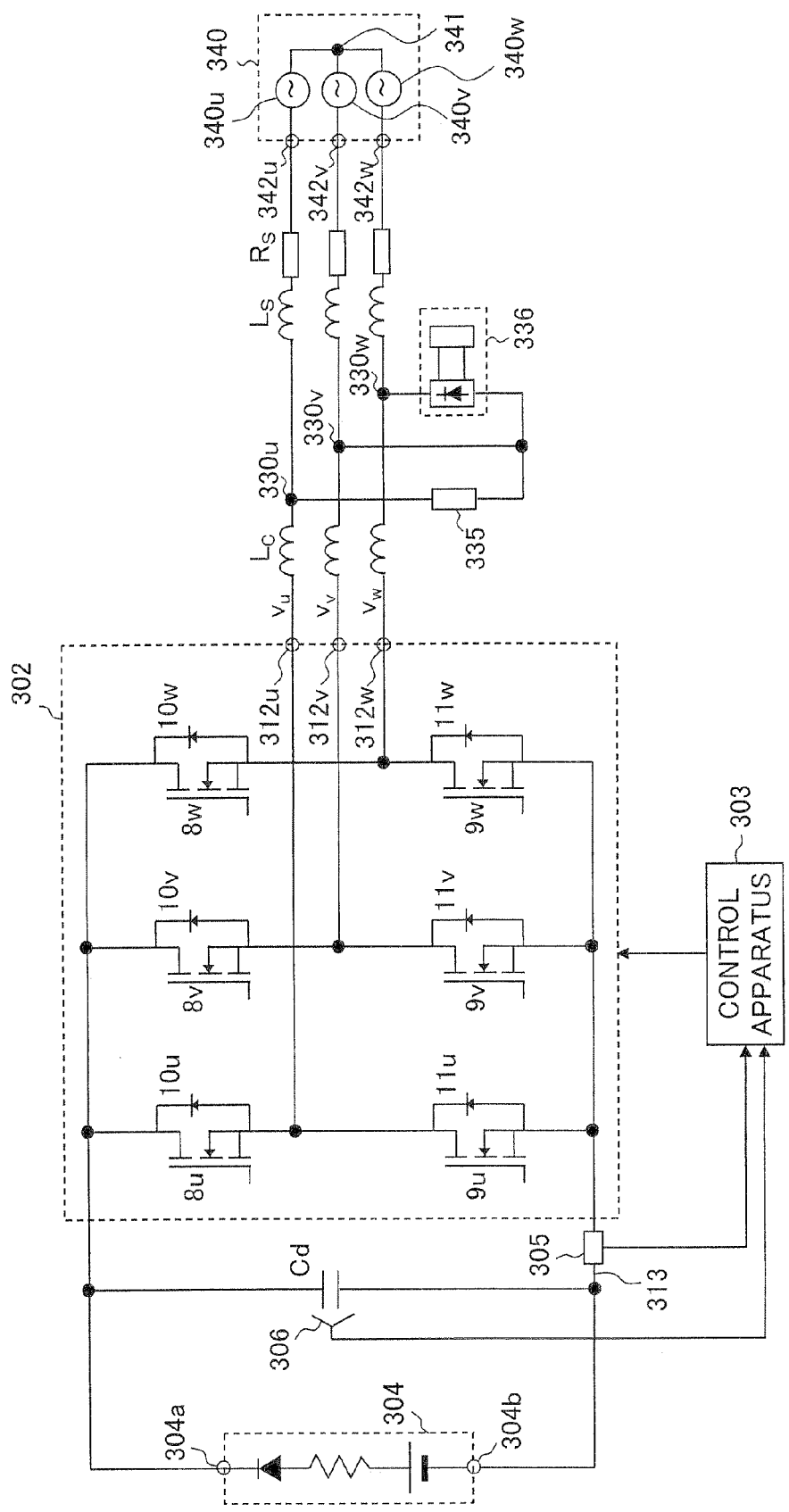
FIG. 33 is an overall structural view of a system interconnection system according to a third embodiment of the present invention.

FIG. 33 is an overall structural diagram of a system interconnection system according to the third embodiment. The system interconnection system shown in FIG. 33 transmits electric power generated by a solar battery to a three-phase system by using a three-phase inverter. In the present embodiment, a system interconnection system that incorporates a current control-system voltage interconnection three-phase inverter is used as an example. This type of system interconnection inverter makes an interconnection with a system by applying a voltage to the interconnection point to follow a current command value (e.g., see "Current Controlled Type Sinusoidal Voltage Interconnecting Three-Phase Inverter" by Yamada and two others; The Institute of Electrical Engineers of Japan, Papers March 2007, fourth volume 4-076, page 115).

A connection relationship among the portions shown in FIG. 33 and the like are described by suitably pointing out items common to the third embodiment and the fourth embodiment described later. In FIG. 33, a reference number 304 indicates a solar battery as a DC power source. An equivalent circuit of the solar battery 304 is shown in FIG. 33. The solar battery 304 performs generation of electric power based on solar energy and generates a DC voltage. The DC voltage is generated across a positive output terminal 304a and a negative output terminal 304b with the negative output terminal 304b disposed on a low-voltage side. The DC voltage across the positive output terminal 304a and the negative output terminal 304b is applied across both terminals of a smoothing capacitor Cd so that the smoothing capacitor Cd stores electric charges which depend on the DC voltage. A voltage detector 306 detects a voltage value of the voltage across both terminals of the smoothing capacitor Cd and sends the detected value to a control apparatus 303.

A PWM inverter 302 shown in FIG. 33 (hereinafter, simply called the "inverter 302") is a three-phase inverter that is the same as the inverter 2 shown in FIG. 1, and its inner structure is the same as the inverter 2.

The inverter 302 includes a half-bridge circuit for the U phase, a half-bridge circuit for the V phase and a half-bridge circuit for the W phase. Each half-bridge circuit has a pair of switching elements. In each half-bridge circuit, the pair of switching elements are connected in series across the positive output terminal 304a and the negative output terminal 304b; the voltage across both terminals of the smoothing capacitor Cd is applied to each half-bridge circuit. Note that u, v and w are generally used as symbols that represent the phases of a three-phase motor; in systems such as are used in the third embodiment and the fourth embodiment described later, symbols (e.g., a, b and c) other than u, v and w are used to represent the phases in many cases. However, in the third embodiment and the fourth embodiment described later, u, v and w are used as the symbols that represent the phases of the inverter 302 for convenience of description.

In the system interconnection system, a connection point of the upper arm 8u and the lower arm 9u that are connected in series, a connection point of the upper arm 8v and the lower arm 9v that are connected in series, and a connection point of the upper arm 8w and the lower arm 9w that are connected in series are connected to a terminal 312u that is an output terminal of the U phase of the inverter 302, a terminal 312v that is an output terminal of the V phase of the inverter 302, and a terminal 312w that is an output terminal of the W phase of the inverter 302, respectively. Here, in FIG. 33, the field-effect transistors are shown as the switching elements; however, they can be replaced with IGBTs (insulated gate bipolar transistors) or the like.

The terminals 312u, 312v and 312w are connected to interconnection points 330u, 330v and 330w respectively via an interconnection reactor (inductor) and an in-house wiring. A reactance component of the interconnection reactor and the in-house wiring disposed between the terminal 312u and the interconnection point 330u is represented by $L_C$. Likewise, a reactance component of the interconnection reactor and the in-house wiring between the terminal 312v and the interconnection point 330v as well as a reactance component of the interconnection reactor and the in-house wiring between the terminal 312w and the interconnection point 330w are also represented by $L_C$. Here, it is also possible to perform the system interconnection by using a three-phase transformer (not shown) disposed between the terminals 312u, 312v and 312w and the interconnection points 330u, 330v and 330w. This three-phase transformer is provided for purposes of insulation between the inverter 302 side and a system side (an electric power system 340 side described later) and of voltage transform.

An electric power system (system-side power source) 340 supplies three-phase AC power. The electric power system 340 can be divided into three AC voltage sources 340u, 340v and 340w for consideration; each of the AC voltage sources 340u, 340v and 340w outputs an AC voltage having an angular frequency (angular velocity) $\omega_S$ with respect to a reference point 341. However, the phases of the AC voltages output from the AC voltage sources 340u, 340v and 340w are different from each other by 120 degrees in electrical angle.

The electric power system 340 outputs the output voltages of the AC voltage sources 340u, 340v and 340w with respect to the reference point 341 from terminals 342u, 342v and 342w, respectively. The terminals 342u, 342v and 342w are connected to the interconnection points 330u, 330v and 330w respectively via outdoor wirings. Here, a reactance component and a resistance component of line impedance in each of the outdoor wirings are represented by $L_S$ and $R_S$, respectively.

A load such as a household electric appliance or the like is connected across different interconnection points. In the example shown in FIG. 33, a load 335 that is a linear load is connected across the interconnection points 330u and 330v, and a load 336 that is a nonlinear load is connected across the interconnection points 330v and 330w. Accordingly, the load 335 is driven by the voltage across the interconnection points 330u and 330v as a drive voltage; the load 336 is driven by the voltage across the interconnection points 330v and 330w as a drive voltage. The linear load means a load that complies with Ohm's law, while the nonlinear load means a load that does not comply with Ohm's law. For example, a load including a rectification circuit such as an AC/DC converter is considered as the load 336.

The inverter 302 gives a PWM signal (pulse-width modulation signal) that is based on the three-phase voltage command value generated by the control apparatus 303 to the control terminals (bases or gates) of the switching elements in the inverter 302, thereby forcing the switching elements to perform switching operations. The three-phase voltage command value generated by the control apparatus 303 is composed of the U-phase voltage command value $v_u^*$, the V-phase voltage command value $v_v^*$ and the W-phase voltage command value $v_w^*$; the voltage levels (voltage values) of the U-phase voltage $v_u$, the V-phase voltage $v_v$ and the W-phase voltage $v_w$ are specified by $v_u^*$, $v_v^*$ and $v_w^*$, respectively.

The DC voltage from the solar battery 304 is converted into the three-phase AC voltage through the PWM modulation (pulse-width modulation) by the switching operations of the switching elements in the inverter 302. The system interconnection system shown in FIG. 33 performs system interconnection between the solar battery 304 as the DC power source and the electric power system 340, so that AC power corresponding to the three-phase AC voltage from the inverter 302 is supplied to the loads 335 and 336 through the interconnection with the electric power system 340.

The current sensor 305 detects a current that flows in the bus 313 of the inverter 302. The bus currents in the third embodiment and the fourth embodiment described later refer to the bus current that flows in the bus 313. Because the bus current includes a DC component, it is possible to construe the bus current as a DC current. In the inverter 302, the low-voltage sides of the lower arms 9u, 9v and 9w are connected to the negative output terminal 304b of the solar battery 304 in common. The wiring to which the low-voltage sides of the lower arms 9u, 9v and 9w are connected in common is the bus 313, and the current sensor 305 is disposed in the bus 313 in series. The current sensor 305 transmits a signal that indicates an electric-current value of the detected bus current to the control apparatus 303. Based on the output signal from the current sensor 305, the control apparatus 303 generates the above three-phase voltage command values. The current sensor 305 is a shunt resistor, a current transformer or the like, for example. In addition, it is possible to connect the current sensor 305 not with the wire (the bus 313) that connects the low-voltage sides of the lower arms 9u, 9v and 9w with the negative output terminal 304b but with the wire that connects the high-voltage sides of the upper arms 8u, 8v and 8w with the positive output terminal 304a.

The U-phase voltage $v_u$, the V-phase voltage $v_v$ and the W-phase voltage $v_w$ in the motor drive system mean the voltages at the terminals 12u, 12v and 12w seen from the neutral point 14 shown in FIG. 1. However, the U-phase voltage $v_u$, the V-phase voltage $v_v$ and the W-phase voltage $v_w$ in the third embodiment and the fourth embodiment described later indicate the voltages at the terminals 312u, 312v and 312w respectively seen from a reference potential point that has a fixed potential. For example, in the third embodiment, the reference point 341 is able to be regarded as the above-mentioned reference potential point. Each of the U-phase voltage, the V-phase voltage and the W-phase voltage (or collectively) is called a phase voltage. Furthermore, in the third embodiment and the fourth embodiment described later, the currents that flow through the terminals 312u, 312v and 312w are called the U-phase current $i_u$, the V-phase current $i_v$ and the W-phase current $i_w$, respectively; and each of them (or collectively) is called a phase current. Besides, as for the phase current, a polarity of the current in the flowing-out direction from the terminal 312u, 312v or 312w is defined to be positive. In the third embodiment and the fourth embodiment described later, like in the motor drive system, the maximum phase, the intermediate phase and the minimum phase are defined.

The switching operation of each arm in the inverter 302 based on $v_u^*$, $v_v^*$ and $v_w^*$ is the same as that in the motor drive system. In other words, like the inverter 2 in the motor drive system, the inverter 302 compares $v_u^*$, $v_v^*$ or $v_w^*$ with the carrier signal CS and controls the on and off of each arm based on a result of the comparison.

In the third embodiment, the currents output from the inverter 302 via the terminals 312u, 312v and 312w are collectively called an "interconnection current." The U-phase current $i_u$, the V-phase current $i_v$ and the W-phase current $i_w$ correspond to the U-phase axis component, the V-phase axis component and the W-phase axis component of the interconnection current, respectively.

Figure 34:
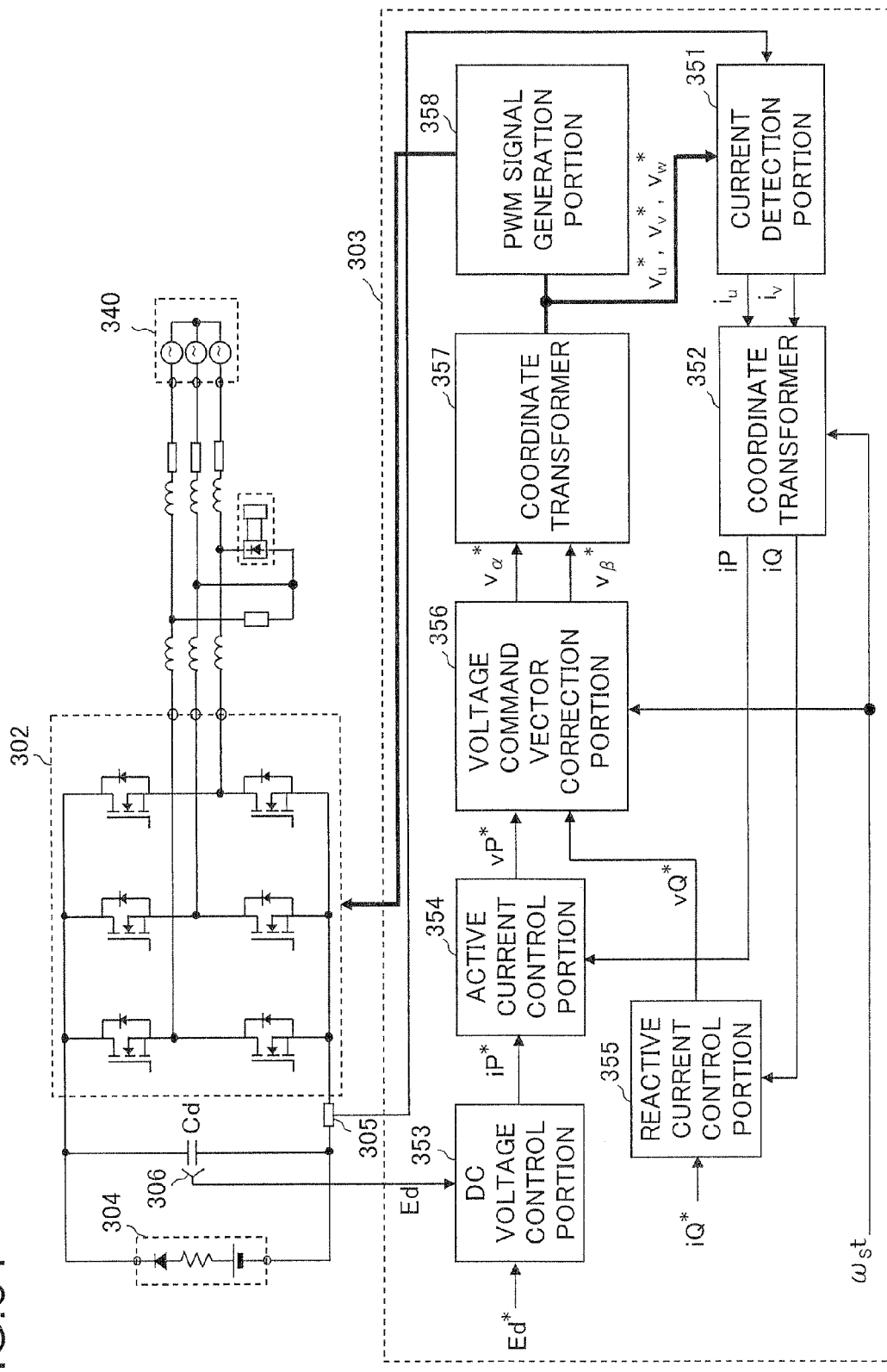
FIG. 34 is an overall structural view of the system interconnection system according to the third embodiment that includes an internal block diagram of a control apparatus.

FIG. 34 shows an overall structural diagram of a system interconnection system according to the third embodiment, which includes an inner block diagram of the control apparatus 303. The control apparatus 303 includes portions indicated by reference numbers 351 to 358. The control apparatus 303 detects each phase current from the bus current and converts the detected phase currents of three phases into an active current and a reactive current (i.e., applies P-Q conversion to the interconnection current). Then, a voltage command vector is so prepared that the voltage value of the voltage across both terminals of the smoothing capacitor Cd is maintained at a desired value and the reactive current becomes zero. The prepared voltage command vector is corrected like in the first or second embodiment, and the three-phase voltage command values ($v_u^*$, $v_v^*$ and $v_w^*$) are generated from the voltage command vector after the correction.

Figure 35:
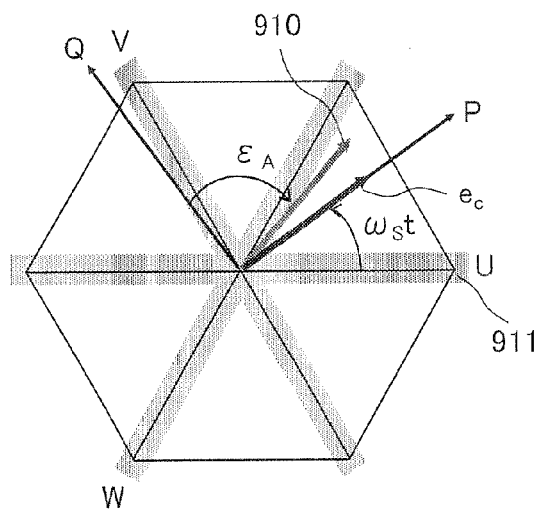
FIG. 35 is a space vector view showing a relationship among U-phase, V-phase and W-phase axes that are fixed axes, P and Q axes that are rotation axes, and a voltage command vector in a third embodiment of the present invention.

Prior to description of operations of the portions shown in FIG. 34, a relationship among a plurality of axes that are referred to in the control apparatus 303 is described. FIG. 35 is a space vector view showing a relationship among the U-phase axis, the V-phase axis and the W-phase axis that are fixed axes, and the P-axis and the Q-axis that are rotation axes.

The angular frequency (angular velocity) of rotation of the P axis is regarded to be the same as the angular frequency $\omega_S$ of the AC voltage output from the AC voltage sources 340$u$, 340$v$ and 340$w$. The resultant voltage of the voltages at the interconnection points 330$u$, 330$v$ and 330$w$ shown in FIG. 33 is regarded as a vector quantity on a two-dimensional coordinate plane, and the voltage vector is represented by $e_C$. If the inverter 302 outputs a current (current represented by a current vector that has the same direction as $e_C$) that has the same phase as $e_C$, the inverter 302 outputs only active power (in this case, reactive power is supplied from the electric power system 340).

The direction of the P axis is regarded as the same as the direction of the voltage vector $e_C$ (hence, the voltage vector $e_C$ falls on the P-axis). Then, the Q axis is set at a phase that leads the P axis by 90 degrees in electrical angle. The P axis and the Q axis are collectively called a PQ axis, and a coordinate system that selects the P axis and the Q axis as the coordinate axes is called a PQ coordinate system. In addition, the elapse time from a time point when the U-phase axis and the P axis match with each other is represented by t; the phase of the P axis seen from the U-phase axis is represented by $\omega_S t$ (the U phase axis and the P axis match with each other at t=0). The phase of the output voltage from the inverter 302 is made lead the voltage vector $e_C$ by an interconnection reactor represented by $L_C$. In FIG. 35, a vector indicated by a reference number 910 is a voltage command vector. The phase of the voltage command vector 910 seen from the Q axis is represented by $\epsilon_A$. In FIG. 35, the counter-clockwise direction is regarded as the leading direction of a phase, so that "$\epsilon_A<0$" is met. According to this, the phase of the voltage command vector 910 with respect to the U-phase axis is expressed by "$\omega_S t+\epsilon_A+\pi/2$." A P-axis component and a Q-axis component of the voltage command vector 910 are represented by vP* and vQ*, respectively.

In FIG. 35, like the region 821 in FIG. 8, a hatched asterisk-shape region 911 in the vicinity of the U-phase axis, the V-phase axis and the W-phase axis represents a region where the phase currents of two phases cannot be detected from the bus current. Besides, although not shown in FIG. 35, in the third and fourth embodiments as well, like those in the motor drive system, the α and β axes, and the $a_n$ and $b_n$ axes are defined. The control apparatus 303 (and a control apparatus 503 described later) select one of the $a_0$ to $a_5$ axes and sets the selected axis as the a axis and also select one of the $b_0$ to $b_5$ axes and sets the selected axis as the b axis. The b axis leads the a axis by 90 degrees in phase.

Operations of the portions shown in FIG. 34 are described. A signal indicating an electric-current value of the bus current detected by the current sensor 305 is transmitted to a current detection portion 351. The current detection portion 351 performs the same operation as the current detection portion 21 shown in FIG. 10. Specifically, based on the three-phase voltage command values $v_u^*$, $v_v^*$ and $v_w^*$ output from a coordinate transformer 357 and on the output signal from the current sensor 305, the current detection portion 351 calculates the U-phase electric-current value $i_u$ and the V-phase electric-current value $i_v$. The calculation method of $i_u$ and $i_v$ based on the three-phase voltage command values $v_u^*$, $v_v^*$ and $v_w^*$ and on the output signal from the current sensor 305 is the same as the calculation method by the current detection portion 21 of $i_u$ and $i_v$ based on the three-phase voltage command values $v_u^*$, $v_v^*$ and $v_w^*$ and on the output signal from the current sensor 5.

Based on the phase $\omega_S t$, a coordinate transformer 352 transforms the U-phase electric-current value $i_u$ and the V-phase electric-current value $i_v$ into electric-current values on the PQ axis to calculate the P-axis electric-current value iP and Q-axis electric-current value iQ. The iP is a P-axis component of an interconnection current and indicates an active current in the interconnection current. The iQ is a Q-axis component of an interconnection current and indicates a reactive current in the interconnection current. The iP and iQ calculated at a timing indicate the instantaneous value of an active current and the instantaneous value of a reactive current at the timing. Specifically, iP and iQ are calculated according to the following equation (D-1).

$$\begin{bmatrix} iP \\ iQ \end{bmatrix} = \sqrt{2} \begin{bmatrix} \sin(\omega_S t + \pi/3) & \sin\omega_S t \\ \cos(\omega_S t + \pi/3) & \cos\omega_S t \end{bmatrix} \begin{bmatrix} i_u \\ i_v \end{bmatrix} \quad (D-1)$$

The phase $\omega_S t$ corresponds to the phase of the output voltage from the inverter 302. As described above with reference to FIG. 35, the elapse time from the time point when the U-phase axis and the P-axis match with each other is represented by t, and the phase of the P axis seen from the U-phase axis is represented by $\omega_S t$. Accordingly, the phase $\omega_S t$ is able to be decided from the phase of the U-phase voltage $v_u$. In practical use, the angular frequency and the phase of the AC voltage from the AC voltage source 340$u$ that appears at the terminal 312$u$ are detected before the inverter 302 outputs the voltage; and the value of $\omega_S$ and the time point when t=0 are decided according to the detected angular frequency and the phase.

A DC voltage control portion 353 is supplied with a voltage Ed across both terminals of the smoothing capacitor Cd detected by the voltage detector 306 and a DC voltage command value Ed* that indicates a target value of the voltage Ed across both terminals. The DC voltage command value Ed* matches with Ed for obtaining the maximum electric power from the solar battery 304 (in other words, Ed for making the output power of the inverter 302 maximum). The DC voltage control portion 353 so calculates and outputs a command value iP* for an active current that (Ed-Ed*) converges to zero by proportional integral control. In addition, a command value iQ* for a reactive current is set to zero. The iP* indicates a target value that iP should follow, while the iQ* indicates a target value that iQ should follow.

Based on iP* from the DC voltage control portion 353 and iP from the coordinate transformer 352, an active current control portion 354 so performs proportional integral control that a current error (iP*-iP) converges to zero, thereby calculating a P-axis voltage command value vP* that the P-axis voltage vP should follow. Based on the given iQ* and iQ from the coordinate transformer 352, a reactive current control portion 355 so performs proportional integral control that a current error (iQ*-iQ) converges to zero, thereby calculating a Q-axis voltage command value vQ* that the Q-axis voltage vQ should follow. The vP and vQ indicate a P-axis component and a Q-axis component of an output voltage vector (a voltage that is output from the inverter 302 and represented by a vector) from the inverter 302.

Figure 36:
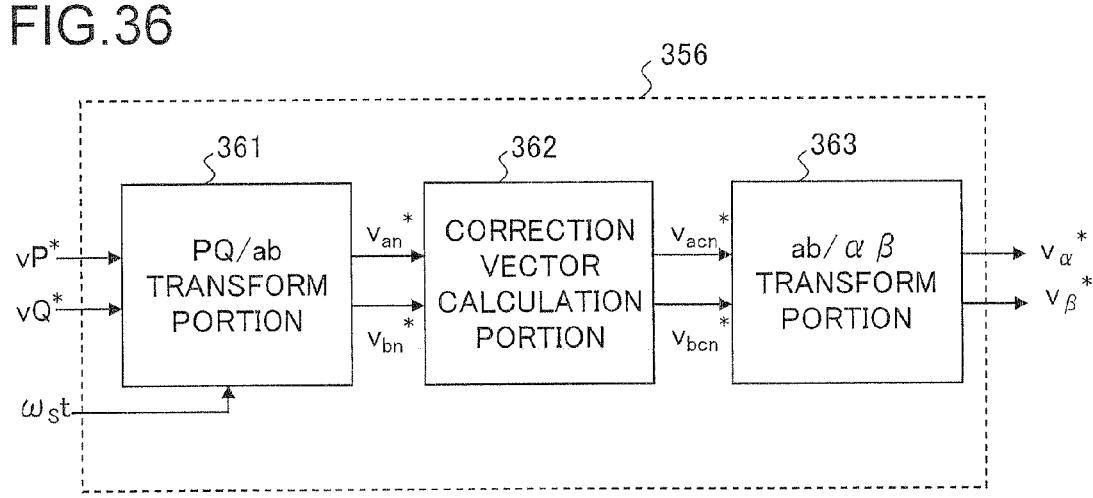
FIG. 36 is an internal block diagram of a voltage command vector correction portion in FIG. 34.

In FIG. 36, an inner block diagram of a voltage command vector correction portion 356 is shown. The voltage command vector correction portion 356 includes portions indicated by reference numbers 361 to 363.

A PQ/ab transform portion 361 is supplied with the voltage command values vP*, vQ* on the PQ axis and the phase $\omega_s t$. The vP* and vQ* form the voltage command vector in the third embodiment. In other words, in the third embodiment, vP* and vQ* are the P-axis component and the Q-axis component of the voltage command vector 910 in FIG. 35. If a voltage depending on this voltage command vector is output from the inverter 302 as it is, the actual P-axis voltage value vP and the Q-axis voltage value vQ match with the command values vP* and vQ*, respectively. However, the voltage command vector formed by vP* and vQ* may be corrected by the voltage command vector correction portion 356.

For convenience, the voltage command vector before correction that is represented by vP* and vQ* is called a first voltage command vector; and the voltage command vector after correction that is generated by correction to the first voltage command vector performed by the voltage command vector correction portion 356 is called a second voltage command vector. In the third embodiment, a P-axis component and a Q-axis component of the first voltage command vector are vP* and vQ* respectively; an α-axis component and a β-axis component of the second voltage command vector are $v_\alpha^*$ and $v_\beta^*$ respectively output from the voltage command vector correction portion 356. The vP* and vQ* are so prepared that the first voltage command vector depicts a circle locus on the α β coordinate system. In other words, the voltage specified by vP* and vQ* is a rotation voltage. If necessary, vP* and vQ* are so prepared that the modulation rate exceeds 1.

Based on the phase $\omega_s t$, the PQ/ab transform portion 361 transforms the voltage command values vP* and vQ* on the PQ axis into the voltage command values $v_{an}^*$ and $v_{bn}^*$ on the $a_n b_n$ axis that should be set as the ab axis. A correction vector calculation portion 362 corrects $v_{an}^*$ and $v_{bn}^*$ given from the PQ/ab transform portion 361 and outputs the voltage command values $v_{acn}^*$ and $v_{bcn}^*$ after the correction on the $a_n b_n$ axis. The $v_{acn}^*$ and $v_{bcn}^*$ represent $v_{an}^*$ and $v_{bn}^*$ after the correction. The voltage command values $v_{acn}^*$ and $v_{bcn}^*$ output from the correction vector calculation portion 362 are transmitted to an ab/α β transform portion 363. The ab/α β transform portion 363 performs coordinate transformation to transform the voltage command values $v_{acn}^*$ and $v_{bcn}^*$ on the $a_n b_n$ axis onto the α β axis, thereby calculating the voltage command values $v_\alpha^*$ and $v_\beta^*$ on the α β axis.

The process to generate $v_{an}^*$ and $v_{bn}^*$ from vP* and vQ*, the process to generate $v_{acn}^*$ and $v_{bcn}^*$ by correcting $v_{an}^*$ and $v_{bn}^*$ and the process to generate $v_\alpha^*$ and $v_\beta^*$ from $v_{acn}^*$ and $v_{bcn}^*$ that are performed by the voltage command vector correction portion 356 are the same as those in the first or second embodiment. However, in applying items described in the first or second embodiment to the present embodiment, "$v_d^*$, $v_q^*$, θ, d axis and q axis" are changed to "vP*, vQ*, $\omega_s t$, P axis and Q axis," respectively. Besides, in the present embodiment, the voltage Ed across both terminals of the smoothing capacitor Cd detected by the voltage detector 306 corresponds to the DC voltage $v_{dc}$, in the first or second embodiment.

The coordinate transformer 357 in FIG. 34 transforms the command values $v_\alpha^*$ and $v_\beta^*$ on the α β axis from the voltage command vector correction portion 356 into command values on the U-phase axis, V-phase axis and W-phase axes to calculate the three-phase voltage command values $v_u^*$, $v_v^*$ and $v_w^*$. The technique to calculate $v_u^*$, $v_v^*$ and $v_w^*$ from $v_\alpha^*$ and $v_\beta^*$ is the same as those described in the first or second embodiment.

Based on the three-phase voltage command values $v_u^*$, $v_v^*$ and $v_w^*$ from the coordinate transformer 357, a PWM signal generation portion 358 so generates PWM signals for the switching elements (arms) in the inverter 302 that the U-phase, V-phase and W-phase voltage values $v_u$, $v_v$ and $v_w$ become voltage values which depend on $v_u^*$, $v_v^*$ and $v_w^*$ respectively and gives the generated PWM signals to the inverter 302. According to the given PWM signals, the inverter 302 controls the switching of the switching elements in the inverter 302, thereby outputting the U-phase, V-phase and W-phase voltages that depend on the three-phase voltage command values $v_u^*$, $v_v^*$ and $v_w^*$.

As described above, the correction techniques described in the first or second embodiment are applicable to a system interconnection system, thus it is possible to obtain the same effect as in the first or second embodiment.

Here, it is possible to say that the control implemented by the control apparatus 303 for a system interconnection system is control for an active current and a reactive current while it is also possible to say that the control is control for an active power and a reactive power. The reason for this is that the AC voltage from the electric power system 340 is an AC voltage that has the substantially constant amplitude; accordingly, performing control by interacting with the AC voltage so as to allow an active current and a reactive current to become desired values is nothing but performing control so as to allow an active power and a reactive power to become desired values (an active power is a voltage multiplied by an active current; a reactive power is a voltage multiplied by a reactive current). Accordingly, it is possible to call the control apparatus 303 that is a kind of inverter control apparatus not only a current control apparatus but also a power control apparatus.

The solar battery 304 is described as an example of the DC power source for the inverter 302. However, instead of the solar battery 304, a fuel cell, a wind-power generator or the like may be used. Besides, it is possible to modify the specific structure of the system interconnection system shown in FIG. 34 according to various technical items described in the first or second embodiment.

Fourth Embodiment

In the systems according to the first to third embodiments, the detected current is used for the current control (or the power control). However, the technologies described in the first to third embodiments are applicable to a system that performs current detection for the purposes of protection and the like. This type of system is described as a fourth embodiment of the present invention.

Figure 37:
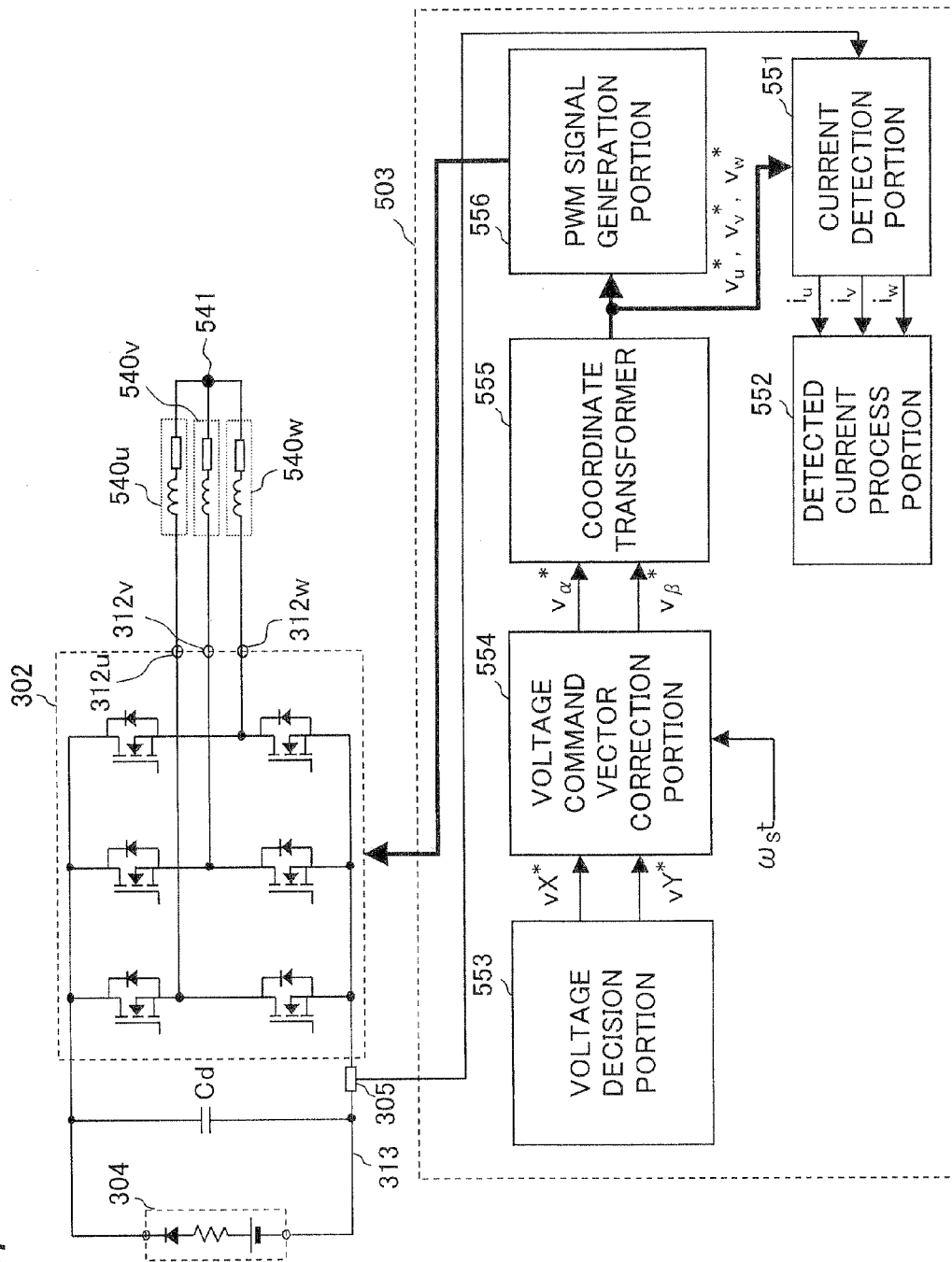
FIG. 37 is an overall structural view of a three-phase load drive system according to a fourth embodiment of the present invention.

FIG. 37 is an overall structural view of a three-phase load drive system according to the fourth embodiment. In FIG. 37, the inverter 302, the solar battery 304, the current sensor 305 and the smoothing capacitor Cd are the same as those shown in FIG. 33, and connection relationships among them are also the same as those in FIG. 33. For convenience of description, a DC power source for the inverter 302 of the three-phase load drive system is the solar battery 304 like in the third embodiment. However, it is possible to use any type of DC power source for the inverter 302.

Unlike the third embodiment, in the three-phase load drive system, the terminals 312u, 312v and 312w that are output terminals of the inverter 302 are not connected to the system side but are connected to a three-phase load. More specifically, the terminal 312u is connected to a reference point 541 via a load 540u, the terminal 312v is connected to a reference point 541 via a load 540v, and the terminal 312w is connected to a reference point 541 via a load 540w.

The U-phase voltage $v_u$, the V-phase voltage $v_v$ and the W-phase voltage $v_w$ in the three-phase load drive system shown in FIG. 37 are respectively voltages at the terminals 312$u$, 312$v$ and 312$w$ with respect to a potential of the reference point 541. The loads 540$u$, 540$v$ and 540$w$ respectively receive the U-phase voltage $v_u$, the V-phase voltage $v_v$ and the W-phase voltage $v_w$ as drive voltages. The loads 540$u$, 540$v$ and 540$w$ are loads such as inductors, resistors or the like, for example. Here, for convenience of description, the symbol $\omega_S$ used in the third embodiment is used in the fourth embodiment as well. However, $\omega_S$ used in the present embodiment is unrelated to the angular frequency of the AC voltage in the electric power system 340 shown in FIG. 33.

The operation of the inverter 302 based on the given PWM signal is the same as that in the third embodiment. However, in the three-phase load drive system shown in FIG. 37, the PWM signal is supplied from the control apparatus 503 as the inverter control apparatus.

The control apparatus 503 includes portions indicated by reference numbers 551-556. In the control apparatus 503, an X axis and a Y axis that correspond to the P axis and the Q axis in the third embodiment are defined.

Figure 38:
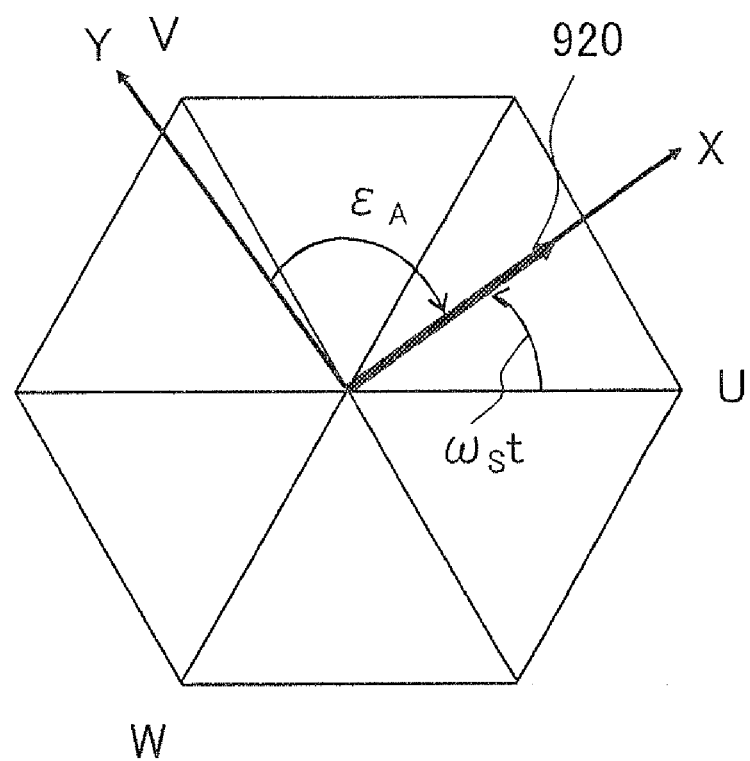
FIG. 38 is a space vector view showing a relationship among U-phase, V-phase and W-phase axes that are fixed axes, X and Y axes that are rotation axes, and a voltage command vector in a fourth embodiment of the present invention.

FIG. 38 is a space vector view indicating a relationship among the U-phase axis, the V-phase axis and the W-phase axis that are fixed axes and the X axis and the Y axis that are rotation axes. The angular frequency (angular velocity) of rotation of the X axis is $\omega_S$. A reference number 920 indicates a voltage vector of the output voltage from the inverter 302 in the present embodiment.

The direction of the X axis is the same as the direction of the voltage command vector 920 (accordingly, the voltage command vector 920 falls on the X axis). And, the Y axis is set at a phase leading the X axis by 90 degrees in electrical angle. The X axis and the Y axis are collectively called the XY axis, and the coordinate system that selects the X axis and the Y axis as the coordinate axes is called the XY coordinate system. Furthermore, in the present embodiment, the elapse time from a time point when the U-phase axis and the X-axis match with each other is represented by t; the phase of the X axis seen from the U-phase axis is represented by $\omega_S t$ (the U-phase axis and the X axis match with each other when t=0); and the phase of the voltage command vector 920 seen from the Y axis is represented by E A. In FIG. 38, the counter-clockwise direction is considered to be the leading direction of the phase, so that $\epsilon_A < 0$ is met. According to this, the phase of the voltage command vector 920 with respect to the U-phase axis is represented by $\omega_S t + \epsilon_A + \pi/2 = \omega_S t$. An X-axis component and a Y-axis component of the voltage command vector 920 are represented by vX* and vY*, respectively.

Operations of the portions shown in FIG. 37 are described. A signal indicating an electric-current value of the bus current detected by the current sensor 305 is transmitted to a current detection portion 551. The current detection portion 551 performs the same operation as the current detection portion 21 shown in FIG. 10. Specifically, based on the three-phase voltage command values $v_u^*$, $v_v^*$ and $v_w^*$ output from a coordinate transformer 557 and on the output signal from the current sensor 305, the current detection portion 551 calculates the three-phase electric-current values $i_u$, $i_v$ and $i_w$. The calculation method of $i_u$ and $i_v$ based on the three-phase voltage command values $v_u^*$, $v_v^*$ and $v_w^*$ on the output signal from the current sensor 305 is the same as the calculation method by the current detection portion 21 of $i_u$ and $i_v$ based on the three-phase voltage command values $v_u^*$, $v_v^*$ and $v_w^*$ and on the output signal from the current sensor 5. The $i_w$ is obtained by calculation using a relational equation "$i_u + i_v + i_w = 0$."

A detected current process portion 552 performs predetermined processing based on $i_u$, $i_v$ and $i_w$ output from the current detection portion 551. For example, the detected current process portion 552 detects whether or not $i_u$, $i_v$ and $i_w$ are excessively large (in other words, the output current from the inverter 302 is an overcurrent), and performs a protection operation based on the detection result.

A voltage decision portion 553 generates and outputs the X-axis voltage command value vX* that an X-axis voltage vX should follow and the Y-axis voltage command value vY* that a Y-axis voltage vY should follow. The vX and vY indicate an X-axis component and a Y-axis component of the output voltage vector from the inverter 302. As shown in FIG. 38, because the voltage command vector 920 is on the X axis, vY* is set to zero while a value that corresponds to a desired power value that is desired to be supplied to a three-phase load is assigned to vX*. In a motor drive system, the time point when the d axis and the U-phase axis match with each other depends on the magnetic pole position of the motor 1 while in a system interconnection system, the time point when the P axis and the U-phase axis match with each other depends on the phase of an AC voltage on the system side. However, in the fourth embodiment, because such dependency does not exist, the time point when t=0 is met is able to be freely decided. This is true with $\omega_S$ as well.

In the fourth embodiment, vX* and vY* are the X-axis component and the Y-axis component of the voltage command vector 920 in FIG. 38. If a voltage depending on this voltage command vector is output from the inverter 302 as it is, the actual X-axis voltage value vX and the Y-axis voltage value vY match with the command values vX* and vY*, respectively. However, the voltage command vector formed by vX* and vY* may be corrected by a voltage command vector correction portion 554.

For convenience, the voltage command vector before correction that is represented by vX* and vY* is called a first voltage command vector; and the voltage command vector after correction that is generated by correction to the first voltage command vector performed by the voltage command vector correction portion 554 is called a second voltage command vector. In the fourth embodiment, the X-axis component and the Y-axis component of the first voltage command vector are vX* and vY* respectively; the α-axis component and the β-axis component of the second voltage command vector are $v_\alpha^*$ and $v_\beta^*$ respectively output from the voltage command vector correction portion 554. The vX* and vY* are so prepared that the first voltage command vector depicts a circle locus on the α β coordinate system. In other words, the voltage specified by vX* and vY* is a rotation voltage. If necessary, vX* and vY* are so prepared that the modulation rate exceeds 1.

The voltage command vector correction portion 554 transforms the voltage command values vX* and vY* on the XY axis into $v_{an}^*$ and $v_{bn}^*$ based on the phase $\omega_S t$; then corrects them to obtain $v_{acn}^*$ and $v_{bcn}^*$. Thereafter, the voltage command vector correction portion 554 transforms the voltage command values $v_{acn}^*$ and $v_{bcn}^*$ on the $a_n b_n$ axis after the correction into values on the α β axis, thereby calculating the voltage command values $v_\alpha^*$ and $v_\beta^*$ on the α β axis. The process to generate $v_{an}^*$ and $v_{bn}^*$ from vX* and vY*, the process to generate $v_{acn}^*$ and $v_{bcn}^*$ by correcting $v_{an}^*$ and $v_{bn}^*$ and the process to generate $v_\alpha^*$ and $v_\beta^*$ from $v_{acn}^*$ and $v_{bcn}^*$ that are performed by the voltage command vector correction portion 554 are the same as those in the first or second embodiment. However, in applying items described in the first or second embodiment to the present embodiment, "$v_d^*$, $v_q^*$, θ, d axis and q axis" are changed to "vX*, vY*, $\omega_S t$, X axis and Y axis," respectively. Besides, in the present embodiment, the voltage across both terminals of the smoothing capacitor Cd corresponds to the DC voltage $v_{dc}$, in the first or second embodiment. Although not shown in FIG. 37, the voltage across both terminals of the smoothing capacitor Cd is detected by a voltage detector and the detected voltage value is transmitted to the control apparatus 503.

A coordinate transformer 555 transforms the command values $v_\alpha^*$ and $v_\beta^*$ on the $\alpha\beta$ axis from the voltage command vector correction portion 554 into command values on the U-phase, V-phase and W-phase axes to calculate the three-phase voltage command values $v_u^*$, $v_v^*$ and $v_w^*$. The technique to calculate $v_u^*$, $v_v^*$ and $v_w^*$ from $v_\alpha^*$ and $v_\beta^*$ is the same as those described in the first or second embodiment.

Based on the three-phase voltage command values $v_u^*$, $v_v^*$ and $v_w^*$ from the coordinate transformer 555, a PWM signal generation portion 556 so generates PWM signals for the switching elements (arms) in the inverter 302 that the U-phase, V-phase and W-phase voltage values $v_u$, $v_v$ and $v_w$ become voltage values which depend on $v_u^*$, $v_v^*$ and $v_w^*$ respectively and gives the generated PWM signals to the inverter 302. According to the given PWM signals, the inverter 302 controls the switching of the switching elements in the inverter 302, thereby outputting the U-phase, V-phase and W-phase voltages that depend on the three-phase voltage command values $v_u^*$, $v_v^*$ and $v_w^*$.

As described above, the correction techniques described in the first or second embodiment are applicable to a three-phase load drive system, thus it is possible to obtain the same effect as that in the first or second embodiment. It is also possible to modify the specific structure of the three-phase load drive system shown in FIG. 37 according to various technical items described in the first or second embodiment.

<<Modifications and Others>>

The specific numerical values indicated in the above description are mere examples and it is needless to say that it is possible to change the numerical values to other numerical values. As modifications or notes of the above embodiments, a note 1 and a note 2 are described below. It is possible to arbitrarily combine the descriptions of the notes as long as there are no discrepancies.

[Note 1]

The obtaining technique of all the values to be obtained including the above various command values ($v_d^*$ and $v_q^*$ and the like) and state amounts ($i_d$, $i_q$ and the like) is arbitrary. In other words, for example, they may be obtained by calculation in the control apparatus (3, 303 or 503) or may also be obtained from table data that are set in advance.

[Note 2]

All or some of the functions of the control apparatus (3, 303 or 503) are achieved by using software (programs) that is installed in a general-purpose microcomputer, for example. In achieving the control apparatus (3, 303 or 503) by using software, a block diagram that represents a structure of each portion of the control apparatus shows a functional block diagram. Of course, it is also possible to form the control apparatus (3, 303 or 503) by hardware only rather than software (programs) or by a combination of software and hardware.

What is claimed is:

1. An inverter control apparatus that controls a three-phase inverter which transforms a direct-current voltage into an alternating three-phase voltage, the inverter control apparatus comprising:

a voltage command vector generation portion that generates a first voltage command vector for specifying a vector of a voltage to be applied to a three-phase load that is connected to the inverter;

a voltage command vector correction portion that in performing overmodulation with the inverter, corrects the first voltage command vector by setting a limit onto a coordinate-axis component of the first voltage command vector on an ab coordinate system to generate a second voltage command vector, wherein the inverter is so controlled that a voltage depending on the second voltage command vector is applied to the load, and the ab coordinate system is a coordinated system that depending on a phase of the first voltage command vector with respect to a predetermined fixed axis on a two-dimensional fixed coordinate system, rotates in stepwise fashion for every 60 degrees in electrical angle with respect to the fixed coordinate system.

2. The inverter control apparatus according to claim 1, wherein the ab coordinate system includes an a axis and a b axis that are orthogonal to each other as the coordinate axes;

the a axis uses any one of $a_0$ to $a_5$ axes depending on the phase; the b axis uses any one of $b_0$ to $b_5$ axes depending on the phase; an $a_{(n+1)}$ axis leads an $a_n$ axis by 60 degrees in electrical angle; a $b_{(n+1)}$ axis leads a $b_n$ axis by 60 degrees in electrical angle (n: integer); one of the $a_0$ to $a_5$ matches with the fixed axis;

the voltage command vector correction portion selects an axis as the a axis that, of the $a_0$ to $a_5$ axes, has a phase closest to the phase of the first voltage command vector; selects the b axis from the $b_0$ to $b_5$ axes based on the selection result; and corrects the first voltage command vector by putting an upper limit onto an a-axis component of the first voltage command vector.

3. The inverter control apparatus according to claim 2, wherein if the a-axis component of the first voltage command vector exceeds a predetermined a-axis upper limit, the voltage command vector correction portion performs decease correction to decrease the a-axis component to the a-axis upper limit while corrects a b-axis component of the first voltage command vector depending on an amount of the decrease correction, thereby generating the second voltage command vector.

4. The inverter control apparatus according to claim 2, wherein if the a-axis component of the first voltage command vector exceeds a predetermined a-axis upper limit, the voltage command vector correction portion performs decease correction to decrease the a-axis component to the a-axis upper limit while corrects a b-axis component of the first voltage command vector by $1/\sqrt{3}$ of the decrease correction or depending on an amount that exceeds $1/\sqrt{3}$ of the decrease correction, thereby generating the second voltage command vector.

5. The inverter control apparatus according to claim 2, further comprising a coordinate transform portion that transforms the second voltage command vector into a three-phase voltage command value that specifies the three-phase voltage; the inverter control apparatus controls the inverter according to the three-phase voltage command value;

in the coordinate transform portion, a predetermined limit is put on the three-phase voltage command value depending on a magnitude of the direct-current voltage; and the inverter control apparatus controls the inverter according to a three-phase voltage command value after correction by the limit.

6. The inverter control apparatus according to claim 2, further comprising a current detection portion that detects a three-phase current which is supplied from the inverter to the load by detecting a current that flows between a direct-current power source for supplying the direct-current voltage to the inverter and the inverter, wherein the voltage command vector generation portion generates the first voltage command vector based on a detected value of the three-phase current.

7. The inverter control apparatus according to claim 1, wherein the ab coordinate system includes an a axis and a b axis that are orthogonal to each other as the coordinate axes;

the a axis uses any one of $a_0$ to $a_5$ axes depending on the phase; the b axis uses any one of $b_0$ to $b_5$ axes depending on the phase; an $a_{(n+1)}$ axis leads an $a_n$ axis by 60 degrees in electrical angle; a $b_{(n+1)}$ axis leads a $b_n$ axis by 60 degrees in electrical angle (n: integer); one of the $a_0$ to $a_5$ matches with the fixed axis;

the voltage command vector correction portion selects an axis as the b axis that, of the $b_0$ to $b_5$ axes, has a phase closest to the phase of the first voltage command vector; selects the a axis from the $a_0$ to $a_5$ axes based on the selection result; and corrects the first voltage command vector by putting an upper limit onto a b-axis component of the first voltage command vector.

8. The inverter control apparatus according to claim 7, wherein if the b-axis component of the first voltage command vector exceeds a predetermined b-axis upper limit, the voltage command vector correction portion performs decease correction to decrease the b-axis component to the b-axis upper limit while corrects an a-axis component of the first voltage command vector depending on an amount of the decrease correction, thereby generating the second voltage command vector.

9. The inverter control apparatus according to claim 8, wherein in correcting the a-axis component of the first voltage command vector, the voltage command vector correction portion so corrects the a-axis component of the first voltage command vector that an a-axis component after the correction does not exceed an a-axis upper limit; and the a-axis upper limit is set depending on a b-axis component after the correction.

10. The inverter control apparatus according to claim 7, further comprising a current detection portion that detects a three-phase current which is supplied from the inverter to the load by detecting a current that flows between a direct-current power source for supplying the direct-current voltage to the inverter and the inverter, wherein the voltage command vector generation portion generates the first voltage command vector based on a detected value of the three-phase current.

11. A motor drive system comprising:

a three-phase motor;

a three-phase inverter that drives the motor; and a motor control apparatus that controls the motor by controlling the inverter, wherein the motor drive system uses the inverter control apparatus described in claim 1 as the motor control apparatus to drive the motor as a three-phase load.

* * * * *